United States Statutory Invention Registration [19]

[11] Reg. Number: H789

Ueda et al. [43] Published: Jun. 5, 1990

[54] METHOD FOR PROCESSING A SILVER HALIDE PHOTOGRAPHIC MATERIAL

[75] Inventors: Shinji Ueda; Kei Sakanoue; Seiji Ichijima; Hidetoshi Kobayashi, all of Kanagawa, Japan

[73] Assignee: Fuji Photo Film Co., Ltd., Minami-Ashigara, Japan

[21] Appl. No.: 180,874

[22] Filed: Apr. 13, 1988

[30] Foreign Application Priority Data

Apr. 14, 1987 [JP] Japan ..... 62-89821
Apr. 20, 1987 [JP] Japan ..... 62-95432

[51] Int. Cl.[5] ..... G03C 7/00
[52] U.S. Cl. ..... 430/372; 430/393; 430/400; 430/464
[58] Field of Search ..... 430/393, 372, 955, 400, 430/463, 491, 467, 473

[56] References Cited

U.S. PATENT DOCUMENTS

| | | | |
|---|---|---|---|
| 3,828,172 | 8/1974 | Schickler | 235/151.12 |
| 4,434,226 | 2/1984 | Wilgus et al. | 252/567 |
| 4,789,626 | 12/1988 | Sakanoue et al. | 430/393 |

FOREIGN PATENT DOCUMENTS

| | | |
|---|---|---|
| 132806 | 2/1985 | European Pat. Off. . |
| 161626 | 11/1985 | European Pat. Off. . |
| 164030 | 12/1985 | European Pat. Off. . |
| 0193389 | 9/1986 | European Pat. Off. . |
| 79446 | 6/1980 | Japan . |
| 2165954 | 4/1986 | United Kingdom . |

OTHER PUBLICATIONS

Bleach Accelerator Releasing Couplers, Research Disclosure Oct. 1973, pp. 66–67.

Compounds Capable of Releasing a Development-Influencing Moiety, Research Disclosure Jun. 1984, pp. 286–292.

*Primary Examiner*—Matthew A. Thexton
*Assistant Examiner*—Joseph D. Anthony
*Attorney, Agent, or Firm*—Sughrue, Mion, Zinn, Macpeak & Seas

[57] ABSTRACT

A novel method for processing a silver halide color photographic material. The process comprises image-wise exposing a silver halide color photographic light-sensitive material to light, color-developing the light-sensitive material, and then desilvering the light-sensitive material, wherein: (a) said silver halide color photographic light-sensitive material contains a compound which reacts with an oxidation product of anaromatic primary amine color developing agent to form a bleaching accelerator, (b) the desilvering step is conducted with a processing solution containing a ferric complex salt of an organic acid, and (c) the total amount of replenisher of the processing solution to be used in the desilvering step satisfies either the following conditions (i) or (ii):

(i) the total amount of replenisher is 1,000 ml or less per $m^2$ of the light-sensitive material if the coated amount of silver per $m^2$ of the light-sensitive material is 2.0 g or more;

(ii) the total amount of replenisher is 400 ml or less per $m^2$ of the light-sensitive material if the coated amount of silver per $m^2$ of the light-sensitive material is less than 2.0 g.

11 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PROCESSING A SILVER HALIDE PHOTOGRAPHIC MATERIAL

FIELD OF THE INVENTION

The present invention relates to a method for processing (hereinafter referred to as "processing") an exposed silver halide color photographic material (hereinafter referred to as "color light-sensitive material"). More particularly, the present invention relates to a method for rapidly processing a color light-sensitive material having an improved desilvering capability.

BACKGROUND OF THE INVENTION

In general, the processing of a color light-sensitive material essentially consists of a color developing step and a desilvering step. In the color developing step, silver halide which has been exposed to light is reduced by a color developing agent to produce silver. At the same time, the color developing agent which as been oxidized reacts with a color forming agent (coupler) to provide color images. The silver thus produced is oxidized by a bleaching agent in a subsequent desilvering step and then acted on by a fixing agent to become a soluble silver complex which is then dissolved and removed.

The practical developing process comprises various auxiliary steps besides the above described basic steps in order to maintain photographic and physical qualities of the images or improve the preservability of the images. Examples of such auxiliary steps include a hardening step, a stopping step, an image stabilizing step, and a washing step.

In recent years, the industry has seen a growing demand for rapid processing, i.e., shorter time required for processing, especially at the desilvering step, which accounts for the majority of the total processing time.

As bleaching agents there have generally been known red prussiate, bichromate, ferric chloride, ferric aminopolycarboxylate complex, and persulfate.

However, red prussiate and bichromate have a disadvantage in that these salts can give cyanide or hexavalent chromium pollution and thus require a special treatment facility. Ferric chloride has a disadvantage in that it produces iron hydroxide or stain at the subsequent washing process, thereby impeding the practical use thereof. Persulfate has a disadvantage in that it requires a remarkably long period of time to finish bleaching due to its very weak bleaching effect.

Ferric aminopolycarboxylate complex salts (particularly ferric ethylenediaminetetraacetate complex salts) have less pollution problems and no storage problem as for persulfate and are therefore most widely put into practical use as bleaching agents.

However, it cannot always be said that ferric aminopolycarboxylate has a sufficient bleaching capability.

As a means of expediting the desilvering process there has heretofore been known a combined blixing solution containing ferric aminopolycarboxylate and thiosulfate as described in West German Patent No. 866,605. However, such a combined blixing solution has a disadvantage in that the coexistence of a ferric aminopolycarboxylate complex, which has a weak oxidizing power (bleaching power), with a thiosulfate having a reducing power provides a much weaker bleaching power, making it extremely difficult to fully desilver a color light-sensitive material for photography having a high sensitivity and a high silver content, in particular.

Furthermore, if the processing is conducted with a reduced amount of replenisher of the processing solutions (i.e., bleaching solution, blixing solution and/or fixing solution) to be used in the desilvering of the silver halide color photographic material, in order to protect the environment, save costs, and simplify the processing, silver halide eluted from the light-sensitive material is accumulated in a high concentration as a silver complex in these processing solutions. This causes more precipitate to be produced or reduces the activity of the processing solutions, further weakening the bleaching power thereof. Thus, it was found that a reduction in the amount of replenisher of the processing solution to be used in the desilvering process causes many difficulties.

On the other hand, as a method of improving the bleaching power there has been proposed a method which comprises adding various bleaching accelerators to the bleaching bath, blixing bath, or previous bath (prebath) thereof. Examples of such bleaching accelerators include various mercapto compounds as described in U.S. Pat. No. 3,893,858, British Patent No. 1,138,842, and Japanese Patent Application (OPI) No. 141623/78 (the term "OPI" as used herein refers to a "published unexamined Japanese patent application"), compounds containing disulfide bonds as described in Japanese Patent Application (OPI) No. 95630/78, thiazolidine derivatives as described in Japanese Patent Publication No. 9854/78, isothiourea derivatives as described in Japanese Patent Application (OPI) No. 94927/78, thiourea derivatives as described in Japanese Patent Application (OPI) No. 8506/70, and Japanese Patent Publication No. 26586/74, thioamide compounds as described in Japanese Patent Publication No. 42349/74, dithiocarbamate as described in Japanese Patent Application (OPI) No. 26506/80, and arylenediamine compounds as described in U.S. Pat. No. 4,552,834.

It is certain that among these bleaching agents, those showing a bleach accelerating effect are present. However, those bleaching accelerators leave much to be desired in practicality. For example, some bleaching accelerators are expensive or have insufficient stability in a bath having a bleaching capability.

Furthermore, if the light-sensitive material is processed in a bleaching bath, blixing bath, or prebath thereof containing these various bleaching accelerators, and these bleaching accelerators are compounds containing mercapto groups, these mercapto compounds produce a sparingly soluble silver salt with unexposed silver halide or silver halide produced by the bleaching reaction in the emulsion layer of the light-sensitive material. Such a sparingly soluble silver salt cannot be solubilized by a fixing agent, possibly causing poor fixation.

Thus, the inventors have found that the reduction of the amount of replenisher of the processing solution to be used in the desilvering process causes more silver ions to be accumulated in the desilvering bath, and these silver ions form a sparingly soluble silver salt with the mercapto compound, further reducing the bleach accelerating effect to an insufficient level. The inventors have also found that the presence of iodide ions in the desilvering solution promotes such a reaction.

Furthermore, the above described mercapto compounds include those which react with sulfite ions in the processing solution to undergo decomposition (*Sulfur*

*Dioxide,* L. C. Schroeter, Pergamon Press (1966)). The ordinary blixing solution comprising a thiosulfate as a fixing agent contains a sulfite in combination. Therefore, such a mercapto compound is susceptible to decomposition in the blixing solution.

As described above, the use of such a mercapto bleaching accelerator in the processing solution or its prebath to be used in the desilvering process has many limitations.

On the other hand, there has been known a process which comprises processing a light-sensitive material containing such a mercapto compound or its precursor as described in Japanese Patent Application (OPI) Nos. 135834/87 and 80649/87. However, if such a mercapto compound is contained in a light-sensitive material, it may greatly affect the photographic properties, and silver halide contained in unexposed portions in the light-sensitive material and such a mercapto compound form a sparingly soluble salt. Thus, this approach leaves much to be desired.

SUMMARY OF THE INVENTION

One object of the present invention is to provide a method for processing a silver halide color photographic material which enables rapid desilvering even with a reduced amount of replenisher of a desilvering solution.

Another object of the present invention is to provide a method for processing a color light-sensitive material which is excellent in the blixing capability, particularly in the fixing capability.

A further object of the present invention is to provide a rapid desilvering step which enables the stabilization of the blixing solution.

Still another object of the present invention is to provide a rapid desilvering step which causes fewer pollution problems.

Still a further object of the present invention is to provide a rapid desilvering step which cost less and is more practical than those currently available.

These objects of the present invention are accomplished by providing a method for processing a silver halide color photographic material which comprises imagewise exposing a silver halide color photographic light-sensitive material to light, color-developing the light-sensitive material, and then desilvering the light-sensitive material, wherein: (a) the silver halide color photographic light-sensitive material contains a compound which reacts with an oxidation product of an aromatic primary amine color developing agent to form a bleaching accelerator, (b) the desilvering step is conducted with at least a processing solution containing a ferric complex salt of an organic acid, and (c) the total amount of replenisher of the processing solution to be used in the desilvering step satisfies either the following conditions (i) and (ii):

(i) the total amount of replenisher is 1,000 ml or less per $m^2$ of the light-sensitive material if the coated amount of silver per $m^2$ of the light-sensitive material is 2.0 or more;

(ii) the total amount of replenisher is 400 ml or less per $m^2$ of the light-sensitive material if the coated amount of silver per $m^2$ of the light-sensitive material is less than 2.0 g.

DETAILED DESCRIPTION OF THE INVENTION

When a compound which reacts with an oxidation product of an aromatic primary amine color developing agent to release a bleaching accelerator (hereinafter referred to as "bleaching accelerator-releasing compound") is contained in a light-sensitive material in accordance with the present invention, the result is surprising in that very rapid desilvering can be made to occur even under the above described conditions (i) or (ii) wherein a very small amount of the processing solution is replenished.

Further, the present inventors found that these objects of the present invention are accomplished by a method for the processing of a silver halide color photographic material which comprises imagewise exposing the silver halide color photographic material to light, color-developing the silver halide color photographic material and then desilvering the light-sensitive material with a processing solution having a blixing capability, wherein the silver halide color photographic material contains a compound which reacts with an oxidation product of an aromatic primary amine color developing agent to release a bleaching accelerator, and the processing solution having a blixing capability contains preferably a ferric aminopolycarboxylate complex salt having a molecular weight of 300 or more in the form of a free acid.

On the other hand, *Research Disclosure,* RD Nos. 24242 and 11449, and Japanese Patent Application (OPI) No. 201247/86 describe methods using bleaching accelerator-releasing couplers. In the above described processed method, however, the light-sensitive material is bleached and then fixed after being color-developed. Since such a bleaching accelerator is stable in a bleaching solution so long as the replenished amount of the bleaching solution is in the normal range, the effect of the bleaching accelerator in the case where such a bleaching accelerator-releasing compound is used is similar to that of the case where such a bleaching accelerator is incorporated in the bleaching solution. Thus, the above described method provides no special effects. Furthermore, there has been no teaching that the use of a high molecular weight ferric aminopolycarboxylate complex salt providing a stable blixing solution as described herein can further eliminate the deterioration in the blixing capability, particularly in the fixing capability.

Another method has been proposed which comprises washing a light-sensitive material containing such a bleaching accelerator-releasing compound after being color-developed, and then subjecting the light-sensitive material to blixing. However, it was found that this method has a disadvantage in that the bleaching accelerator is washed out from the light-sensitive material in the washing bath, thereby impeding the expected bleach accelerating effect.

When a light-sensitive material containing the present bleaching accelerator-releasing coupler is color-developed, a bleaching accelerator is released in the vicinity of metal produced by development (hereinafter referred to as "developed silver") in an amount proportional to the amount of developed silver. Since such a bleaching accelerator is transferred to the subsequent desilvering process while being adsorbed by metal, it presumably prevents the reaction with silver ions and/or iodide compound ions which produces precipitates.

Therefore, a light-sensitive material containing the present bleaching accelerator-releasing coupler which has been color-developed is preferably immediately processed with a processing solution having a blixing capability or a processing solution having a fixing capability and then with a processing solution having a blixing capability. If such a light-sensitive material which has been color-developed is washed with water, and then processed with a processing solution having a blixing capability, the bleach accelerating effect is disadvantageously eliminated. In order to prevent such an elimination of the bleach accelerating effect when the light-sensitive material is not immediately processed with a processing solution having a blixing capability or a processing solution having a fixing capability and then with a processing solution having a blixing capability, the light-sensitive material which has been color-developed is preferably immediately processed with a processing solution having a salt concentration of $2\times10^{-3}$ mol/l or more, and then processed with a processing solution having a blixing capability.

The condition (i) wherein the coated amount of silver per $m^2$ of the silver halide photographic material is 2.0 g or more (particularly from 2.0 to 20 g) can be applied to color negative film, color reversal film, color negative film for motion picture, color internegative film, etc. In the present invention, the total amount of replenisher of the processing solution to be used in the desilvering of such light-sensitive materials can be remarkably reduced to 1,000 ml or less, and preferably from 100 to 700 ml, per $m^2$ of the light-sensitive material.

The condition (ii) wherein the coated amount of silver per $m^2$ of the silver halide photographic material is less than 2.0 g (particularly from 0.3 to less than 2.0 g) can be applied to color paper, reversal color paper, automatic positive color paper, color positive paper for motion picture, etc. In the present invention, the total amount of replenisher of the processing solution to be used in the desilvering of such light-sensitive materials can be remarkably reduced to 400 ml or less, preferably 300 ml or less, and particularly preferably from 50 to 300 ml, per $m^2$ of the light-sensitive material.

The desilvering step as mentioned herein normally consists of one or a combination of two or three of processing with a processing solution having a bleaching capability (bleaching), processing with a processing solution having a blixing capability (blixing), and processing with a processing solution having a fixing capability (fixing).

Examples of such a combination include the following:

(1) Bleaching-Fixing
(2) Bleaching-Blixing
(3) Blixing
(4) Fixing-Blixing
(5) Bleaching-Blixing-Fixing
(6) Blixing-Bleaching
(7) Blixing-Fixing In view of the rapid processing, preferred among these combinations is the combination (2) as described in Japanese Patent Application (OPI) No. 143755/86. Also, the combination (3) having less steps may be preferably used for the purpose of simplifying the processing.

In the present invention, the total amount of replenisher of the processing solution to be used in the desilvering means the replenished amount of the processing solution if the desilvering process consists of only one desilvering process as in the combination (3) or the total of the replenished amount of two or more desilvering solutions if the desilvering process consists of two or more desilvering steps as in the combinations (1), (2), (4), (5), (6) and (7).

A preferred example of the bleaching accelerator-releasing compound of the present invention is a compound represented by the formula (I):

$$A_0-(L_0)_p-Z_0 \qquad (I)$$

wherein $A_0$ represents a group which undergoes a reaction with an oxidation product of a developing agent to cause cleavage of the $(L_0)_p-Z_0$ bond; $L_0$ represents a group which undergoes a reaction with a timing group or an oxidation product of a developing agent to cause cleavage of the connection with $Z_0$; $Z_0$ represents a group which exhibits the effect of accelerating bleaching upon cleavage of its connection with $A_0-(L_0)$; and p represents an integer of 1 to 3, with the proviso that when p is a plural number, the plurality of $L_0$ may be the same or different.

Another preferred example of the bleaching accelerator-releasing compound of the present invention is a compound represented by the formula (I'):

$$A_1-(L_1)_a-(L_2)_b-Z_1 \qquad (I')$$

wherein $A_1$ represents a group which undergoes a reaction with an oxidation product of a developing agent to cause cleavage of the $(L_1)_a-(L_2)_b-Z_1$ bond; $L_1$ represents a group which undergoes a reaction with a timing group or an oxidation product of a developing agent to cause cleavage of the $(L_2)_b-Z_1$ bond; $Z_2$ represents a group which undergoes a reaction with a timing group or an oxidation product of a developing agent to cause cleavage of the connection with $Z_1$; $Z_1$ represents a group which exhibits the effect of accelerating bleaching upon cleavage of its connection with $A_1-(L_1)_a-(L_2)_b$; and a and b each represents an integer of 0 or 1.

In the formulae (I) and (I'), $A_0$ and $A_1$ particularly represent coupler residual groups or oxidation reduction groups.

As such coupler residual groups represented by $A_0$ and $A_1$, known coupler residual groups can be used. Examples of such coupler residual groups include yellow coupler residual groups such as open chain ketomethylene type coupler residual groups; magenta coupler residual groups such as the 5-pyrazolone type, pyrazoloimidazole type and pyrazolotriazole type coupler residual groups; cyan coupler residual groups such as the phenol type and naphthol type coupler residual groups; and colorless coupler residual groups such as the indanone type and acetophenone type coupler residual groups. Other preferred examples of such coupler residual groups include heterocyclic coupler residual groups as described in U.S. Pat. Nos. 4,315,070, 4,183,752, 3,961,959 and 4,171,223.

Preferred examples of the coupler residual groups represented by $A_1$ in the formula (I') include coupler residual groups represented by the following formulae (Cp-1), (Cp-2), (Cp-3), (Cp-4), (Cp-5), (Cp-6), (Cp-7), (Cp-8), (Cp-9) and (Cp-10). These couplers advantageously have a high coupling rate.

(Cp-1) 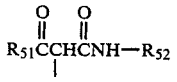

(Cp-2) 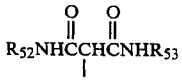

(Cp-3) 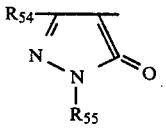

(Cp-4) 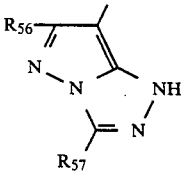

(Cp-5) 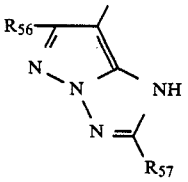

(Cp-6) 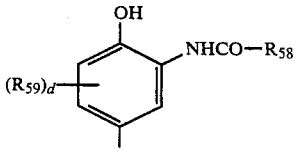

(Cp-7) 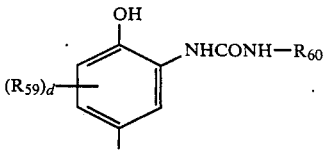

(Cp-8) 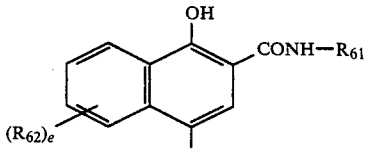

(Cp-9) 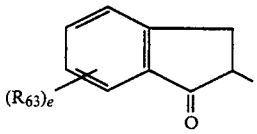

(Cp-10) 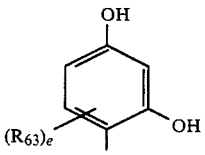

In these formulae, the free bond stemming from the coupling position represents the position at which a coupling-off group is bonded to the coupler.

In these formulae, if $R_{51}$, $R_{52}$, $R_{53}$, $R_{54}$, $R_{55}$, $R_{56}$, $R_{57}$, $R_{58}$, $R_{59}$, $R_{60}$, $R_{61}$, $R_{62}$ or $R_{63}$ contains a nondiffusible group, it is selected such that the total number of carbon atoms contained therein is from 8 to 40, and preferably from 10 to 30, and if it contains no nondiffusible group, it is selected such that the total number of carbon atoms contained therein is preferably 15 or less. If the formulae (I) and (I') are a bis, telomer or polymer type coupler, any one of the above described substitutents $R_{51}$ to $R_{63}$ represents a divalent group which connects repeating units. In this case, the total number of carbon atoms contained in the coupler may not be within the above specified limit.

The substituents $R_{51}$ to $R_{63}$ and the suffixes d and e are further described hereinafter. $R_{41}$ represents an aliphatic, aromatic or heterocyclic group. $R_{42}$ represents an aromatic or heterocyclic group. $R_{43}$, $R_{44}$ and $R_{45}$ each represents a hydrogen atom, an aliphatic group or a heterocyclic group.

$R_{51}$ represents the same group as $R_{41}$. $R_{52}$ and $R_{53}$ each represents the same group as $R_{42}$. $R_{54}$ represents the same group as $R_{41}$ or represents an $R_{41}CON(R_{43})$— group, an $R_{41}N(R_{43})$— group, an $R_{41}SO_2N(R_{43})$— group, an $R_{41}S$— group, an $R_{43}O$— group, an $R_{45}N(R_{45})$—CO—$N(R_{44})$— group, or an N≡C— group. $R_{55}$ represents the same group as $R_{41}$. $R_{56}$ and $R_{57}$ each represents the same group as $R_{43}$ or represents an $R_{41}S$— group, an $R_{43}O$— group, an $R_{41}CON(R_{43})$— group, or an $R_{41}SO_2N(R_{43})$— group.

$R_{58}$ represents the same group as $R_{41}$. $R_{59}$ represents the same group as $R_{41}$ or represents as $R_{41}CON(R_{43})$— group, an $R_{41}OCON(R_{43})$— group, an $R_{41}SO_2N(R_{43})$— group, an $R_{43}N(R_{44})$—CO—$N(R_{45})$— group, an $R_{41}O$— group, an $R_{41}S$— group, a halogen atom, or an $R_{41}N(R_{43})$— group.

The suffix d represents an integer of 0 to 3. When d is a plural number, the plurality of $R_{59}$ may be the same or different or may be divalent groups which connect each other to form a cyclic structure. Typical examples of such divalent groups include the following compounds:

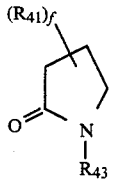

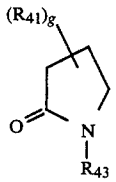

wherein f represents an integer of 0 to 4; and g represents an integer of 0 to 2. $R_{60}$ represents the same group as $R_{41}$. $R_{61}$ represents the same group as $R_{41}$. $R_{62}$ represents the same group as $R_{41}$ or represents an $R_{41}CONH$— group. $R_{62}$ represents the same group as $R_{41}$ or represents an $R_{41}OCONH$— group, an $R_{41}SO_2NH$— group, an $R_{43}N(R_{44})$—CO—$N(R_{45})$— group, an $R_{43}NSO_2N(R_{44})(R_{45})$— group, an $R_{43}O$— group, an $R_{41}S$— group, a halogen atom, or an $R_{41}N(R_{43})$— group.

$R_{63}$ represents the same group as $R_{41}$ or represents an $R_{43}N(R_{44})$—CO—$N(R_{45})$— group, an $R_{43}NCO(R_{44})$— group, an $R_{41}SO_2N(R_{44})$— group, an $R_{43}NSO_2(R_{44})$— group, an $R_{41}SO_2$— group, an $R_{43}OCO$— group, an $R_{43}O$—$SO_2$— group, a halogen atom, a nitro group, a cyano group or an $R_{43}CO$— group. The suffix e represents an integer of 0 to 4. When there are a plurality of $R_{62}$ or $R_{63}$, these may be the same or different.

In the foregoing description, the aliphatic group is a saturated or unsaturated, chain or cyclic, straight chain or branched, substituted or unsubstituted aliphatic hydrocarbon group (having from 1 to 32 carbon atoms and preferably from 1 to 22 carbon atoms). Typical examples of such an aliphatic hydrocarbon group include a methyl group, an ethyl group, a propyl group, an isopropyl group, a butyl group, a t-butyl group, an i-butyl group, a t-amino group, a hexyl group, a cyclohexyl group, a 2-ethylhexyl group, an octyl group, a 1,1,3,3-tetramethylbutyl group, a decyl group, a dodecyl group, a hexadecyl group and an octadecyl group.

The above described aromatic group is a substituted or unsubstituted phenyl group or a substituted or unsubstituted naphthyl group, having from 6 to 20 carbon atoms.

The above described heterocyclic group is preferably a 3- to 5-membered substituted or unsubstituted heterocyclic group (having from 1 to 20 carbon atoms and preferably from 1 to 7 carbon atoms) containing atoms selected from nitrogen, oxygen and sulfur as hetero atoms. Typical examples of such a heterocyclic group include a 2-pyridyl group, a 2-chienyl group, a 2-furyl group, a 1-imidazolyl group, a 1indolyl group, a phthalimide group, a 1,3,4-thiadiazole-2-yl group, a 2-quinolyl group, a 2,4-dioxo-1,3-imidazolidine-5-yl group, a 2,4-dioxo-1,3-imidazolidine-3-yl group, a succinimide group, a 1,2,4-triazole-2-yl group and a 1-pyrazolyl group.

When the above described aliphatic hydrocarbon group, aromatic group and heterocyclic group contain substituents, typical examples of such substituents include halogen atoms, an $R_{47}O$— group, an $R_{46}S$— group, an $R_{47}CON(R_{48})$— group, an $R_{47}NCO(R_{48})$—group, an $R_{46}OCON(R_{47})$— group, an $R_{46}SO_2N(R_{47})$— group, an $R_{47}NSO_2(R_{48})$— group, an $R_{46}SO_2$— group, an $R_{47}OCO$— group, an $R_{47}$—$N(R_{48})$—CO—$N(R_{49})$— group, a group having the same means as $R_{46}$, an

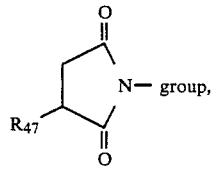

an $R_{46}COO$— group, an $R_{47}OSO_2$— group, a cyano group, and a nitro group. In the above described formulae, $R_{46}$ represents an aliphatic group, an aromatic group or a heterocyclic group, and $R_{47}$, $R_{48}$ and $R_{49}$ each represents an aliphatic group, n aromatic group, a heterocyclic group or a hydrogen atom. The aliphatic groups, aromatic groups or heterocyclic groups have the same meanings as described above.

Preferred examples of $R_{51}$ to $R_{63}$, and d and e will be described hereinafter.

$R_{51}$ is preferably an aliphatic group or an aromatic group.

$R_{52}$, $R_{53}$ and $R_{55}$ each is preferably an aromatic group.

$R_{54}$ is preferably an $R_{41}COHN$— group or an $R_{41}$—$N(R_{43})$— group.

$R_{56}$ and $R_{57}$ each is preferably an aliphatic group, an $R_{41}O$— group or an $R_{41}S$— group. $R_{58}$ is preferably an aliphatic group or an aromatic group. In the formula (Cp-6), $R_{59}$ is preferably a chlorine atom, an aliphatic group or an $R_{41}CONH$— group. The suffix d is preferably 1 or 2. $R_{60}$ is preferably an aromatic group. In the formula (Cp-7), $R_{59}$ is preferably an $R_{41}CONH$— group. In the formula (Cp-7), the suffix d is preferably 1. $R_{61}$ is preferably an aliphatic group or an aromatic group. In the formula (Cp-8), the suffix e is preferably 0 or 1. $R_{62}$ is preferably an $R_{41}OCONH$— group, an $R_{41}CONH$— group or an $R_{41}SO_2NH$— group. These substituents preferably substitute the hydrogen atom in the 5-position of the naphthol ring. In the formula (Cp-9), $R_{63}$ is preferably an $R_{41}CONH$— group, an $R_{41}SO_2NH$— group, an $$R_{41}\underset{\underset{R_{43}}{|}}{N}SO_2\text{—group,}$$

an $R_{41}SO_2$— group, an $$R_{41}\underset{\underset{R_{43}}{|}}{N}CO\text{—group,}$$

a nitro group or a cyano group. In the formula (Cp-10), $R_{63}$ is preferably an $$R_{43}\underset{\underset{R_{43}}{|}}{N}CO\text{—group,}$$

an $R_{43}CCO$— group or an $R_{43}CO$— group.

Typical examples of $R_{51}$ to $R_{63}$ will be described hereinafter.

Examples of $R_{51}$ include a t-butyl group, a 4-methoxyphenyl group, a phenyl group, a 3-[2-(2,4-di-t-amylphenoxy)butanamido]phenyl group and a methyl group. Examples of $R_{52}$ and $R_{53}$ include a 2-chloro-5-dodecyloxycarbonylphenyl group, a 2-chloro-5-hexadecylsulfonamidophenyl group, a 2-chloro-5-tetradecanamidophenyl group, a 2-chloro-5-[4(2,4-di-t-amylphenoxy)butanamido]phenyl group, a 2-chloro-5-[2-(2,4-di-t-amylphenoxy)butanamido]phenyl group, a 2-methoxyphenyl group, a 2-methoxy-5-tetradecyloxycarbonylphenyl group, a 2-chloro-5-chloro-5-(1-ethoxycarbonylethoxycarbonyl)phenyl group, a 2-pyridyl group, a 2-chloro-5-octyloxycarbonylphenyl group, a 2,4-dichlorophenyl group, a 2-chloro-5-(1-dodecyloxycarbonylethoxycarbonyl)phenyl group, a 2-chlorophenyl group and a 2-ethoxyphenyl group.

Examples of $R_{54}$ include a 3-[2-(2,4-di-t-amylphenoxy)butanamido]benzamide group, a 3-[4-(2,4-di-t-amylphenoxy)butnamido]benzamide group, a 2-chloro-5-tetradecanamidoaniline group, a 5-(2,4-di-t-amylphenoxyacetamido)benzamide group, a 2-chloro-5-dodecenylsuccinimidoanilino group, a 2-chloro-5-[2-(3-t-butyl-4-hydroxyphenoxy)tetradecanamido]anilino group, a 2,2-dimethylpropanamide group, a 2-(3-pentadecylphenoxy)butanamide group, a pyrrolidino group and an N,N-dibutylamino group. Preferred examples of $R_{55}$ include a 2,4,6-trichlorophenyl group, a 2-chlorophenyl group, a 2,5-dichlorophenyl group, a 2,3-dichlorophenyl group, a 2,6-dichloro-4-methoxyphenyl group, a 4-[2-(2,4-di-t-amylphenoxy)butanamido]phenyl group and a 2,6-dichloro-4-methanesulfonylphenyl group. Examples of $R_{56}$ include a methyl group, an ethyl group, an isopropyl group, a methoxy group, an ethoxy group, a methylthio group, an ethylthio group, a 3-phenylureido group and a 3-(2,4-di-t-amylphenoxy)propyl group. Examples of $R_{57}$ include a 3-(2,4-di-t-amylphenoxy)propyl group, a 3-[4-{2-[4-(4-hydroxyphenylsulfonyl)-phenoxy]tetradecanamido}phenyl]-propyl group, a methoxy group, a methylthio group, an ethylthio group, a methyl group, a 1-methyl-2-{2-octyloxy-5-[2-octyloxy-5-(1,1,3,3-tetramethylbutyl)phenylsulfonamido]phenylsulfonamido} ethyl group, a 3-[4-(4-dodecyloxyphenylsulfonamido)phenyl]propyl group, a 1,1-dimethyl-2-[2-octyloxy-5-(1,1,3,3-tetramethylbutyl)phenylsulfonamido]ethyl group and a dodecylthio group. Examples of $R_{58}$ include a 2-chlorophenyl group, a pentafluorophenyl group, a heptafluoropropyl group, a 1-(2,4-di-t-amylphenoxy)propyl group, a 3-(2,4-di-t-amylphenoxy)propyl group, a 2,4-di-t-amylmethyl group and a furyl group. Examples of $R_{59}$ include a chlorine atom, a methyl group, an ethyl group, a propyl group, a butyl group, an isopropyl group, a 2-(2,4-di-t-amylphenoxy)-butanamide group, a 2-(2,4-di-t-amylphenoxy)hexanamide group, a 2-(2,4-di-t-octylphenoxy)octanamide group, a 2-(2-chlorophenoxy)tetradecanamide group, a 2-[4-(4-hydroxyphenylsulfonyl)phenoxy]-phenoxy]tetradecanamide group and a 2-[2-(2,4-di-t-amylphenoxyacetamido)phenoxy]butanamide group. Examples of $R_{60}$ include a 4-cyanophenyl group, a 2-cyanophenyl group, a 4-butylsulfonylphenyl group, a 4-propylsulfonylphenyl group, a 4-chloro-3-cyanophenyl group, a 4-ethoxycarbonylphenyl group and a 3,4-dichlorophenyl group. Example of $R_{61}$ include a dodecyl group, a hexadecyl group, a cyclohexyl group, a 3-(2,4-di-t-amylphenoxy)propyl group, a 4-(2,4-di-t-amylphenoxy)butyl group, a 3-dodecyloxypropyl group, a t-butyl group, a 2-methoxy-5-dodecyloxycarbonylphenyl group and a 1-naphthyl group. Examples of $R_{62}$ include an isobutyloxycarbonylamino group, an ethoxycarbonylamino group, a phenylsulfonylamino group, a methanesulfonamide group, a benzamide group, a trifluoroacetamide group, a 3-phenylureido group, a butoxycarbonylamino group and an acetamide group. Examples of $R_{63}$ include a 2,4-di-t-amylphenoxyacetamide group, a 2-(2,4-di-t-amylphenoxy)-butanamide group, a hexadecylsulfonamide group, an N-methyl-N-octadecylsulfamoyl group, an N,N-dioctylsulfamoyl group, a 4-t-octylbenzoyl group, a dodecyloxycarbonyl group, a chlorine atom, a nitro group, a cyano group, an N-[4-(2,4-di-t-amylphenoxy)butyl]carbamoyl group, an N-3-(2,4-di-t-amylphenoxy)propylsulfamoyl group, a methanesulfonyl group and a hexadecylsulfonyl group.

If $A_0$ in the formula (I) represents an oxidation reduction group, the present compound is specifically represented by the formula (II):

$$A_{11}—P—(X{=}Y)_n—Q—A_{12} \qquad \text{(II)}$$

wherein P and Q each independently represents an oxygen atom or a substituted or unsubstituted imino group; at least one of n number of X and Y represents a methine group containing $—(L_1)_a—(L_2)_b—Z_1$ as a substituent and the other X and Y each represents a substituted or unsubstituted methine group or a nitrogen atom; n represents an integer of 1 to 3 (n number of X and Y may be the same or different); and $A_{11}$ and $A_{12}$ each represents a hydrogen atom or a group removable by an alkali. Any two substituents of P, X, Y, Q, $A_{11}$ and $A_{12}$ may be divalent groups which are connected to each other to form a cyclic structure. For example, $(X{=}Y)_n$ may form a benzene ring or a pyridine ring.

When P and Q each represents a substituted or unsubstituted imino group, they are each preferably an imino group substituted by a sulfonyl group or an acyl group.

In this case, P and Q are each represented by the following formulae:

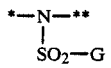

(N-1)

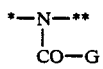

(N-2)

wherein the mark * represents the position at which the imino group is bonded to $A_{11}$ or $A_{12}$ and the mark ** represents the position at which the imino group is bonded to one of the free bonds of $-(X{=}Y)_n-$.

In the above described formulae, preferred examples of the group represented by G include straight chain or branched, chain or cyclic, saturated or unsaturated, substituted or unsubstituted aliphatic groups, having from 1 to 32 carbon atoms and preferably from 1 to 22 carbon atoms such as a methyl group, an ethyl group, a benzyl group, a phenoxybutyl group and an isopropyl group, a substituted or unsubstituted aromatic group having from 6 to 10 carbon atoms such as a phenyl group, a 4-methylphenyl group, a 1-naphthyl group and a 4-dodecyloxyphenyl group, and 4- to 7-membered heterocyclic groups containing as a hetero atom an atom selected from a nitrogen atom, a sulfur atom and an oxygen atom such as a 2-pyridyl group, a 1-phenyl-4-imidazolyl group, a 2-furyl group and a benzochienyl group.

In the formula (II), P and Q preferably each independently represents an oxygen group or a group represented by the formula (N-1).

When $A_{11}$ and $A_{12}$ each represents a group removable by an alkali (hereinafter referred to as "precursor group"), preferred examples of such a precursor group include hydrolyzable groups such as an acyl group, an alkoxycarbonyl group, an aryloxycarbonyl group, a carbamoyl group, and a sulfonyl group, precursor groups of the type using the reverse Michael reaction as described in U.S. Pat. No. 4,009,029, precursor groups of the type using as an intramolecular nucleophilic group an anion produced upon a ring cleavage reaction as described in U.S. Pat. No. 4,310,612, precursor groups which undergo electronic migration of anions through a conjugated system to cause a ring cleavage reaction as described in U.S. Pat. Nos. 3,674,478, 3,932,480 and 3,993,661, precursor groups which undergo electronic migration of anions after a ring cleavage reaction to cause a cleavage reaction, and precursor groups using an imidomethyl group as described in U.S. Pat. Nos. 4,363,865 and 4,410,618.

In the formula (II), P is preferably an oxygen atom, and $A_{12}$ is preferably a hydrogen atom.

In the formula (II), the other X and Y which is not a methine group having an $-(L_1)_a-(L_2)_b-Z_1$ group each is preferably a substituted or unsubstituted methine group.

Particularly preferred among groups represented by the formula (II) are those represented by the formulae (III) or (IV):

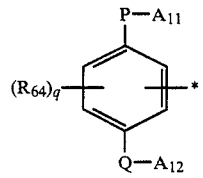

(III)

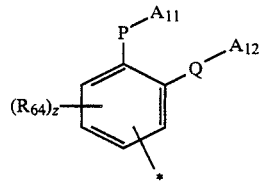

(IV)

wherein the mark * represents the position at which it is bonded to $-(L_1)_a-(L_2)_b-Z_1$; P, Q, $A_{11}$ and $A_{12}$ have the same meanings as described with reference to the formula (II); $R_{64}$ represents a substituent; and q represents an integer of 0 to 3. When g is 2 or 3, the two or more $R_{64}$ may be the same or different. when the two $R_{64}$ are substituents on adjacent carbon atoms, they may be divalent groups which are connected to each other to form a cyclic structure. Examples of such a cyclic structure include benzene condensed rings such as naphtahalene, benzonortholunene, chroman, indole, benzothiophene, quinoline, benzofuran, 2,3-dihydrobenzofuran, indane and indene. These cyclic structures may further contain one or more substituents. Preferred examples of such substituents and $R_{64}$ containing no condensed rings include an $R_{41}$ group, a halogen atom, an $R_{43}O-$ group, an $R_{43}S-$ group, an

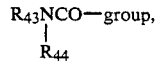

an $R_{43}OOC-$ group, an $R_{41}SO_2-$ group, an

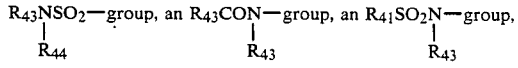

an $R_{43}CO-$ group, an $R_{41}COO-$ group, an

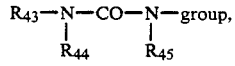

a cyano group and an

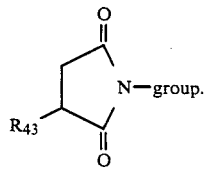

In the above described formulae, $R_{41}$, $R_{43}$, $R_{44}$ and $R_{45}$ represent the same meanings as in the above described formulae (I) and (I'). Typical examples of $R_{64}$ include a methyl group, an ethyl group, a t-butyl group, a methoxy group, a methylthio group, a dodecylthio group, a 3-(2,4-di-t-amylphenoxy)propylthio group, an N-3-(2,4-di-t-amylphenoxy)propylcarbamoyl group, an N-methyl-N-octadecyloxycarbamoyl group, a methoxycarbonyl group, a dodecyloxycarbonyl group, a propylcarbamoyl group, a hydroxyl group, and an N,N-dioctylcarbamoyl group. Examples of a cyclic structure formed by two $R_{64}$ include a group represented by the formula:

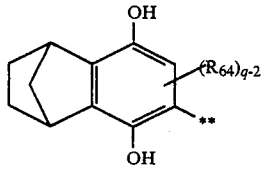

In the formulae (III) and (IV), P and Q each preferably represents an oxygen atom.

In the formulae (III) and (IV), $A_{11}$ and $A_{12}$ each preferably represents a hydrogen atom.

In the formula (I'), the group represented by $L_1$ or $L_2$ may or may not be used in the present invention. Such a group is preferably not used in the present invention but may be optionally used depending on the purpose. When $L_1$ and $L_2$ each represents a timing group, examples of such a timing group include the following known connecting groups:

(1) Group using hemiacetal cleavage reaction:

Examples of such a group include those represented by the undermentioned formula (T-1) as described in U.S. Pat. No. 4,146,396 and Japanese Patent Application (OPI) Nos. 249148/85 and 249149/85. The mark * represents the position at which the group is bonded to the left hand of the group of the formula (II), and the mark ** represents the position at which the group is bonded to the right hand of the group of the formula (II).

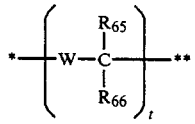

(T-1)

wherein W represents an oxygen atom, a sulfur atom, or an

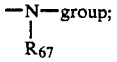

$R_{65}$ and $R_{66}$ each represents a hydrogen atom or a substituent; $R_{67}$ represents a substituent; and t represents an integer of 1 or 2. When t is 2, the two groups

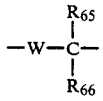

may be the same or different. Typical examples of the substitutents represented by $R_{65}$, $R_{66}$ and $R_{67}$ include an $R_{69}$ group, an $R_{69}CO$— group, an $R_{69}SO_2$— group, an

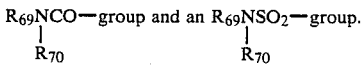

In these formulae, $R_{69}$ represents the same group as $R_{41}$ in the formulae (I) and (I'), and $R_{70}$ represents the same group as $R_{43}$ in the formulae (I) and (I'), $R_{65}$, $R_{66}$ and $R_{67}$ may be divalent groups which are connected to each other to form a cyclic structure. Specific examples of the group represented by the formula (T11) include the following groups:

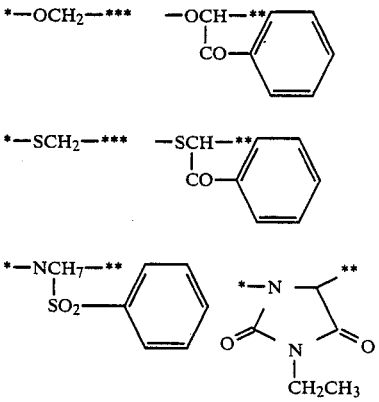

(2) Group which uses an intramolecular nucleophilic substitution reaction to cause a cleavage reaction:

Examples of such a group include timing groups as described in U.S. Pat. No. 4,248,962. Such timing groups can be represented by the formula (T-2):

*—Nu—Link—E—** (T-2)

wherein the mark * represents the position at which the timing group is bonded to the left hand of the group of the formula (II); the mark  represents the position at which the timing group is bonded to the right hand of the group of the formula (II); Nu represents a nucleophilic group containing as a nucleophilic atom an oxygen atom or a sulfur atom; E represents an electrophilic group capable of cleaving its connection with the mark  upon a nucleophilic attack by Nu; and Link represents a connecting group which gives a steric relation between Nu and E such that they can undergo an intramolecular nucleophilic substitution reaction. Specific examples of the group represented by the formula (T-2) include the following groups:

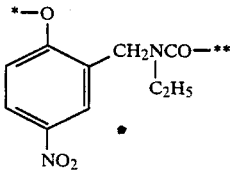

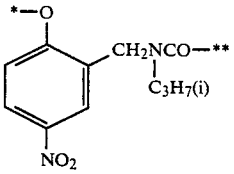

-continued

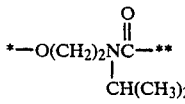

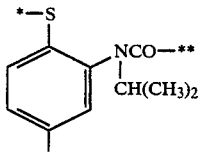

(3) Group which uses electronic migration through a conjugated system to cause a cleavage reaction:

Examples of such a group include those represented by the undermentioned formula (T-3) as described in U.S. Pat. Nos. 4,409,323 and 4,21,845.

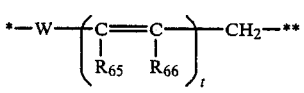

(T-3)

wherein the marks * and **, W, $R_{65}$, $R_{66}$ and t have the same meanings as described with reference to the formula (T-1). Specific examples of the group represented by the formula (T-3) include the following groups:

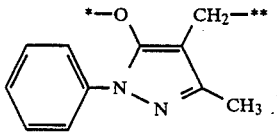

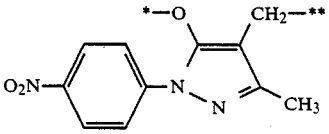

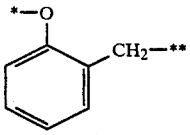

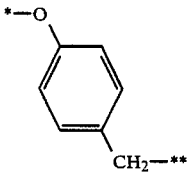

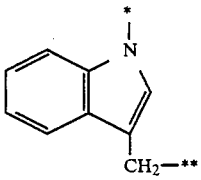

(4) Group using a cleavage reaction by hydrolysis of ester:

Examples of such a group include connecting groups as described in West German Patent Application (OLS) No. 2,626,315. These connecting groups may be represented by the following formulae:

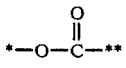

(T-4)

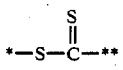

(T-5)

wherein the marks * and ** have the same meanings as described with reference to the formula (T-1).

(5) Group using a cleavage reaction of iminoketal:

Examples of such a group include connecting groups represented by the undermentioned formula (T-6) as described in U.S. Pat. No. 4,546,073.

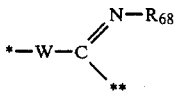

(T-6)

wherein the marks * and **, and W have the same meanings as described with reference to the formual (T-1); and $R_{68}$ has the same meaning as $R_{67}$. Specific examples of the group represented by the formula (T-6) include the following groups:

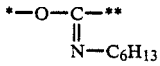

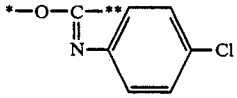

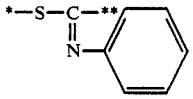

In the formula (I'), when the group represented by $L_1$ represents a group which undergoes a reaction with an oxidation product of a developing agent after cleavage from $A_1$ to cause cleavage of the $(L_2)_b$—$Z_1$ bond, it specifically represents a group which becomes a coupler or an oxidation reduction group after cleavage from $A_1$. Similarly, when the group represented by $L_2$ represents a group which undergoes a reaction with an oxidation product of a developing agent after cleavage from $A_1$—$(L_1)_b$ to cause cleavage of the connection with $Z_1$, it specifically represents a group which becomes a coupler or an oxidation reduction group after cleavage from $A_1$—$(L_1)_b$.

In such a group which becomes, for example, a phenolic coupler, it is bonded to $A_1$— or $A_1$—$(L_1)_b$— at the oxygen atom of a hydroxyl group free of the hydrogen atom. In such a group which becomes a 5-pyrazolone type coupler, it is bonded to $A_1$— or $A_1$—$(L_1)_b$— at the oxygen atom of hydrogen free hydroxyl group in tautomerism with 5-hydroxypyrazole. In these cases, such a group is separated from $A_1$— or $A_1$—$(L_1)_b$— to become a phenolic coupler or a 5-pyrazolone type coupler. These coupling positions have $(L_2)_b$—$Z_1$ or $Z_1$.

Preferred examples of $L_1$ and $L_2$ which each represents a group which becomes a coupler include groups represented by the undermentioned formulae (V), (VI), (VII) and (VIII). In these formulae, the mark * represents the position at which the group is bonded to the left hand of the group of the formula (I), and the mark ** represents the position at which the group is bonded to the right hand of the group of the formula (I).

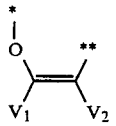

(V)

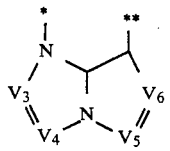

(VI)

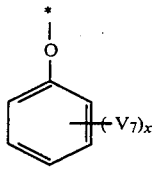

(VII)

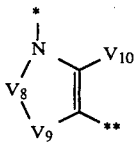

(VIII)

where $V_1$ and $V_2$ each represents a substituent; $V_3$, $V_4$, $V_5$ and $V_6$ each represents a nitrogen atom or a substituted or unsubstituted methine group; $V_7$ represents a substituent; x represents an integer of 0 to 4; $V_8$ represents a —CO— group, an —$SO_2$— group, an oxygen atom or a substituted imino group; $V_9$ represents nonmetallic atomic groups which form a 5- to 8-membered ring together with

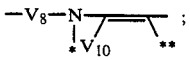

and $V_{10}$ represents a hydrogen atom or a substituent, with the proviso that when x is a plural number, the plurality of $V_7$ may be the same or different or two $V_7$ may be connected to each other to form a cyclic structure, and that $V_1$ and $V_2$ may be divalent groups which are connected to each other to form a 5- to 8-membered ring together with

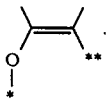

$V_1$ preferably represents an $R_{71}$ group. Preferred examples of $V_2$ include an $R_{72}$ group, an $R_{72}CO$— group, an

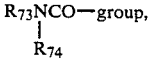

an $R_{72}SO_2$— group, an $R_{72}S$— group, an $R_{72}O$— group and an

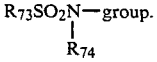

Examples of the cyclic ring formed by the connection of $V_1$ and $V_2$ include indene, indole, pyrazole and benzothiophene.

Preferred examples of the substituents represented by $V_3$, $V_4$, $V_5$ and $V_6$ which represent a substituted methine group include an $R_{71}$ group, and $R_{73}O$— group, an $R_{71}S$— group and an $R_{71}CONH$— group.

Preferred examples of $V_7$ include a halogen atom, an $R_{71}$ group, an $R_{71}CONH$— group, an $R_{71}SO_2NH$— group, an $R_{73}O$— group, an $R_{71}S$— group, an

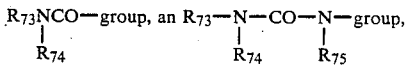

an $R_{71}CO$— group and an $R_{73}OOC$ group. Examples of the cyclic structure formed by the linkage of a plurality of $V_7$ include naphathalene, quinoline, oxyindole, benzodiazepine-2,4-dione, benzimidazole-2-one and benzothiophene.

Preferred examples of the substituted imino group represented by $V_8$ include an $R_{73}<$ group.

Preferred examples of the cyclic structure which is formed by $V_9$ together with

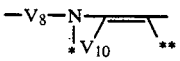

include indole, imidazolinone, 1,2,5-thiazoline-1,1-dioxide, 3-pyrazoline-5-one, 3-isooxazoline-5-one and

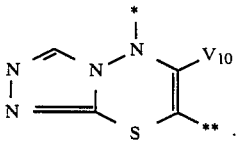

Preferred examples of $V_{10}$ include an $R_{73}$— group, an $R_{73}O$— group, an

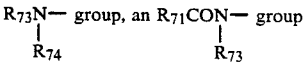

and an $R_{71}S$— group.

In the foregoing description, $R_{71}$ and $R_{72}$ each represents an aliphatic group, an aromatic group or a heterocyclic group, and $R_{73}$, $R_{74}$ and $R_{75}$ each represents a hydrogen atom, an aliphatic group, an aromatic group or a heterocyclic group. The aliphatic group, the aromatic group and the heterocyclic group have the same meanings as described with reference to $R_{41}$ in the formulae (I) and (I'), with the proviso that the total number of carbon atoms contained in each of these groups is preferably 10 or less.

Typical examples of the group represented by the formula (V) include the following groups:

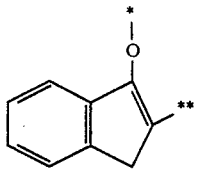
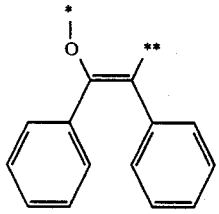
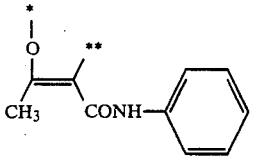
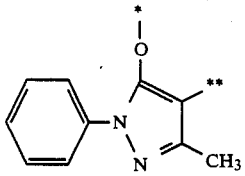
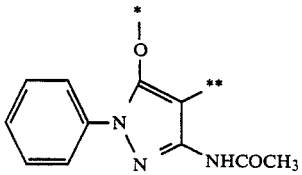
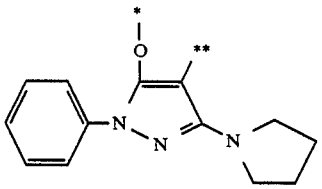
Typical examples of the group represented by the formula (VI) include the following groups:
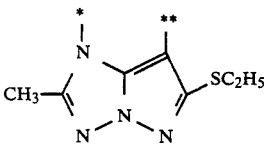
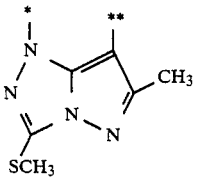
-continued
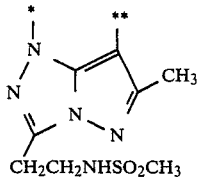
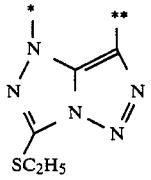
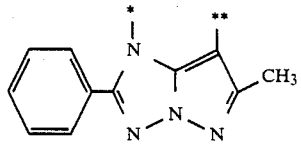
Typical examples of the group represented by the formula (VII) include the following groups:
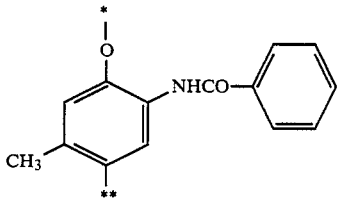
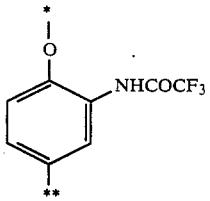
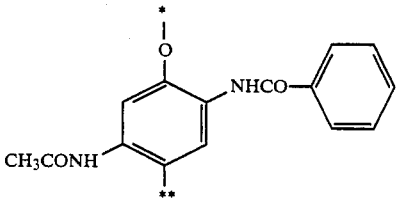
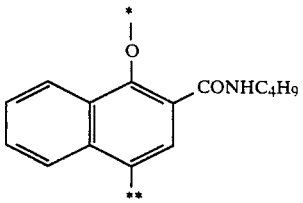

-continued

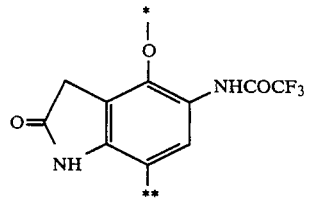

Typical examples of the group represented by the formula (VIII) include the following groups:

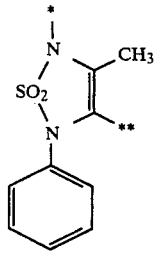

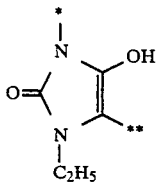

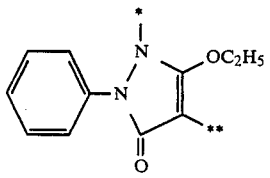

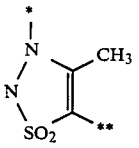

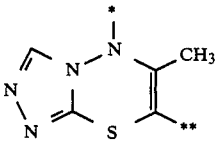

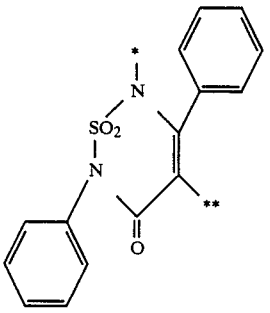

In the formula (I'), when the group represented by $L_1$ and $L_2$ represents a group which becomes an oxidation reduction group, it preferably is a group represented by the formula (IX):

$$*-P'-(X'=Y')_{n'}-Q'-A'_2 \quad \text{(IX)}$$

wherein the mark * represents the position at which the group is bonded to the left hand of the group of the formula (I'); $A'_2$, P', Q' and n' have the same meanings as described in $A_{12}$, P, Q and n in the formula (II); and at least one of n' number of X' and Y' represents a methine group containing $-(L_2)-Z_1$ or $Z_1$ as a substituent and the other X' and Y' each represents a substituted or unsubstituted methine group or nitrogen atom. Any two substituents selected from $A'_2$, P', Q', X' and Y' may be divalent groups which are connected to each other to form a cyclic structure. Examples of such a cyclic structure include a benzene ring and a pyridine ring.

In the formula (IX), P' preferably represents an oxygen atom, and Q' preferably represents an oxygen atom or a grouop represented by the undermentioned formulae. In these formulae, the mark * represents the position at which the group is bonded to $(X'=Y')_{n'}$, and the mark ** represents the position at which the group is bonded to $A'_2$.

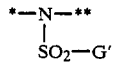

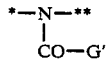

wherein G' has the same meaning as described in G in the formulae (N-1) and (N-2).

Q' is particularly preferably an oxygen atom or a group represented by

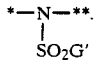

Particularly preferred among the groups represented by the formula (IX) are those represented by the following formulae (X) and (XI):

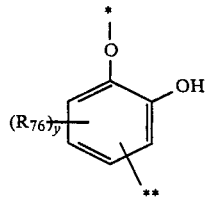

(X)

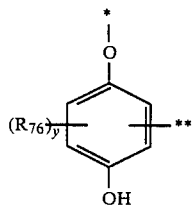

(XI)

wherein the mark * represents the position at which the group is bonded to the left hand of the group of the formula (I); the mark ** represents the position at which the group is bonded to the right hand of the group of the formula (I); $R_{76}$ has the same meaning as $R_{64}$ in the formulae (III) or (IV); and y represents an integer of 0 to 3, with the proviso that when y is a plural number, the plurality of $R_{76}$ may be the same or different or two of these $R_{76}$ may be connected to each other to form a cyclic structure.

Particularly preferred examples of $R_{76}$ include an alkoxy group such as a methoxy group and an ethoxy group; an acylamino group such as an acetamide group and a benzamide group; a sulfonamide group such as a methanesulfonamide group and a benzenesulfonamide group; an alkylthio group such as a methylthio group and an ethylthio group; a carbamoyl group such as an N-propylcarbamoyl group, an N-t-butylcarbamoyl group and an N-i-propylcarbamoyl group; an alkoxycarbonyl group such as a methoxycarbonyl group and a propoxycarbonyl group; an aliphatic group such as a methyl group and a t-butyl group; a halogen atom such as a fluorine atom and a chlorine atom; a sulfamoyl group such as an N-propylsulfamoyl group and a sulfamoyl group; an acyl group such as an acetyl group and a benzoyl group; a hydroxyl group and a carboxyl group. Typical examples of the cyclic structure formed by the connection of two $R_{76}$ include a group represented by the following formula:

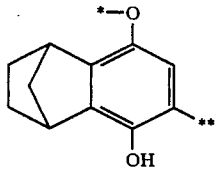

wherein the marks * and ** have the same meanings as described with reference to the formula (XI).

In the formula (I'), the group represented by $Z_1$ specifically represents a known bleaching accelerator residual group. Examples of such a bleaching accelerator residual group include various mercapto compounds as described in U.S. Pat. No. 3,893,858, British Patent No. 1,138,842, and Japanese Patent Application (OPI) No. 141623/78; compounds containing a disulfide bond as described in Japanese Patent Application (OPI) No. 95630/78; thiazolidine derivatives as described in Japanese Patent Publication No. 9854/78; isothiourea derivatives as described in Japanese Patent Application (OPI) No. 94927/78; thiourea derivatives as described in Japanese Patent Publication Nos. 8506/70 and 26586/74; thioamide compounds as described in Japanese Patent Application (OPI) No. 42349/74; dithiocarbamates as described in Japanese Patent Application (OPI) No. 26506/80; and arylenediamine compounds as described in U.S. Pat. No. 4,552,834. These compounds are preferably bonded to $A_1$—$(L_1)_a$—$(L_2)_b$— in the formula (I') at a substitutable hetero atom contained in the molecule.

Particularly preferred examples of the group represented by $Z_1$ include groups represented by the following formulae (XII), (XIII) and (XIV):

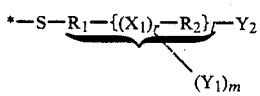

(XII)

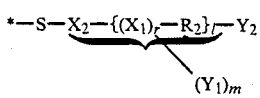

(XIII)

-continued

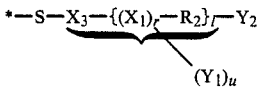

(XIV)

wherein the mark * represents the position at which the group is bonded to A—$(L_1)_a$—$(L_2)_b$—; $R_1$ represents a divalent aliphatic group having from 1 to 8 carbon atoms and preferably from 1 to 5 carbon atoms; $R_2$ has the same meaning as $R_1$ or represents a divalent aromatic group or a 3- to 8-membered, preferably 5- or 6-membered divalent heterocyclic group having from 6 to 10 carbon atoms; $X_1$ represents—O—,—S—,—COO—,—$SO_2$—,

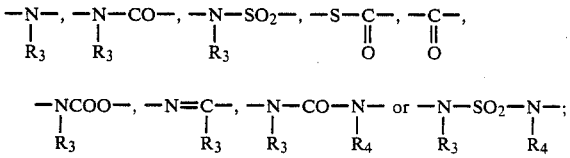

$X_2$ represents an aromatic group having from 6 to 10 carbon atoms; $X_3$ represents a 3- to 8-membered, preferably 5- or 6-membered heterocyclic group containing at least one carbon atom bonded to S in the ring; $Y_1$ represents a carboxyl group or a salt thereof, a sulfo group or a salt thereof, a hydroxyl group, a phosphonic acid group or a salt thereof, an amino group which may be substituted by an aliphatic group having from 1 to 4 carbon atoms, or an —$NHSO_2$—$R_5$ or —$SO_2NH$—$R_5$ group (the term "salt" as used herein means a sodium salt, a potassium salt or an ammonium salt); $Y_2$ represents a hydrogen atom or a group having the same meaning as described with reference to $Y_1$; r represents an integer of 0 or 1; l represents an integer of 0 to 4; m represents an integer of 1 to 4; and u represents an integer of 0 to 4, with the proviso that m number of $Y_1$ are bonded to each substitutable position in $R_1$—$\{(X_1)_r$—$R_2\}_l$ and $X_2$—$\{(X_1)_r$—$R_2\}_l$, that u number of $Y_1$ are bonded to each substitutable position in $X_3$—$\{(X_1)_r$—$R_2\}_l$, that when m is a plural number, m number of $Y_1$ may be the same or different, and that when l is a plural number, l number of $\{(X_1)_r$—$R_2\}$ may be the same or different. In the above formulae, $R_3$, $R_4$ and $R_5$ each represents a hydrogen atom or an aliphatic group having from 1 to 8 carbon atoms and preferably from 1 to 5 carbon atoms. The aliphatic group represented by $R_1$ or $R_5$ may be a chain or cyclic, straight chain or branched, saturated or unsaturated, substituted, or unsubstituted, preferably unsubstituted aliphatic group. Examples of substituents for the substituted aliphatic group represented by $R_1$ or $R_5$ include a halogen atom, an alkoxy group such as a methoxy group and an ethoxy group; and an alkylthio group such as a methylthio group and an ethylthio group.

The aromatic group represented by $X_2$ or $R_2$ may contain substituents. Examples of such substituents include those described with reference to the aliphatic group represented by $R_1$ or $R_5$.

The heterocyclic group represented by $X_3$ or $R_2$ is a saturated or unsaturated, substituted or unsubstituted heterocyclic group containing as a hetero atom an oxygen atom, a sulfur atom or a nitrogen atom. Examples of such a heterocyclic group include a pyridine ring, an imidazole ring, a piperidine ring, an oxirane ring, a sulforane ring, an imidazolidine ring, a thiazepine ring and a pyrazole ring. Examples of substitutents for such heterocyclic groups include those described with reference to the aliphatic group represented by $R_1$ or $R_5$.

Specific examples of the group represented by the formula (XII) include the following groups:

$-SCH_2CH_2CO_2H$, $-SCH_2CO_2H$.

$-SCH_2CH_2N(CH_3)_2$, $-SCH_2CH(OH)CH_2OH$, $-SCH_2CH_2NH_2$, $-SCH_2CH(NH_2)CO_2H$, $-S(CH_2)_2C(=O)CH_2OH$, $-SCH_2CH_2NHCOCH_3$ $-S(CH_2)_4CO_2H$, $-SCH(CH_3)CO_2H$ $-SCH_2CONHCH_2CO_2H$,
$-SCH_2CH_2OCH_2CO_2H$,
$-SCH_2COOCH_2CH_2OH$,
$-SCH_2CH_2OCH_2CH_2OCH_2CH_2OH$,

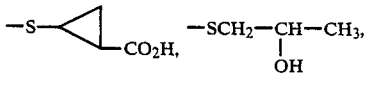

$-SCH_2CH_2SCH_2CO_2H$,
$-SCH_2CH_2CH_2CO_2H$,

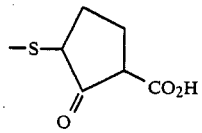

Specific examples of the group represented by the formula (XIII) include the following groups:

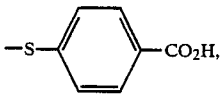

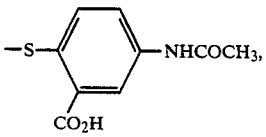

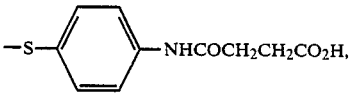

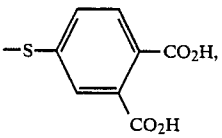

-continued

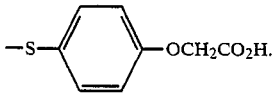

Specific examples of the group represented by the formula (XIV) include the following groups:

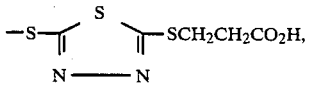

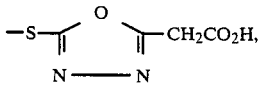

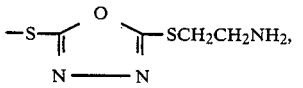

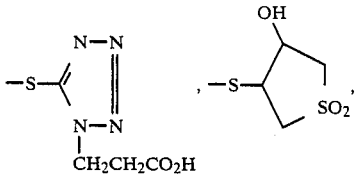

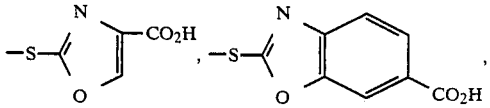

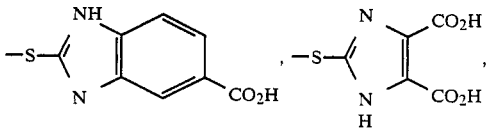

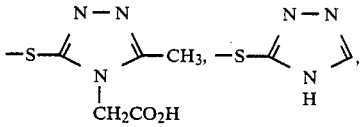

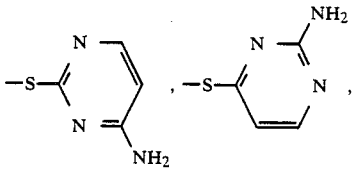

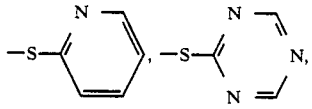

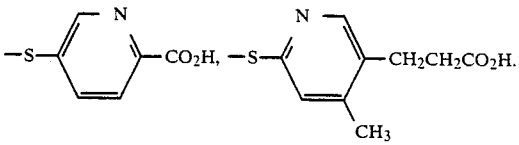

Examples of the compound represented by the formula (I') include bis, telomer, and polymer compounds.

Examples of such a polymer compound include a polymer containing repeating units represented by the formula (XVI) derived from a monomer represented by the formula (XV) and a copolymer of one or more noncoloring monomers containing at least one ethylene group incapable of coupling with an oxidation product of an aromatic primary amine developing agent. Two or more monomers represented by the formula (XV) may be polymerized at the same time.

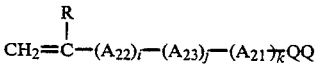

(XV)

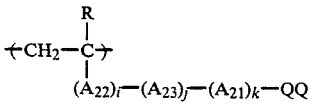

(XVI)

wherein R represents a hydrogen atom, a lower alkyl group having from 1 to 4 carbon atoms or a chlorine atom; $A_{21}$ represents—CONH —, —NHCONH—, —NHCOO—, —COO—, —$SO_2$—,—CO—, —NH-CO—, —$SO_2$NH—, —NH$SO_2$—, —OCO—, —OCONH—, —NH—or —O—; $A_{22}$ represents —CONH— or —COO—; and $A_{23}$ represents a substituted or unsubstituted alkylene group, an aralkylene group or an arylene group. Such an alkylene group may be a straight chain or branched group. Examples of such an alkylene group include methylene, methylmethylene, dimethylmethylene, dimethylene, trimethylene, tetramethylene, pentamethylene, hexamethylene and decylmethylene. Examples of the aralkylene group represented by $A_{23}$ include benzylidene. Examples of the arylene group represented by $A_{23}$ include phenylene and naphthylene.

In the formula (XV) or (XVI), QQ represents a residual group of the compound represented by the formula (I'). QQ may be bonded to the main body of the group represented by the formula (XV) or (XVI) at any position in the substituent as described with reference to the residual group of the compound represented by the formula (I') except for the group represented by $Z_1$.

The suffixes i, j and k each represents 0 to 1 but are not 0 at the same time.

Examples of the substituents for the alkylene group, the aralkylene group or the arylene group represented by $A_{23}$ include an aryl group such as a phenyl group; a nitro group; a hydroxyl group; a cyano group; a sulfo group; an alkoxy group such as a methoxy group; an aryloxy group such as a phenoxy group; an acyloxy group such as an acetoxy group; an acylamino group such as an acetylamino group; a sulfonamide group such as a methanesulfonamide group; a sulfamoyl group such as a methylsulfamoyl group; a halogen atom such as fluorine, chlorine and bromine; a carboxyl group; a carbamoyl group such as a methylcarbamoyl group; an alkoxycarbonyl group such as a methoxycarbonyl group; and a sulfonyl group such as a methylsulfonyl group. When two or more of these substitutents are contained in the alkylene group, the aralkylene group or the arylene group represented by $A_{23}$, they may be the same or different.

Examples of the noncoloring ethylenic monomer incapable of coupling with an oxidation product of an aromatic primary amine developing agent include an acrylic acid, an α-chloroacrylic acid, an α-alkylacrylic acid and ester or amide derived from these acrylic acids, methylenebisacrylamide, a vinyl ester, acrylonitrile, an aromatic vinyl compound, maleic acid derivatives and vinylpyridines. Two or more of these noncoloring ethylenically unsaturated monomers may be used at the same time.

In the formula (I'), any two of the groups represented by $A_1$, $L_1$, $L_2$ and $Z_1$ may optionally contain bonding hands other than the bonding hand represented by the formula (I'). This second bonding hand can provide the effects of the present invention without being severed upon development. Examples of such a bonding hand include the following bonding hands:

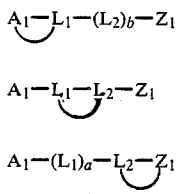

Particularly preferred among these bonding hands is one represented by the formula (XVII):

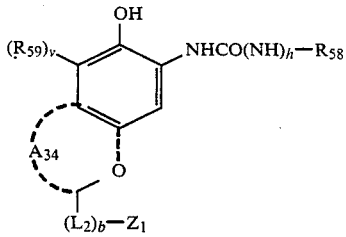

(XVII)

wherein $L_2$, b, $Z_1$, $R_{58}$ and $R_{59}$ have the same meanings as in the formula (I') described above; h and v each represents an integer of 0 to 1; and $A_{34}$ represents a divalent organic residual group which forms a 5- to 8-membered ring. Examples of the divalent organic residual group represented by $A_{34}$ include —O—CH<,

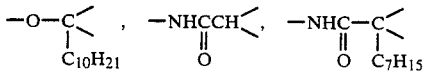

and —S—CH< groups.

Specific examples of the bleaching accelerator-releasing compound to be used in the present invention will be described hereinafter, but the present invention should not be construed as being limited thereto.

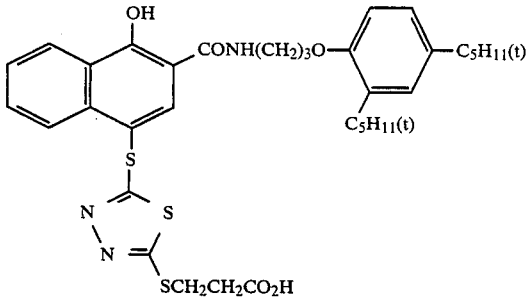
(1)
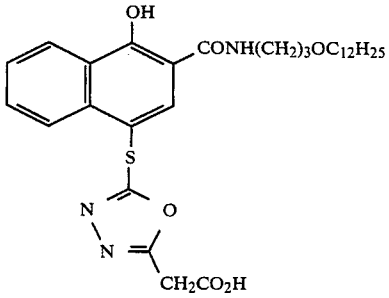
(2)
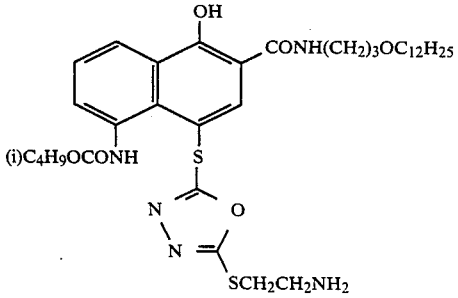
(3)
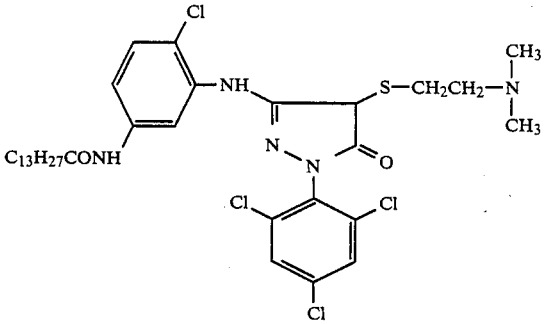
(4)
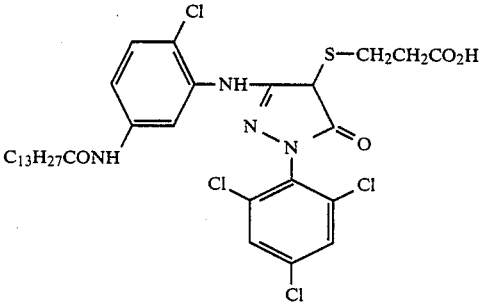
(5)

-continued
(6)
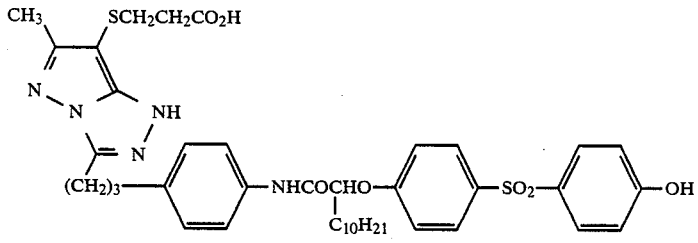
(7)
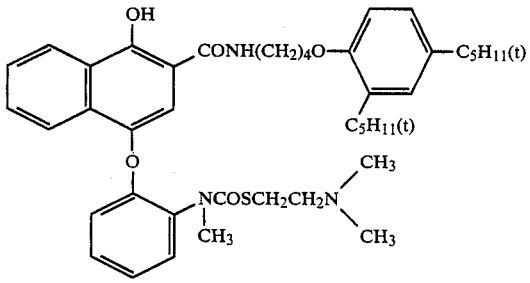
(8)
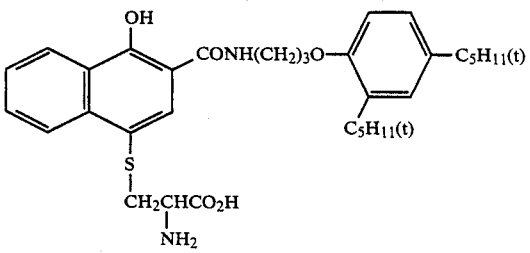
(9)
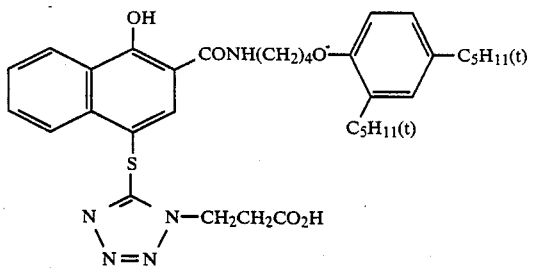
(10)
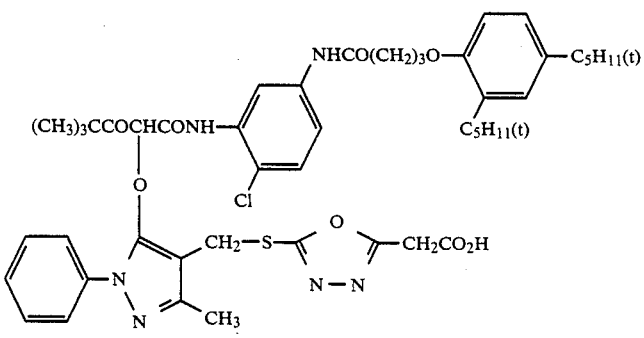

-continued
(11)
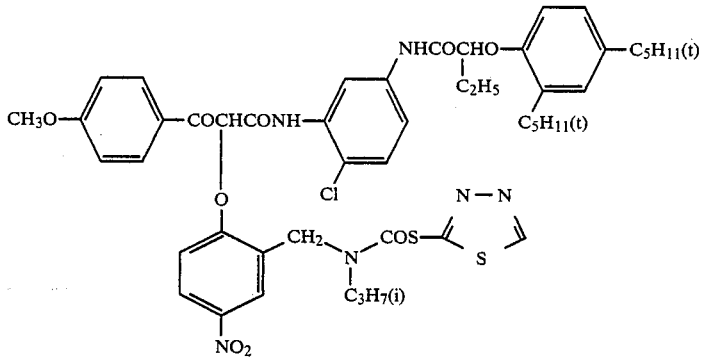
(12)
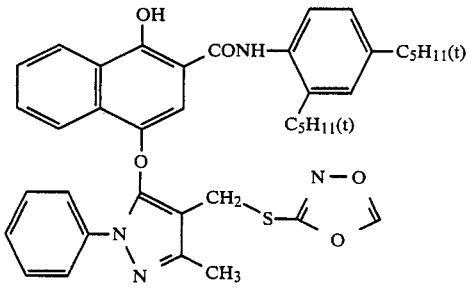
(13)
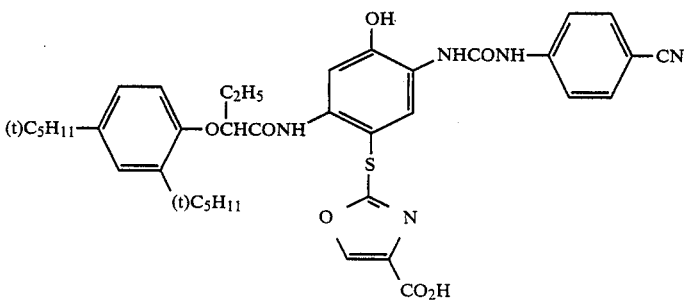
(14)
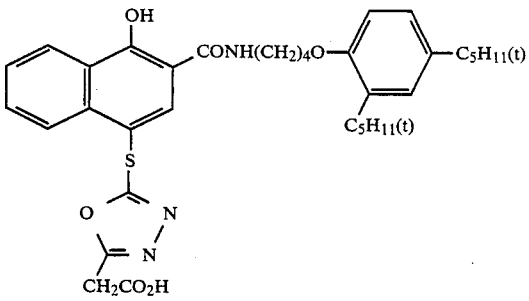
(15)
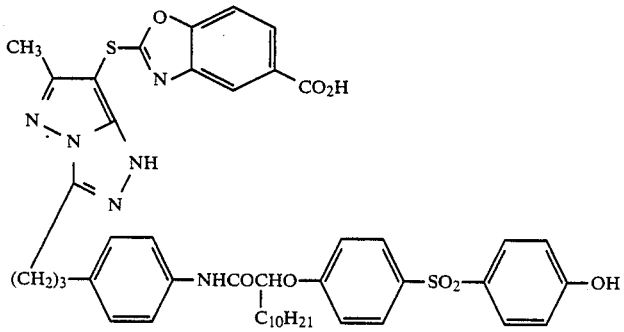

-continued
(16)
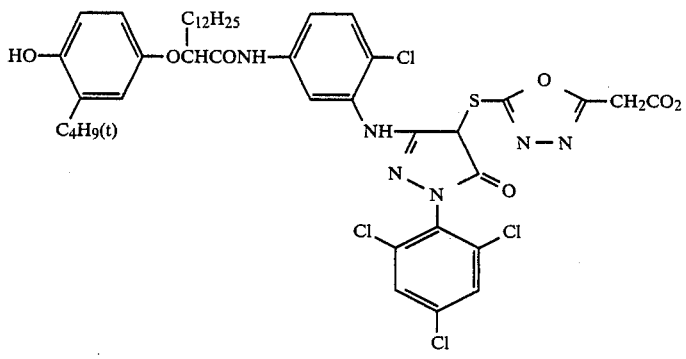
(17)
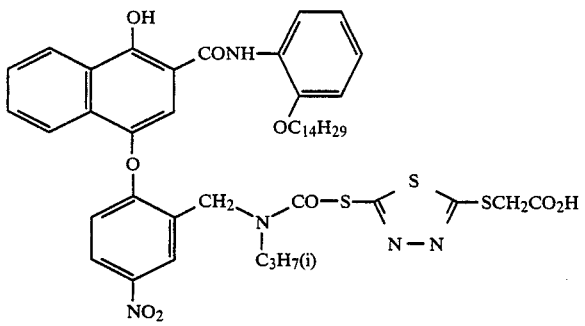
(18)
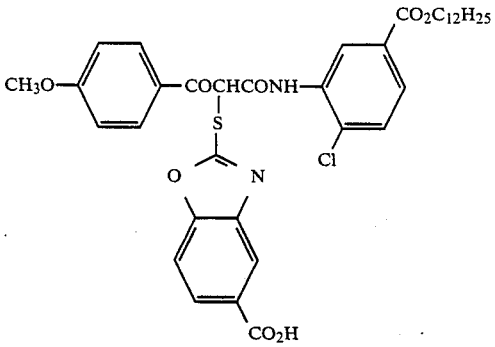
(19)
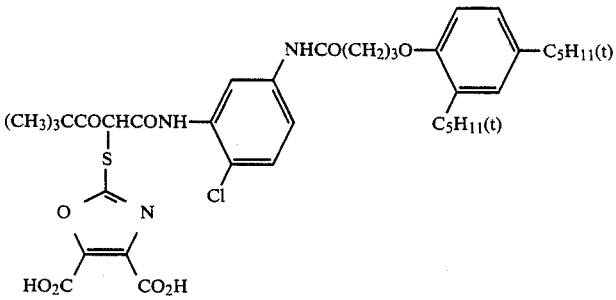

-continued
(20)
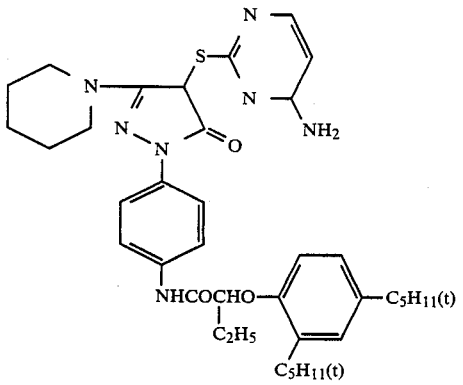
(21)
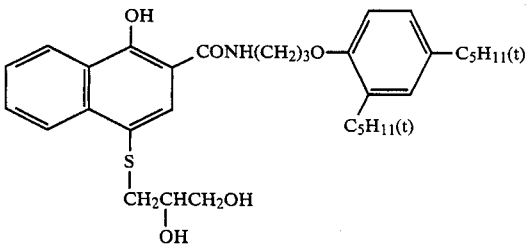
(22)
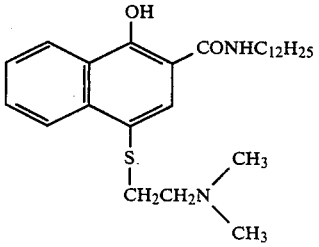
(23)
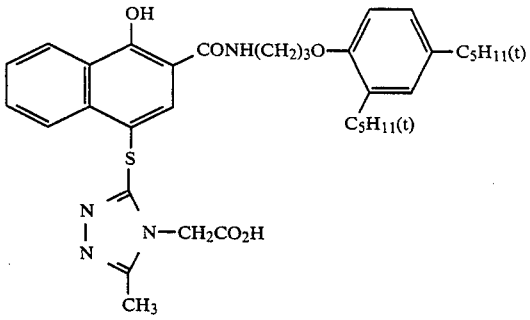
(24)
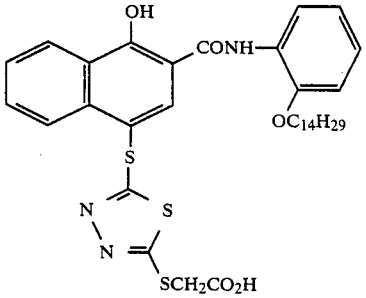

-continued
(25)
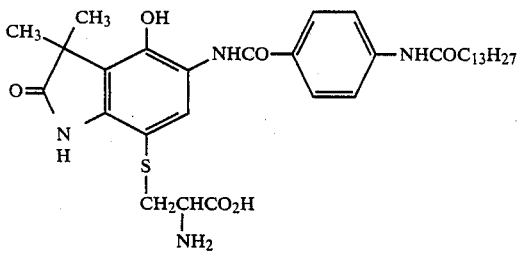
(26)
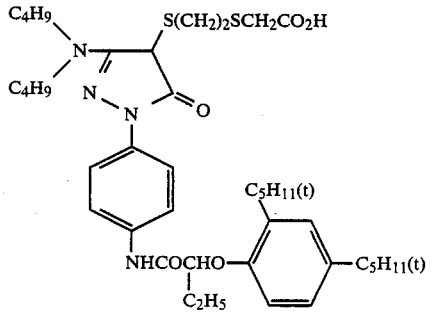
(27)
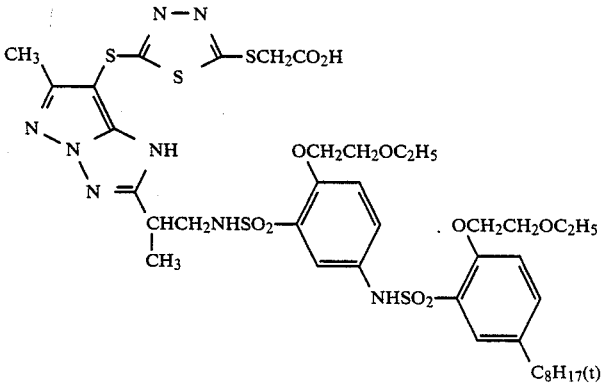
(28)
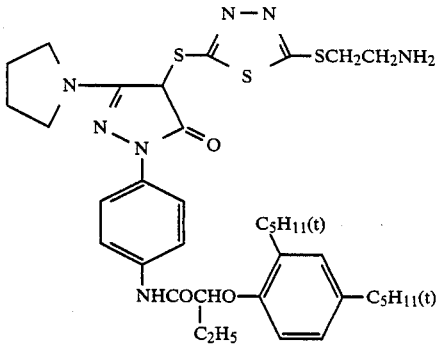
(29)
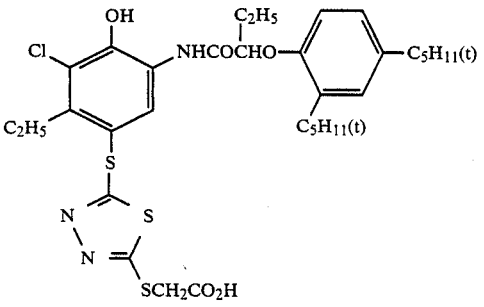

-continued
(30)
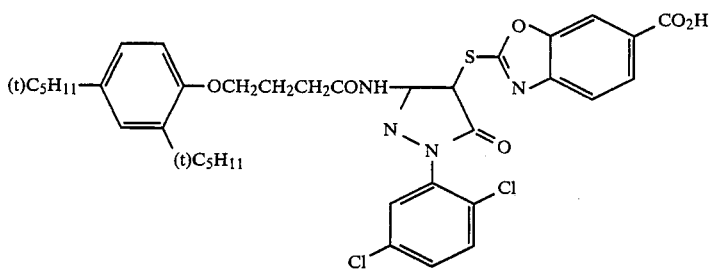
(31)
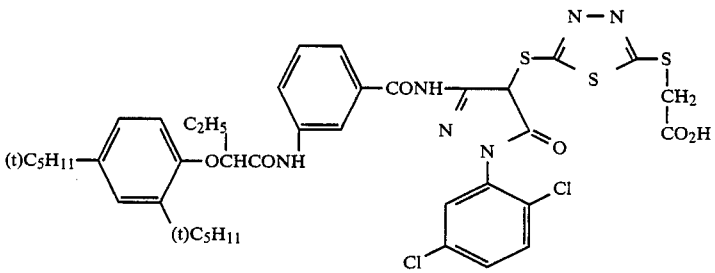
(32)
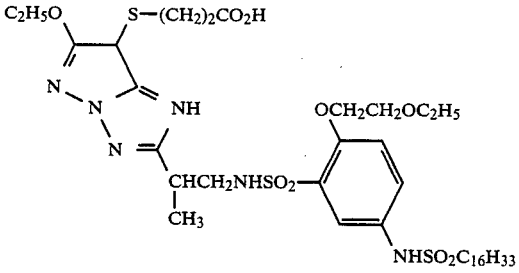
(33)
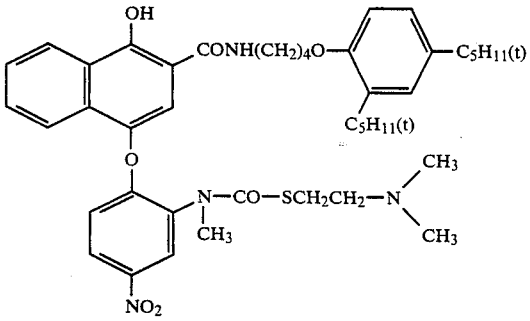
(34)
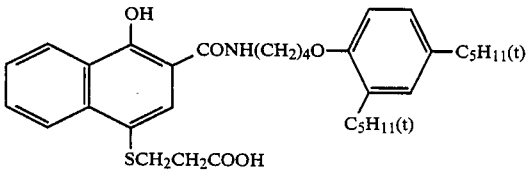
(35)
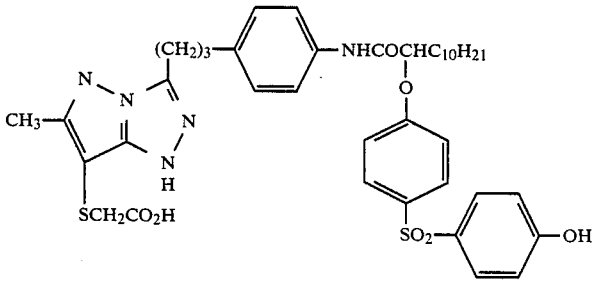

-continued
(36)
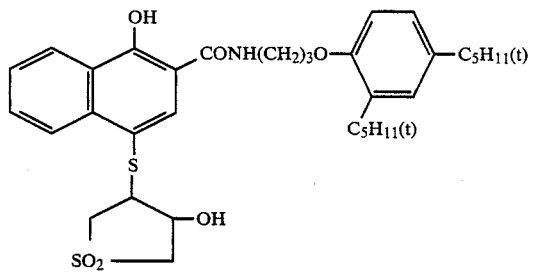
(37)
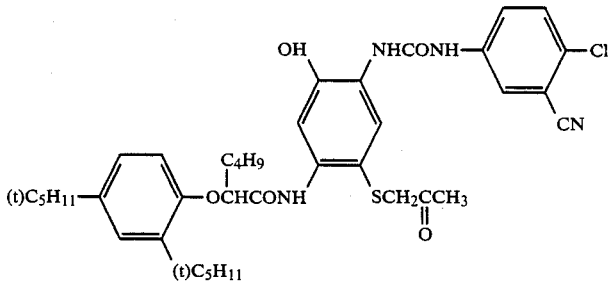
(38)
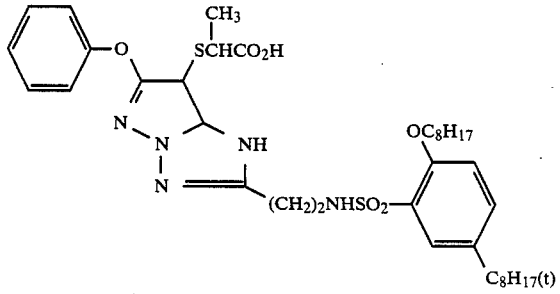
(39)
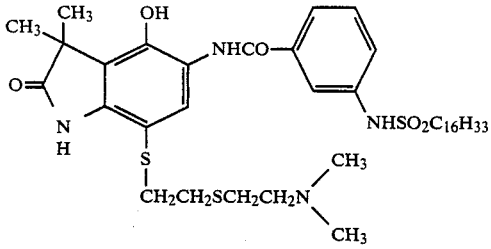
(40)
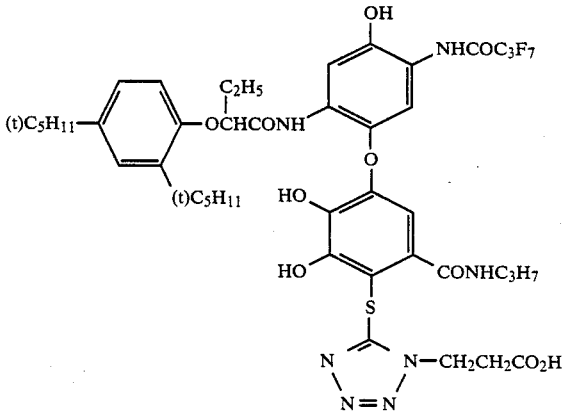

-continued
(41)
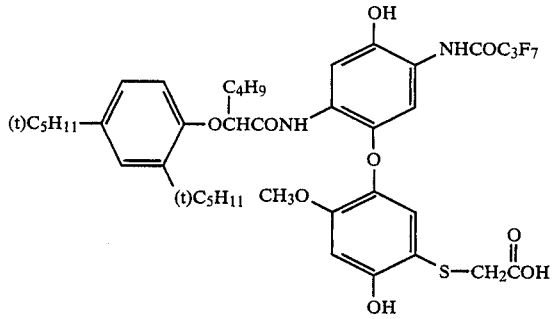
(42)
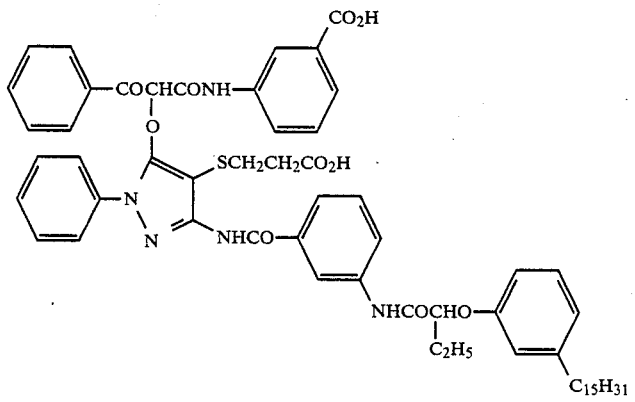
(43)
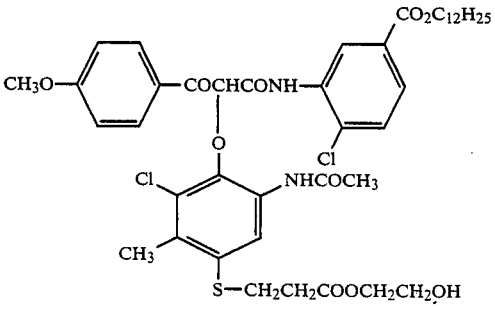
(44)
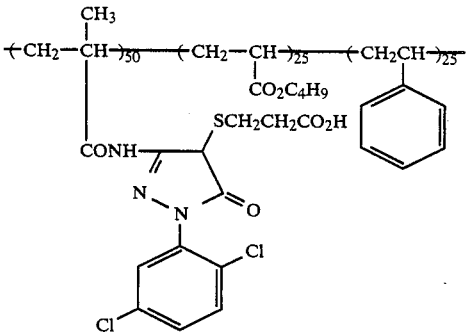
(45)
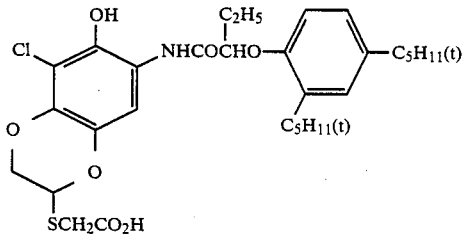

-continued
(46)
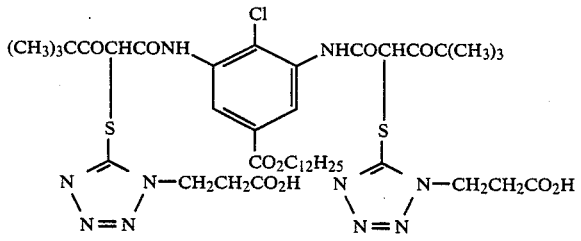
(47)
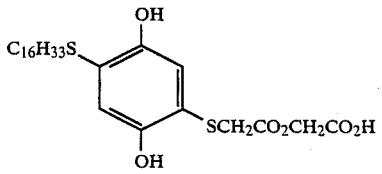
(48)
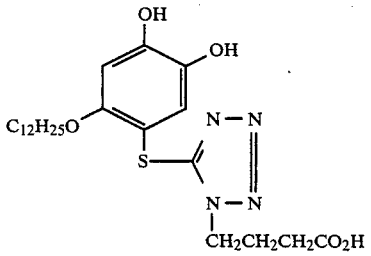
(49)
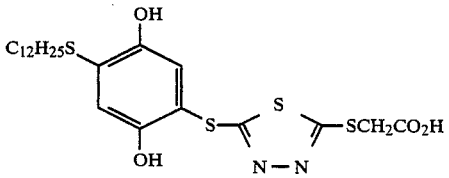
(50)
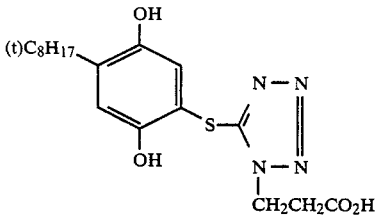
(51)
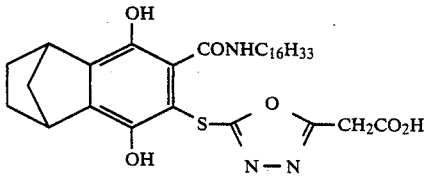
(52)
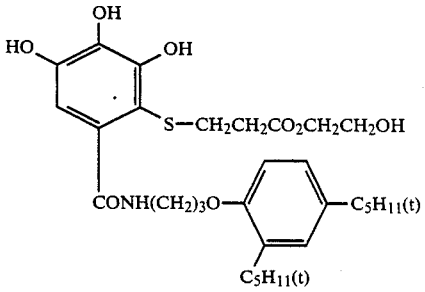

-continued (53)

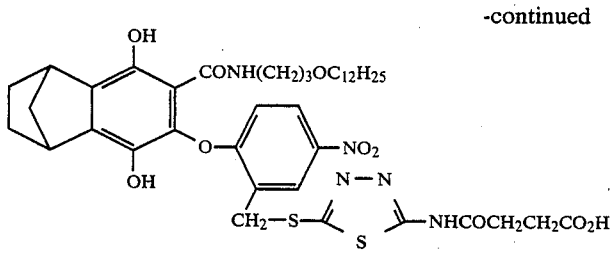

Other examples of the bleaching accelerator-releasing compound which can be used in the present invention include those described in *Research Disclosure,* RD Nos. 24241 and 11449, Japanese Patent Application (OPI) No. 201247/86, and Japanese Patent Application Nos. 252847/86, 268870/86 and 268871/86.

The synthesis of the bleaching accelerator-releasing compound to be used in the present invention may be easily accomplished in accordance with the description in the above described patents.

The amount of the bleaching accelerator-releasing compound of the present invention to be added to the light-sensitive material is preferably in the range of from $1\times10^{-7}$ to $1\times10^{-1}$ mol, particularly from $1\times10^{-6}$ to $5\times10^{-2}$ mol, per $m^2$ of the light-sensitive material. The bleaching accelerator-releasing compound may be incorporated into any layers in the light-sensitive material but is preferably incorporated into a light-sensitive emulsion layer. The more light-sensitive emulsion layers the present compound is incorporated in, the more remarkable the effects of the present invention become.

The desilvering step of the present invention may be two steps in which the bleaching step and fixing step are separately carried out, but is preferably one step (one bath) in which only bleach step is carried out.

The processing solution of the present invention having a blixing capability is described hereinafter. Examples of a bleaching agent to be used for the processing solution of the present invention having a blixing capability include oxidizing agents such as a ferric complex salt, e.g., an iron ferricyanide complex salt and a ferric citrate complex salt, persulfate, and peroxide, e.g., hydrogen peroxide. Preferred examples of such a bleaching agent include a ferric aminopolycarboxylate complex salt, and a complex of ferric ion with an aminopolycarboxylic acid or a salt thereof.

Particularly preferred bleaching agents to be used for the processing solution of the present invention having a blixing capability is a ferric aminopolycarboxylate complex salt having a molecular weight of generally 300 or more, preferably from 300 to 600, and particularly preferably from 300 to 500, in the form of a free acid.

Typical examples of such an aminopolycarboxylic acid and a salt thereof include the following compounds:

A- 1: Diethylenetriaminepentaacetic acid
A- 2: Pentasodium diethylenetriaminepentaacetate
A- 3: Ethylenediamine-N-(β-oxyethyl)-N,N',N'-triacetic acid
A- 4: Trisodium ethylenediamine-N-(β-oxyethyl)-N,N',N'-triacetate
A- 5: Triammonium ethylenediamine-N-(β-oxyethyl)-N,N',N'-triacetate
A- 6: 1,2-Diaminopropanetetraacetic acid
A- 7: Disodium 1,2-diaminopropanetetraacetate
A- 8: Nitrilotriacetic acid
A- 9: Sodium nitrilotriacetate
A-10: Cyclohexanediaminetetraacetic acid
A-11: Disodium cyclohexanediaminetetraacetate
A-12: N-Methyliminodiacetic acid
A-13: Iminodiacetic acid
A-14: Dihydroxyethyl glycine
A-15: Ethyletherdiaminetetraacetic acid
A-16: Glycoletherdiaminetetraacetic acid
A-17: Ethylenediaminetetrapropionic acid
A-18: 1,3-Diaminepropanetetraacetic acid
A-19: Ethylenediaminetetraacetic acid
A-20: 1,2-Propylenediaminetetraacetic acid, or alkaline metal salts or ammonium salts thereof
A-21: Triethylenetetraminehexaacetic acid, or alkaline salts or ammonium salts thereof
A-22: 1,4-Diaminobutanetetraacetic acid or alkaline salts or ammonium salts thereof
A-23: 2-Propanoldiaminetetraacetic acid or alkaline salts or ammonium salts thereof
A-24: 1,3-Butylenediaminetetraacetic acid or alkaline salts or ammonium salts thereof The present invention should not be construed as being limited to these exemplary compounds.

Among theses, preferred compounds are A-1, A-2, A-6, A-7, A-10, A-11, A-12, A-16 and A-18. A particularly preferred compound is diethylenetriaminepentaacetic acid (A-1).

Such a ferric aminopolycarboxylate complex salt may be used in the form of a complex salt. Alternatively, a ferric salt such as ferric sulfate, ferric chloride, ferric ammonium sulfate and ferric phosphate may be used with an aminopolycarboxylic acid to form a ferric ion complex salt in the solution. When the ferric salt is used in the form of a complex salt, one or more complex salts may be used. On the other hand, when a ferric salt and an aminopolycarboxylic acid are used to form a complex salt in a solution, one or more ferric salts may be used. Furthermore, one or more aminopolycarboxylic acids may be used. In any case, an aminopolycarboxylic acid may be used in an excess amount beyond the amount required to form a ferric ion complex salt.

Alternatively, a combination of at least one of ferric aminopolycarboxylate complex salts except for A-19 and a ferric ethylenediaminetetraacetate complex salt may be used.

The processing solution capable of blixing containing the above described ferric complex salt may contain a complex salt of a metal ion other than a ferric ion such as cobalt, nickel and copper.

The content of bleaching agent per liter of the present processing solution having a blixing capability is in the range of 0.1 to 1 mol and preferably 0.2 to 0.5 mol. The pH value of the bleaching bath is preferably in the range of 4.0 to 8.0 and particularly preferably 5.0 to 7.5.

The processing bath of the present invention having a blixing capability may contain a rehalogenizing agent such as bromide, e.g., potassium bromide, sodium bromide and ammonium bromide; and chloride, e.g., potassium chloride, sodium chloride and ammonium chloride besides a bleaching agent and the above described compounds. Other examples of compounds which may be incorporated into the present processing bath include various known additives such as inorganic acids, organic acids and salts thereof having a pH buffering capability, e.g., nitrates such as sodium nitrate, ammonium nitrate, etc, boric acid, borax, sodium metaborate, acetic acid, sodium acetate, sodium carbonate, potassium carbonate, phosphorous acid, phosphoric acid, sodium phosphate, citric acid, sodium citrate and tartaric acid.

The processing bath of the present invention having a blixing capability may contain as a fixing agent any known compound commonly used in a blixing solution such as thiosulfate (e.g., sodium thiosulfate, ammonium thiosulfate, ammonium sodium thiosulfate and potassium thiosulfate); thiocyanate (e.g., ammonium thiocyanate and potassium thiocyanate); thiourea; and thioether. The added amount of such a fixing agent is preferably 3 mol or less, and particularly preferably 2 mol, per liter of the processing solution having a bleaching capability.

The processing solution of the present invention having a bleaching capability may contain a so-called sulfite ion-releasing compound such as sulfite (e.g., sodium sulfite and ammonium sulfite), bisulfite, and an addition product of an aldehyde and bisulfite (e.g., carbonyl bisulfite).

Furthermore, the processing solution of the present invention having a blixing capability may contain an organic phosphate compound such as an aminopolycarboxylic acid represented by A-1 to A-24, ethylenediaminetetrakismethylenephosphonic acid, 1,3-diaminopropanetetrakismethylenephosphonic acid, nitrilo-N,N,N-trimethylenephosphonic acid and 1-hydroxyethylidene-1,1'-diphosphonic acid.

In the present invention, the processing solution having a blixing capability may contain at least one bleaching accelerator selected from compounds having a mercapto group or a disulfide bond, isothiourea derivatives and thiazolidine derivatives. The content of such a bleaching accelerator per liter of the processing solution having a blixing capability is preferably in the range of from $1\times10^{-5}$ to $1\times10^{-1}$ mol and particularly preferably from $1\times10^{-4}$ to $5\times10^{-2}$ mol.

In the present invention, as such a bleaching accelerator to be incorporated into the processing solution having a blixing capability there may be used any compound having a bleach accelerating effect selected from compounds having a mercapto group or a disulfide bond, thiazolidine derivatives, thiourea derivatives and isothiourea derivatives. Preferred examples of such a bleaching accelerators include compounds represented by formulae as described in Japanese Patent Application No. 313598/86 (pp. 63–77).

These compounds may be normally incorporated into the processing solution in the form of a solution in water, alkali, organic acid, organic solvent, etc. However, these compounds may be directly added to the bleaching bath without affecting its bleach accelerating effect.

In the present invention, such a bleaching accelerator may further be incorporated into the light-sensitive material. In this case, the bleaching accelerator may be incorporated into any emulsion layer selected from blue-sensitive, green-sensitive and red-sensitive emulsion layers, or a gelatin layer such as the top layer, interlayer and bottom layer.

The processing bath of the present invention having a blixing capability may consist of one tank or two or more tanks. Such a group of tanks may be replenished with a processing solution in a multistage countercurrent process. Alternatively, the processing solution may be circulated among these tanks to provide a uniform processing solution. In this case, a replenisher of the processing solution may be replenished to only one of these tanks. In any case, the total amount of replenisher of the processing solution to be supplied is within the range specified herein.

The processing solution of the present invention having a bleaching capability may contain a bleaching agent which can be used in the processing solution of the present invention having a blixing capability. Similarly, the processing solution of the present invention having a bleaching capability may contain a bleaching accelerator and other all compounds which can be used in the processing solution having a blixing capability. The pH value of the processing solution having a bleaching capability is preferably in the range of 4.0 to 8.0

Another processing bath may be provided between the color developing bath and the processing bath having a blixing capability. Such a processing bath may preferably contain a salt. Examples of such a salt include organic carboxylic acids such as phosphate, carbonate, sulfite, thiosulfate, borate, hydrochloride, sulfate, citrate, and acetate; organic aminocarboxylates such as ethylenediaminetetraacetate; and organic phosphates or sulfonates such as ethylenediaminetetrakisphosphate and 1-hydroxyethylidene-1,1-diphosphate. These salts may be preferably incorporated as cations in the form of an alkaline metal salt such as a sodium salt and a potassium salt; an alkaline earth metal salt; an ammonium salt; or a free acid. These salts may be used alone or in combination. The total amount of these salts to be incorporated in the processing solution is preferably in the range of $2\times10^{-3}$ mol or less, and particularly preferably from $1\times10^{-2}$ to 2 mol, per liter of the processing solution. The pH value of the processing bath is not specifically limited but is preferably the same as that of the subsequent blixing bath.

The method for processing a silver halide color photographic material containing a compound which releases a bleaching accelerator (i.e., a bleaching accelerator-releasing compound) with a processing solution containing a specific ferric complex salt and having a blixing capability in accordance with the present invention enables an improvement in the solution stability and rapid processing with an excellent blixing capability. It was also found that the deterioration in color restoration of cyan images which becomes a remarkable with increasing processing speed can be eliminated by incorporating at least one cyan dye-forming coupler represented by the formulae (I-I) or (I-II) in the light-sensitive material. More surprisingly, such an improvement in color restoration becomes more remarkable when a ferric aminopolycarboxylate complex salt is used as a bleaching agent than when a ferric ethylenediaminetetraacetate is used. Such an improvement in color restoration enables a further rapid blixing processing. Furthermore, the combined use of the cyan dye-forming coupler enables an improvement in image stability.

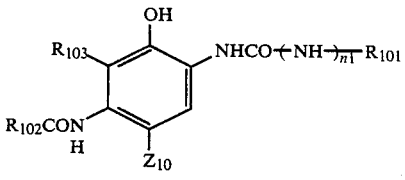

(L-I)

wherein $R_{101}$ and $R_{102}$ each independently represents an aliphatic group, an aryl group or a heterocyclic group; $R_{103}$ represents a hydrogen atom, a halogen atom, an aliphatic group having from 5 to 25 carbon atoms, an aryl group having from 5 to 25 carbon atoms, an acylamino group, or nonmetallic atomic groups which form a 5- or 6- membered nitrogen-containing ring together with $R_{102}$; $A_{10}$ represents a hydrogen atom or coupling-releasable group; and $n_1$ represents an integer of 0 or 1.

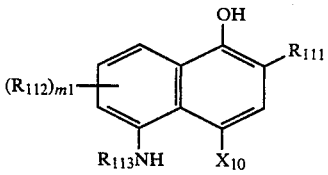

(L-II)

wherein $R_{111}$ represents $—CONR_{115}R_{116}$, $—NHCOR_{115}$, $—NHCOOR_{117}$, $—NHSO_2R_{117}$, $—NHCONR_{115}R_{116}$ or $—NHSO_2NR_{115}R_{116}$; $R_{112}$ represents a group which can be substituted by a naphthol ring; $n_1$ represents an integer of 0 to 3; $R_{113}$ represents a monovalent organic group; and $X_{10}$ represents a hydrogen atom or a group which can be released by a coupling reaction with an oxidation product of an aromatic primary amine developing agent, with the provisos that: (a) $R_{115}$ and $R_{116}$ may be the same or different and each independently represents a hydrogen atom, an aliphatic group having from 5 to 25 carbon atoms, an aromatic group having from 5 to 25 carbon atoms, or a heterocyclic group, (b) $R_{117}$ represents an aliphatic group, and aromatic group or a heterocyclic group, (c) when $m_1$ is a plural number, the plurality of $R_{112}$ may be the same or different or may be connected to each other to form a ring, and (d) $R_{112}$ and $R_{113}$ or $R_{113}$ and $X_{10}$ may be connected to each other to form a ring.

The present cyan dye-forming coupler represented by the fromula (L-I) is further described hereinafter.

$R_{101}$ and $R_{102}$ each represents an aliphatic group having from 1 to 32 carbon atoms such as a methyl group, a butyl group, a tridecyl group, a cyclohexyl group and an allyl group; an aryl group such as a phenyl group and a naphthyl group; or a heterocyclic group such as a 2-pyridyl group, a 2-imidazolyl group, a 2-furyl group and a 6-quinolyl group. These groups may be substituted by groups selected from an alkyl group; an aryl group; a heterocyclic group; an alkoxy group such as a methoxy group and a 2-methoxyethoxy group; an aryloxy group such as a 2,4-di-tert-amylphenoxy group, a 2-chlorophenoxy group and a 4-cyanophenoxy group; an alkenylosy group such as a 2-propenyloxy group; and acyl group such as an acetyl group and a benzoyl group; an ester group such as a butoxycarbonyl group, a phenoxycarbonyl group, an acetoxy group, a benzoyloxy group, a butoxysulfonyl group and a toluenesulfonyloxy group; an amide group such as an acetylamino group, an ethylcarbamoyl group, a dimethylcarbamoyl group, a methanesulfonamide group and a butylsulfamoyl group; a sulfamide group such as a dipropylsulfamoylamino group; an imide group such as a succinimide group and a hydantoinyl group; a ureido group such as phenylureido group and a dimethylureido group; an aliphatic or aromatic sulfonyl group such as a methanesulfonyl group and a phenylsulfonyl group; an aliphatic or aromatic thio group such as an ethylthio group and a phenylthio group; a hydroxy group; a cyano group; a carboxy group; a nitro group; a sulfo group; and a halogen atom.

$R_{103}$ represents a hydrogen atom, a halogen atom, an aliphatic group having from 1 to 25 carbon atoms, an aryl group having from 1 to 25 carbon atoms, an acylamino group, or nonmetallic atomic groups which form a 5- or 6-membered nitrogen-containing ring together with $R_{102}$. $R_{103}$ may have substitutable substituents which may be substituted by substituents as described with reference to $R_{101}$.

The suffix $n_1$ represents an integer of 0 to 1.

In the formula (L-I), $Z_{10}$ represents a hydrogen atom or coupling-releasable group. Examples of such a coupling-releasable group include a halogen atom such as fluorine, chlorine and bromine; an alkoxy group such as an ethoxy group, a dodecyloxy group, a methoxyethycarbamoylmethoxy group, a carboxyproploxy group and a methylsulfonylethoxy group; an aryloxy group such as a 4-chlorophenoxy group, a 4-methoxyphenoxy group and a 4-carboxyphenoxy group; an acyloxy group such as an acetoxy group, a tetradecanoyloxy group and a benzoyloxy group; a sulfonyloxy group such as a methanesulfonyloxy group and a toluenesulfonyloxy group; an amide group such as a dichloroacetylamino group, a heptafluorobutylamino group, a methanesulfonylamino group and a toluenesulfonylamino group; an alkoxycarbonyloxy group such as an ethoxycarbonyloxy group and a benzyloxycarbonyloxy group; an aryloxycarbonyloxy group such as a phenoxycarbonyloxy group; an aliphatic or aromatic thio group such as an ethylthio group, a phenylthio group and a tetrazolythio group; an imide group such as a succinimide group and a hydantoinyl group; and an aromatic azo group such as a phenylazo group. These coupling-releasable groups may contain a photographically useful group.

In the formula (L-I), preferred examples of $R_{101}$ include an aryl group and a heterocyclic group. The aryl group may be preferably substituted by a halogen atom, an alkyl group, an alkoxy group, an aryloxy group, an acylamino group, an acyl group, a carbamoyl group, a sulfonamide group, a sulfamoyl group, a sulfonyl group, a sulfamide group, an oxycarbonyl group or a cyano group.

In the formula (L-I), when $R_{103}$ and $R_{102}$ do not form a ring, $R_{102}$ is preferably a substituted or unsubstituted alkyl group or aryl group, particularly preferably a substituted aryloxy-substituted alkyl group. $R_{103}$ is preferably a hydrogen atom.

In the formula (L-I), preferred examples of $Z_{10}$ include a hydrogen atom, a halogen atom, an alkoxy group, an aryloxy group, an acyloxy group and a sulfonamide group.

In the formula (L-I), when $n_1$ is 0, $Z_{10}$ is preferably a halogen atom and particularly preferably fluorine or chlorine.

The cyan dye-forming coupler represented by the formula (L-I) is normally incorporated in a silver halide emulsion layer and particularly preferably in a red-sensitive emulsion layer. The amount of such a cyan dye-forming coupler to be added is in the range of from $2\times10^{-3}$ to $5\times10^{-1}$ mol/mol-Ag and preferably $1\times10^{-2}$ to $5\times10^{-1}$ mol/mol-Ag.

The synthesis of the cyan dye-forming coupler represented by the formula (L-I) can be easily accomplished by any suitable method as described in U.S. Pat. Nos. 3,772,002, 4,334,011, 4,327,173 and U.S. Pat. No. 4,427,767.

Specific examples of the compound represented by the formula (L-I) are shown hereinafter, but the present invention should not be construed as being limited thereto.

[L-I-1]

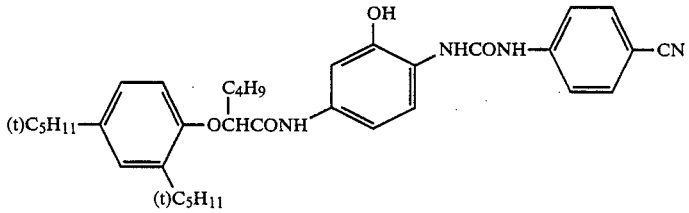

[L-I-2]

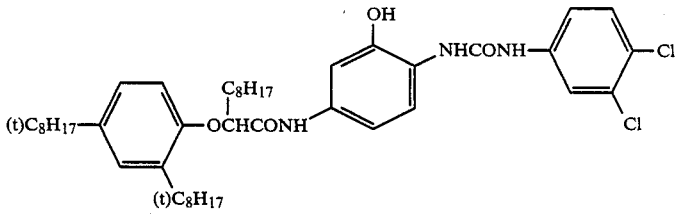

[L-I-3]

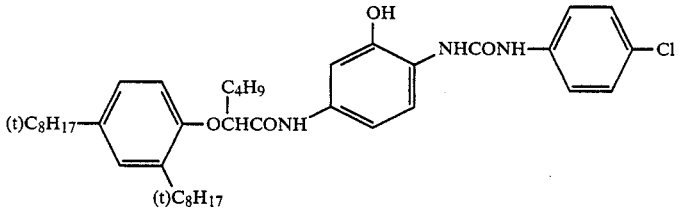

[L-I-4]

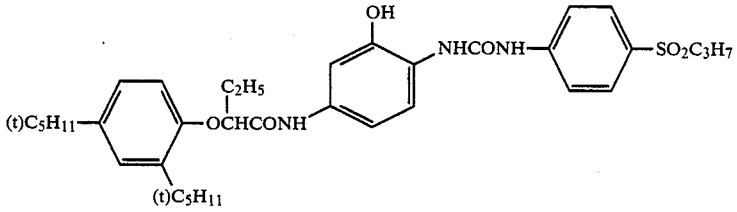

[L-I-5]

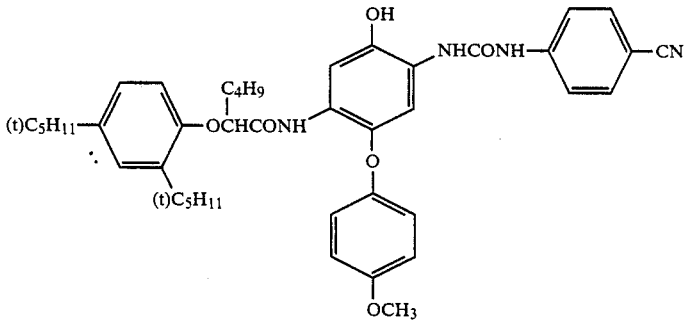

-continued
[L-I-6]
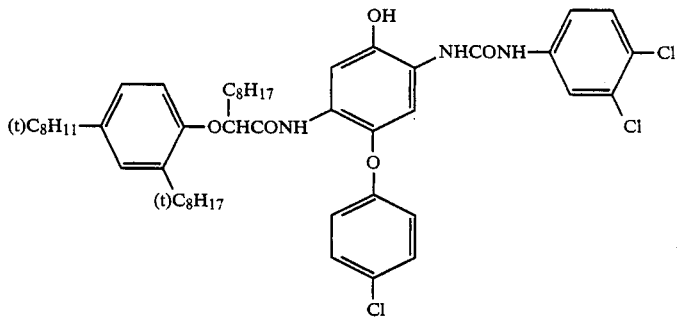
[L-I-7]
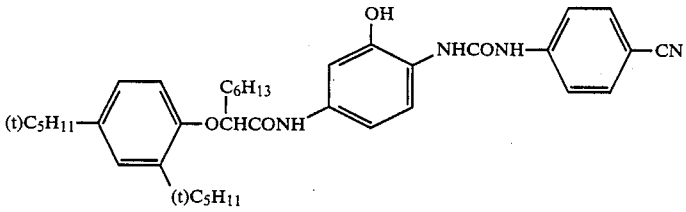
[L-I-8]
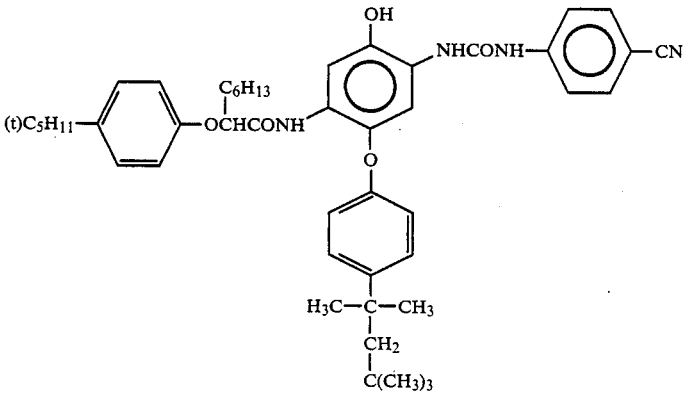
[L-I-9]
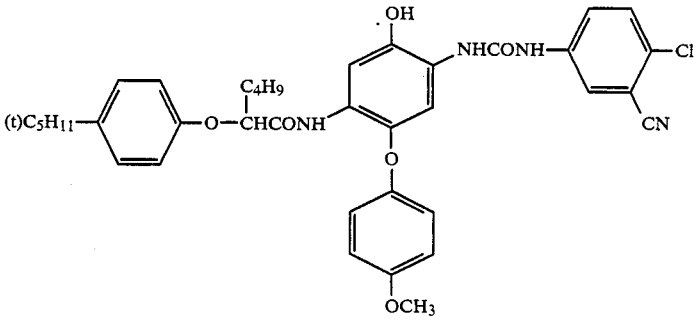
[L-I-10]
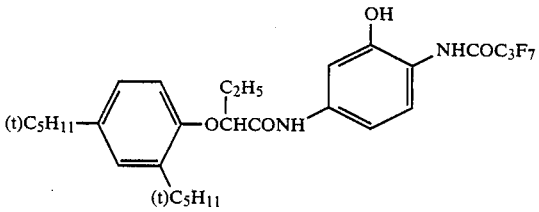

-continued
[L-I-11]
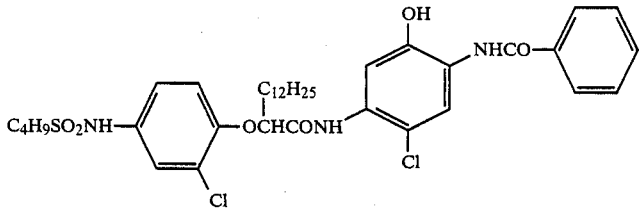
[L-I-12]
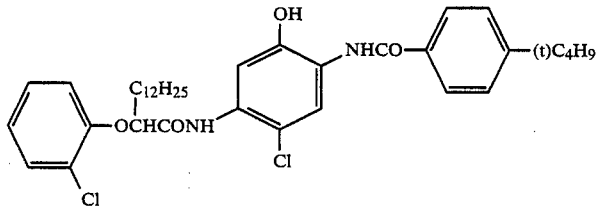
[L-I-13]
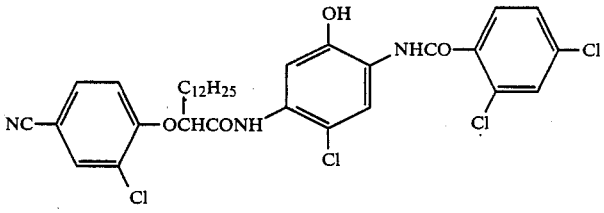
[L-I-14]
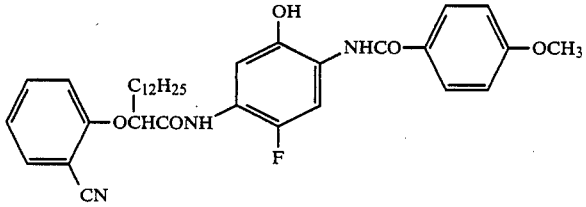
[L-I-15]
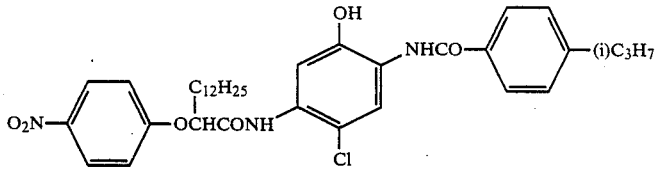
[L-I-16]
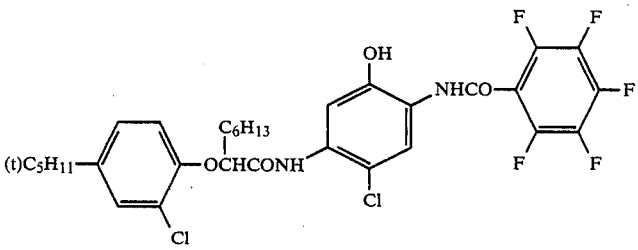
[L-I-17]
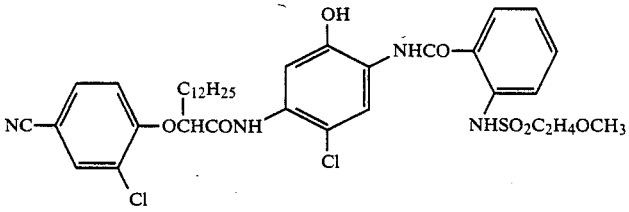

-continued
[L-I-18]
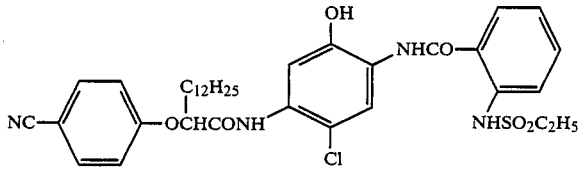
[L-I-19]
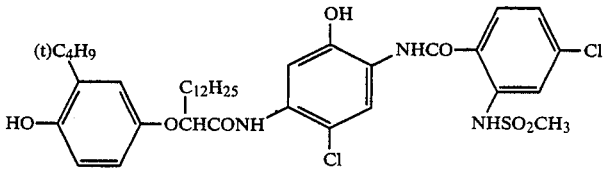
[L-I-20]
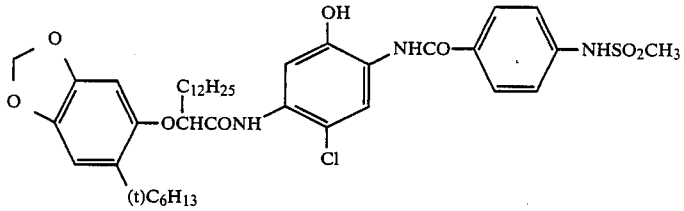
[L-I-21]
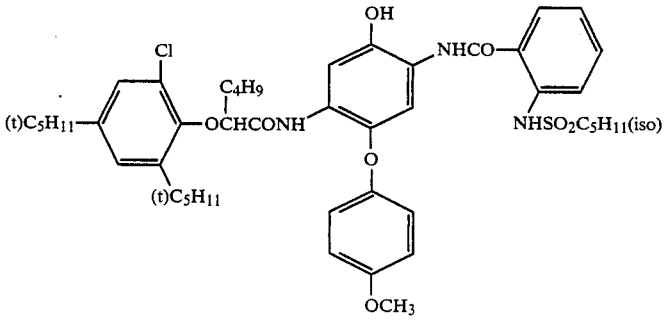
[L-I-22]
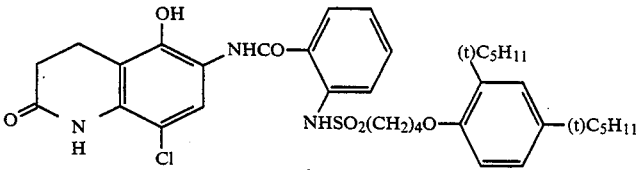
[L-I-23]
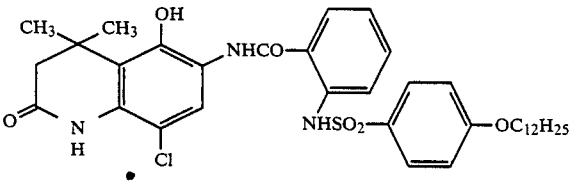
[L-I-24]
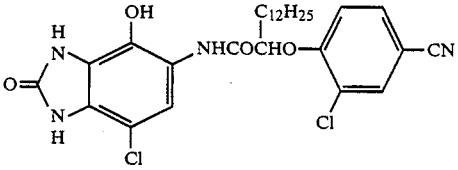

-continued
[L-I-25]
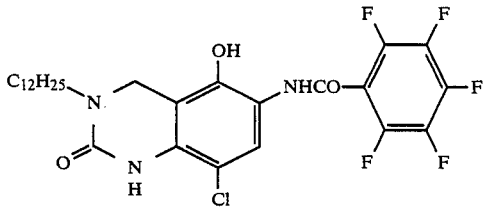
[L-I-26]
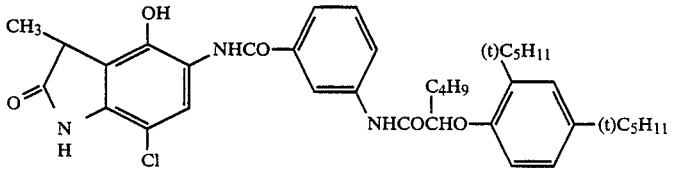
[L-I-27]
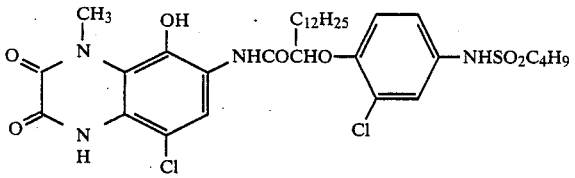
[L-I-28]
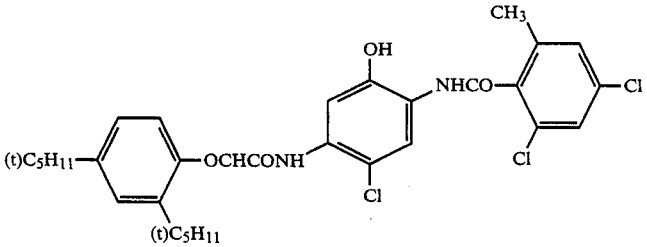
[L-I-29]
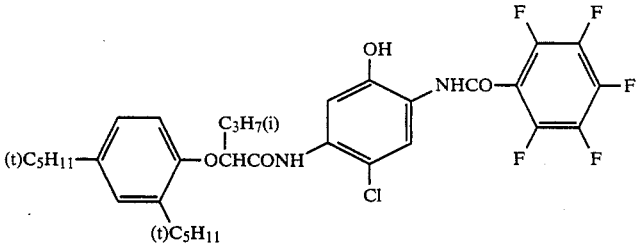
[L-I-30]
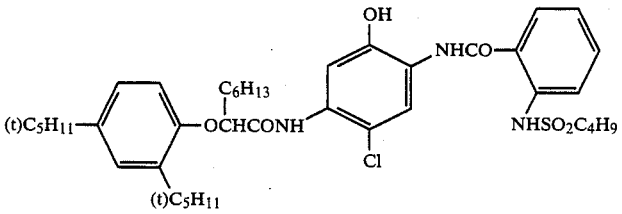
[L-I-31]
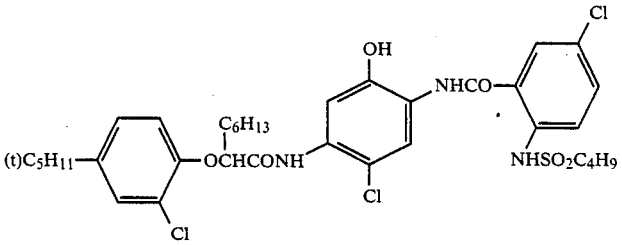

-continued
[L-I-32]
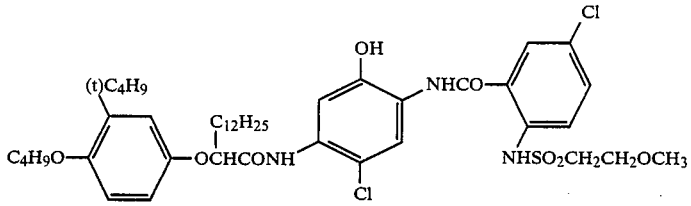
[L-I-33]
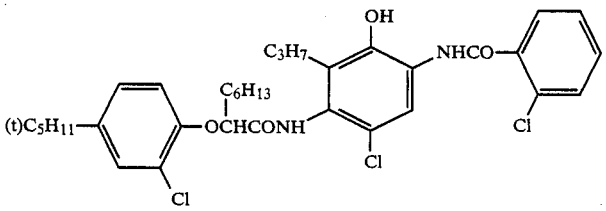
[L-I-34]
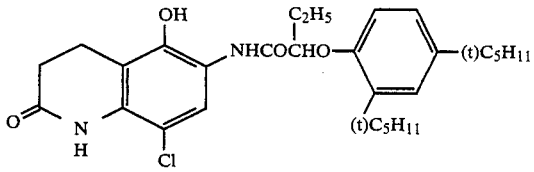
[L-I-35]
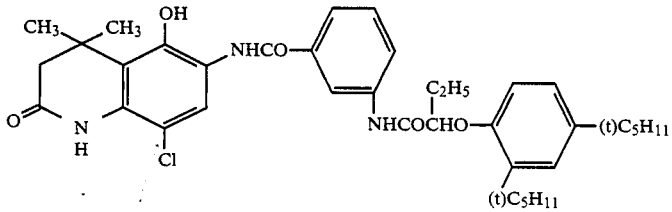
[L-I-36]
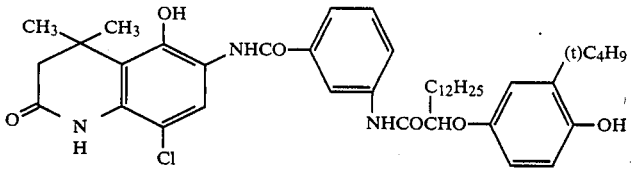
[L-I-37]
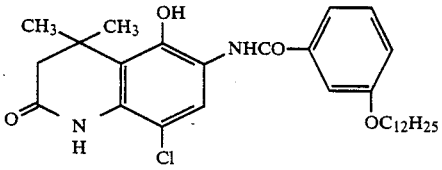
[L-I-38]
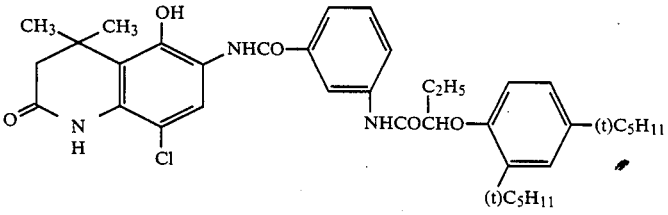

-continued

[L-I-39]

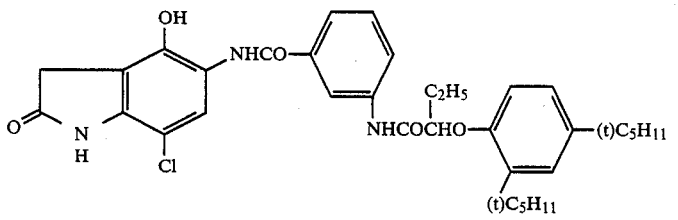

[L-I-40]

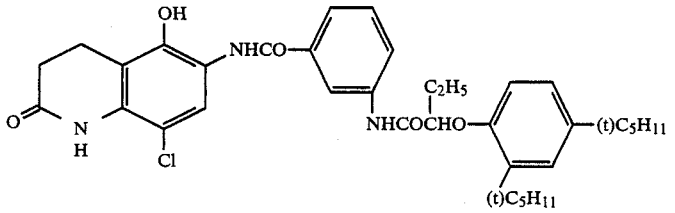

[L-I-41]

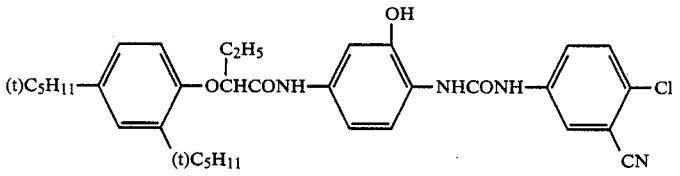

The substituents contained in the formula (L-II) are further described hereinafter.

$R_{111}$ has the same meaning as described above. $R_{115}$, $R_{116}$ and $R_{117}$ each represents an aliphatic group having from 1 to 30 carbon atoms, an aromatic group having from 6 to 30 carbon atoms or a heterocyclic group having from 2 to 30 carbon atoms.

$R_{112}$ represents a group (or atom) which can substitute for a naphthol ring. Typical examples of such a group or atom include a halogen atom, a hydroxy group, an amino group, a carboxyl group, a sulfonic group, a cyano group, an aromatic group, a heterocyclic group, a carbonamide group, a sulfonamide group, a carbamoyl group, a sulfamoyl group, a ureido group, an acyl group, an acyloxy group, an aliphatic oxy group, an aromatic oxy group, an aliphatic thio group, an aromatic thio group, an aliphatic sulfonyl group, an aromatic sulfonyl group, a sulfamoylamino group, a nitro group and an imide group. The group represented by $R_{112}$ contains 0 to 30 carbon atoms. When $m_1$ is 2, examples of the cyclic group represented by $R_{112}$ include a dioxymethylene group.

$R_{113}$ represents a monovalent organic group. Such a monovalent organic group is preferably represented by the following formula (L-III):

$$R_{118}(Y_{10})_{n2}— \qquad \text{(L-III)}$$

wherein $Y_{10}$ represents >NH, >CO or $>SO_2$; $n_2$ represents an integer of 0 or 1; and $R_{118}$ represents a hydrogen atom, an aliphatic group having from 1 to 30 carbon atoms, an aromatic group having from 6 to 30 carbon atoms, a geterocyclic group having from 2 to 30 carbon atoms, $—OR_{119}$, $—COR_{119}$, $$—N\begin{matrix}R_{119}\\R_{120}\end{matrix}, \quad —CON\begin{matrix}R_{119}\\R_{120}\end{matrix}, \quad —SO_2N\begin{matrix}R_{119}\\R_{120}\end{matrix},$$

$—CO_2R_{121}$, $—SO_2R_{121}$ or $—SO_2R_{121}$ in which $R_{119}$, $R_{120}$ and $R_{121}$ have the same meaning as $R_{115}$, $R_{116}$ and $R_{117}$, respectively.

In $R_{111}$ or $R_{118}$, $R_{115}$ and $R_{116}$ in $$—N\begin{matrix}R_{115}\\R_{116}\end{matrix}$$

and $R_{119}$ and $R_{120}$ in $$—N\begin{matrix}R_{119}\\R_{120}\end{matrix}$$

may be connected to each other to form a nitrogen-containing heterocyclic group such as a morpholine ring, a piperidine ring and a pyrrolidine ring.

$X_{10}$ represents a hydrogen atom or coupling-releasable group (or atom). Typical examples of such a coupling-releasable group include a halogen atom, $—OR_{125}$, $—SR_{125}$, $$—O\overset{\overset{O}{\|}}{C}R_{125}, \quad —NHCOR_{125}, \quad —NHSR_{125},$$

$$—O\underset{\underset{O}{\|}}{C}—OR_{125}, \quad —O\underset{\underset{O}{\|}}{C}NHR_{125},$$

an aromatic azo group having from 6 to 30 carbon atoms, and a heterocyclic group having from 1 to 30 carbon atoms connected to the coupling active position of a coupler through a nitrogen atom such as a succinic imide group, a phthalimide group, a hydantoinyl group, a pyrazolyl group and a 2-benzotriazolyl group. In the above described formulae, $R_{125}$ represents an aliphatic group having from 1 to 30 carbon atoms, an aromatic group having from 6 to 30 carbon atoms and a heterocyclic group having from 2 to 30 carbon atoms.

The aliphatic groups in the formual (L-II) may be saturated or unsaturated, substituted or unsubstituted, straight chain, branched or cyclic groups. Typical examples of such an aliphatic group include a methyl group, an ethyl group, a butyl goup, a cyclohexyl group, an allyl group, a propargyl group, a methoxyethyl group, an n-decyl group, an n-dodecyl group, an n-hexadecyl group, a trifluoromethyl group, a heptafluoropropyl group, a dodecyloxypropyl group, a 2,4-di-tert-amylphenoxypropyl group and a 2,4-di-tert-amylphenoxybutyl group.

Similarly, the aromatic groups in the formula (L-II) may be substituted or unsubstituted groups. Typical examples of such an aromatic group include a phenyl group, a tolyl group, a 2-tetradecyloxyphenyl group, a pentafluorophenyl group, a 2-chloro-5-dodecyloxycarbonylphenyl group, a 4-hydroxyphenyl group.

Furthermore, the heterocyclic group in the present invention may be a substituted or unsubstituted group. Typical examples of such a heterocyclic group include a 2-pyridyl group, a 4-pyridyl group, a 2-furyl group, a 4-chienyl group and a quinolinyl group.

Preferred examples of suitable substituents for the formula (L-II) are described hereinafter. $R_{111}$ is preferably $—CONR_{115}R_{116}$. Specific examples of the group represented by $—CONR_{115}R_{116}$ include a carbamoyl group, an ethylcarbamoyl group, a morpholinocarbonyl group, a dodecylcarbamoyl group, a hexadecylcarbamoyl group, a decyloxypropyl group, a dodecyloxypropyl group, a 2,4di-tert-amylphenoxypropyl group and a 2,4-di-tert-amylphenoxybutyl group.

The suffix $m_1$ is most preferably 0. That is, the group represented by the formula (L-II) is not substituted by $R_{112}$. Alternatively, $R_{112}$ may be a halogen atom, an aliphatic group having from 1 to 30 carbon atoms, a carbonamide group or a sulfonamide group.

In the formula (L-III), $n_2$ is preferably 0. That is, the group represented by the fromula (L-III) preferably has no $Y_{10}$. Examples of $R_{118}$ include $—COR_{119}$ such as a formyl group, an acetyl group, a trifluoroacetyl group, a chloroacetyl group, a benzoyl group, a pentafluorobenzoyl group and a p-chlorobenzoyl group; $—COOR_{119}$ such as a methoxy carbonyl group, an ethoxycarbonyl group, a butoxycarbonyl group, a decyloxycarbonyl group, a methoxyethoxycarbonyl group and a phenoxycarbonyl group; $—SO_2R_{121}$ such as a methanesulfonyl group, an ethanesulfonyl group, a butanesulfonyl group, a hexadecanesulfonyl group, a benzenesulfonyl group, a toluenesulfonyl group and a p-chlorobenzenesulfonyl group; $—CONR_{119}R_{120}$ such as an N,N-dimethylcarbamoyl group, an N,N-diethylcarbamoyl group, an N,N-dibutylcarbamoyl group, a morphorlinocarbonyl group, a piperidinocarbonyl group, a 4-cyanophenylcarbonyl group, a 3,4-dichlorophenylcarbamoyl group and a 4-methanesulfonylphenylcarbamoyl group; and $—SO_2NR_{119}R_{120}$ such as an N,N-dimethylsulfamoyl group, an N,N-diethylsulfamoyl group and an N,N-dipropylsulfamoyl group. Among these groups, $—COOR_{119}$, $—COR_{119}$ and $—SO_2R_{121}$ are more preferred. Most preferred among these groups is $—COOR_{119}$.

Preferred examples of $X_{10}$ include a hydrogen atom, a halogen atom, an aliphatic oxy group having from 1 to 30 carbon atoms such as a methoxy group, a 2-methanesulfonamidoethoxy group, a 2-methanesulfonylethoxy group, a carboxymethoxy group, a 3-carboxypropyloxy group, a 2-carboxymethylthioethoxy group, a 2-methoxyethoxy group and a 2-methoxyethylcarbamoylmethoxy group; an aromatic oxy group such as a phenoxy group, a 4-chlorophenoxy group, a 4-methoxyphenoxy group, a 4-tert-octylphenoxy group and a 4-carboxyphenoxy group; a heterocyclic thio group such as a 5-phenyl-1,2,3,4- tetrazolyl-1-thio group and a 5-ethyl-1,2,3,4-tetrazolyl-1-thio group; and an aromatic azo group such as a 4-dimethylaminophenylazo group, a 4-acetamidophenylazo group, a 1-naphthylazo group, a 2-ethoxycarbonylphenylazo group and a 2-methoxycarbonyl-4,5-dimethoxyphenylazo group.

The couplers represented by the formula (L-II) may be connected to each other at the substituent $R_{111}$, $R_{112}$, $R_{113}$ or $X_{10}$ through a divalent or polyvalent group to form a dimer, oligomer or higher polymer. In this case, the total number of carbon atoms contained in each substituent may be beyond the specified limit.

If the coupler represented by the formula (L-II) forms a polymer, typical examples of such a polymer include a monopolymer or copolymer of addition polymerizable ethylenically unsaturated compounds (cyan dye-forming monomer) containing a cyan dye-forming coupler residual group. Such a polymer contains repeating units represented by the formula (L-IV). One or more cyan dye-forming repeating units represented by the formula (L-IV) may be contained in such a polymer. Such a polymer may be a copolymer containing one or more noncoloring ethylenic monomers as copolymer components.

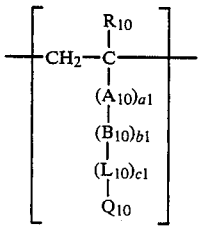

(L-IV)

wherein $R_{10}$ represents a hydrogen atom, an alkyl group having from 1 to 4 carbon atoms or a chlorine atom; $A_{10}$ represents —CONH—, —COO— or a substituted or unsubstituted phenylene group; $B_{10}$ represents a substituted or unsubstituted alkylene group, a phenylene group or an aralkylene group; $L_{10}$ represents —CONH—, —NHCONH—, —NHCOO—, —NHCO—, —OCONH—, —NH—, —COO—, —OCO—, —CO—, —O—, $—SO_2—$, $—NHSO_2—$ or $—SO_2NH—$; $a_1$, $b_1$ and $c_1$ each represents an integer of 0 to 1; and $Q_{10}$ represents a cyan coupler residual group obtained by elimination of a hydrogen atom other than that in the hydroxyl group at the 1-position from the compound represented by the formula (L-II).

Preferred examples of such a polymer include a copolymer of a cyan dye-forming monomer providing a coupler unit represented by the formula (L-IV) and a noncoloring ethylenic monomer copolymer as described below.

Examples of a noncoloring ethylenic monomer which does not undergo coupling with an oxidation product of an aromatic primary amine developing agent include acrylic acid; α-chloroacrylic acid; α-alkylacrylic acid such as methacrylic acid; esters or amides derived from these acrylic acids such as acrylamide, methacrylamide, n-butylacrylamide, t-butylacrylamide, diacetonacrylamide, methylacrylate, ethylacrylate, n-propylacrylate, n-butylacrylate, t-butylacrylate, isobutylacrylate, 2-ethylhexylacrylate, n-octylacrylate, laurylacrylate, methylmethacrylate, ethylmethacrylate, n-butylmethacrylate and β-hydroxymethacrylate; vinyl esters such as vinyl acetate, vinyl propionate and vinyl laurate; acrylonitrile; methacrylonitrile; aromatic vinyl compounds such as styrene and derivatives thereof (e.g., vinyltoluene, divinylbenzene, vinylacetophenone and sulfostyrene), itaconic acid, citraconic acid, crotonic acid, vinylidene chloride, vinylalkylether (e.g., vinylethylether), maleic ester, N-vinyl-2-pyrrolidone, N-vinylpryidine and 2- and 4-vinylpyridine.

Among these compounds particularly preferred are acrylic ester, methacrylic ester and maleic ester. Two or more of such noncoloring ethylenic monomers may be used in combination. Examples of such a combination include methyl acrylate and butyl acrylate, butyl acrylate and styrene, butyl methacrylate and methacrylic acid and methyl acrylate and diacetonacrylamide.

As is well known in the field of polymer couplers, the ethylenically unsaturated monomer to be copolymerized with the vinyl monomer corresponding to the compound of the formula (L-IV) can be selected such that it gives a favorable effect on physical and/or chemical properties of the copolymer formed, e.bg., solubility, compatibility with binder for photographic colloidal composition such as gelatin, softening point, flexibility and heat stability.

The preparation of the cyan polymer coupler to be used in the present invention can be accomplished by dissolving in an organic solvent a lipophilic polymer coupler obtained by polymerization of vinyl monomers providing a coupler unit of the formula (L-IV), and then emulsion-dispersing the solution in an aqueous solution of gelatin in the form of a latex, or subjecting such a lipophilic polymer coupler to a direct emulsion polymerization.

The emulsion dispersion of such a lipophilic polymer coupler in an aqueous solution of gelatin in the form of a latex may be accomplished by any suitable method as described in U.S. Pat. No. 3,451,820. The emulsion polymerization of such a lipophilic polymer coupler may be accomplished by any suitable method as described in U.S. Pat. No. 4,080,211 and U.S. Pat. No. 3,370,952.

Specific examples of couplers represented by the formula (L-II) are shown hereinafter, but the present invention should not be construed as being limited thereto. In the following formulae, $(t)C_5H_{11}$ and $(t)C_8H_{17}$ represent $-C(CH_3)_2C_2H_5$ and $-C(CH_3)_2CH_2C(CH_2)_3$, respectively.

(L-II-1)

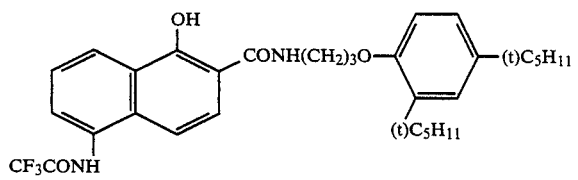

(L-II-2)

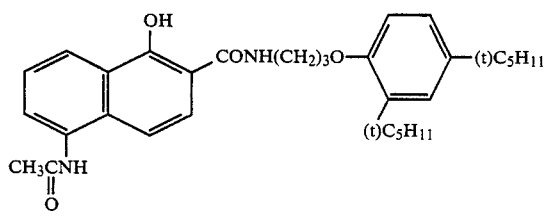

(L-II-3)

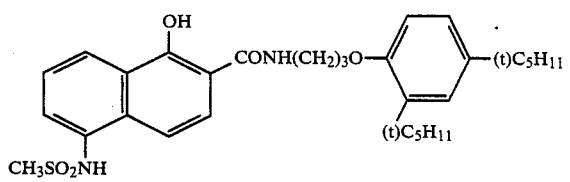

(L-II-4)

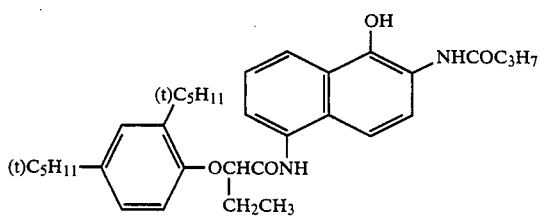

(L-II-5)

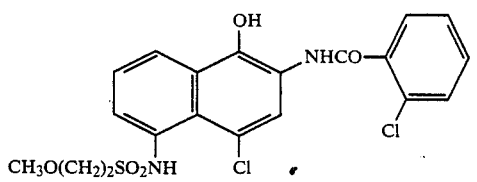

-continued
(L-II-6)
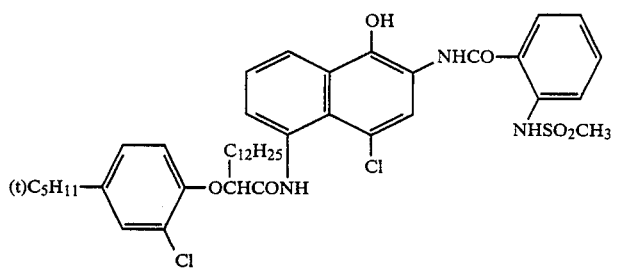
(L-II-7)
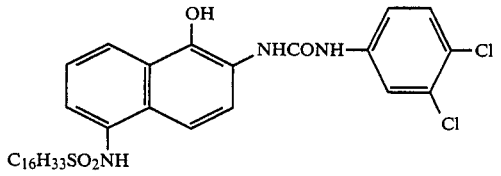
(L-II-8)
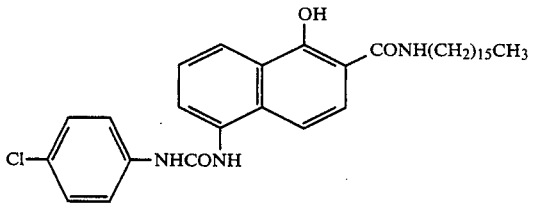
(L-II-9)
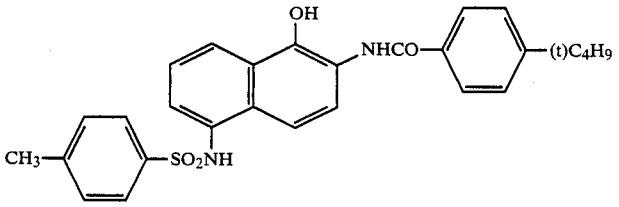
(L-II-10)
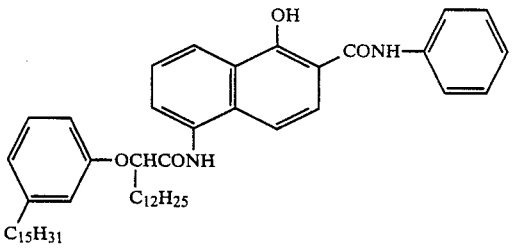
(L-II-11)
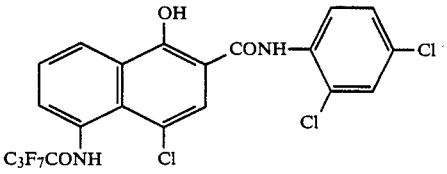
(L-II-12)
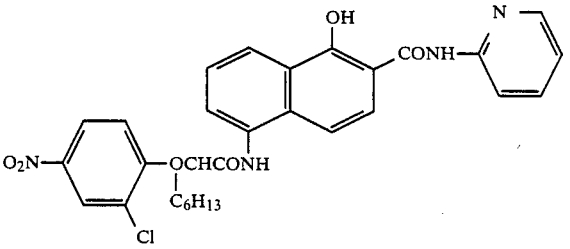

-continued
(L-II-13)
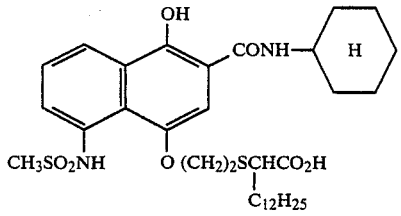
(L-II-14)
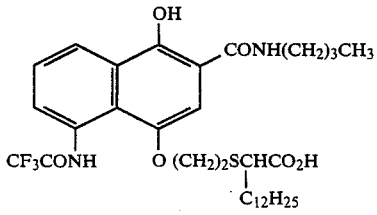
(L-II-15)
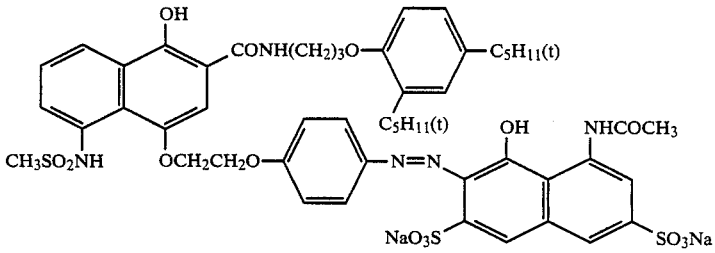
(L-II-16)
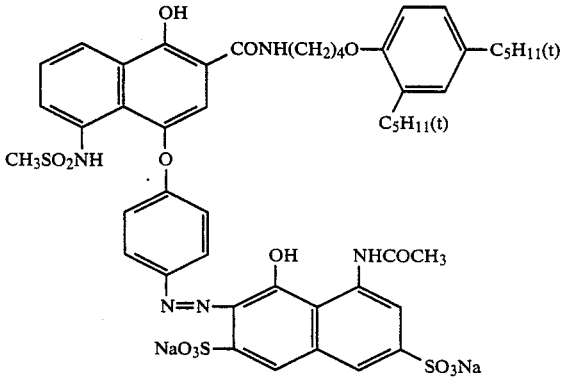
(L-II-17)
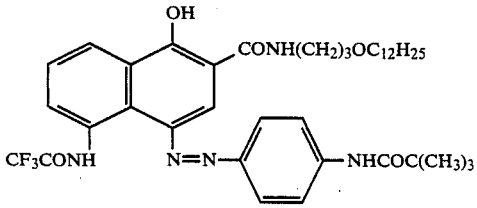
(L-II-18)
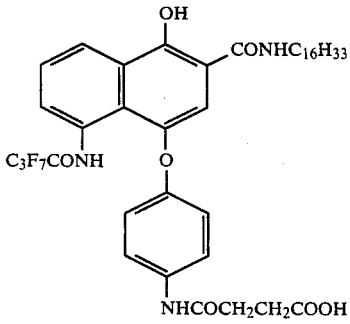

-continued
(L-II-19)
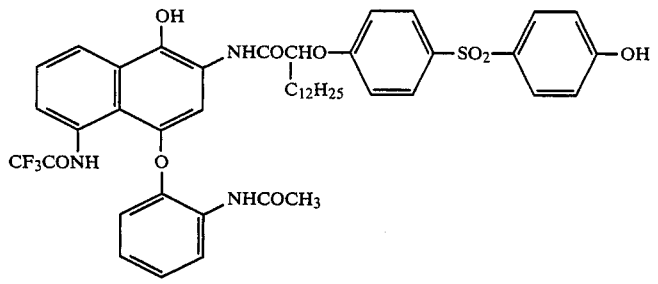
(L-II-20)
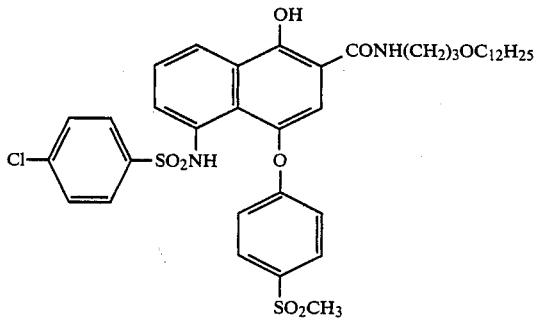
(L-II-21)
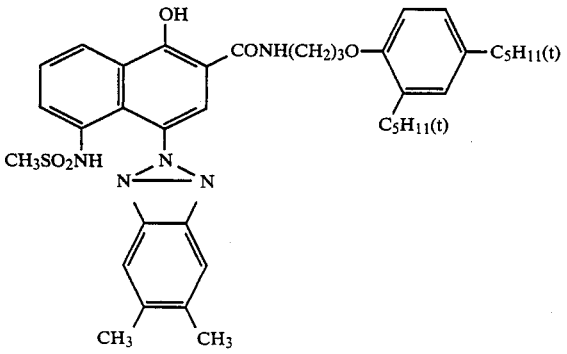
(L-II-22)
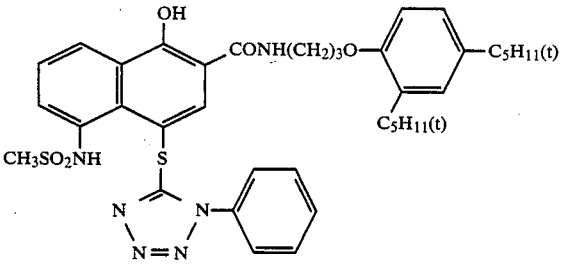
(L-II-23)
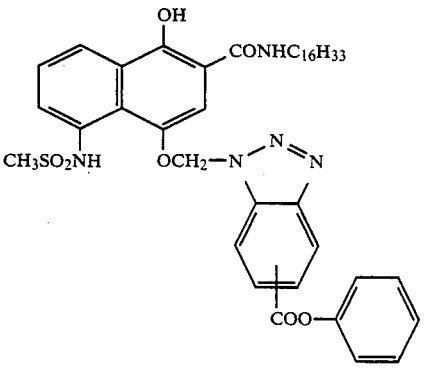

-continued
(L-II-24)
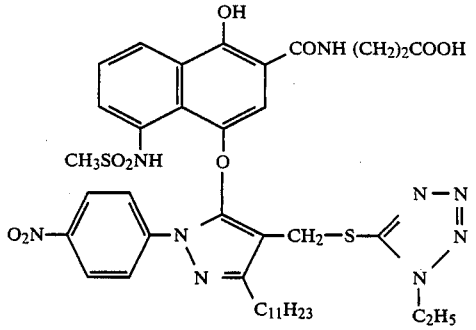
(L-II-25)
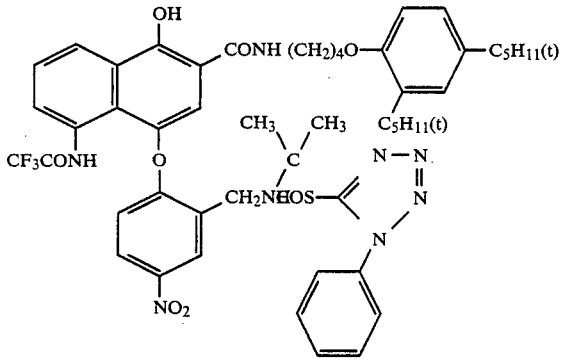
(L-II-26)
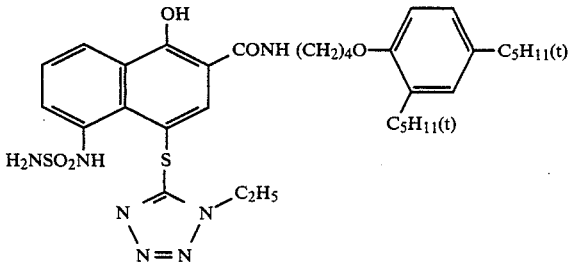
(L-II-27)
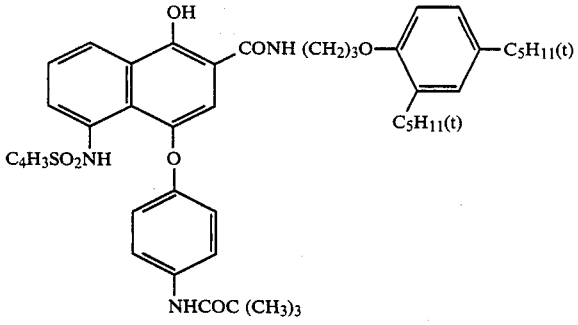
(L-II-28)
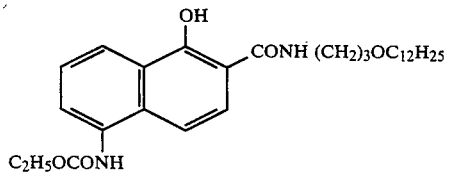
(L-II-29)
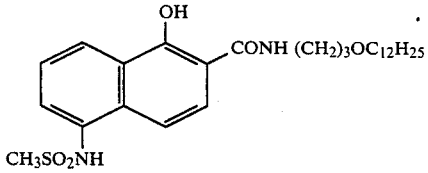

-continued

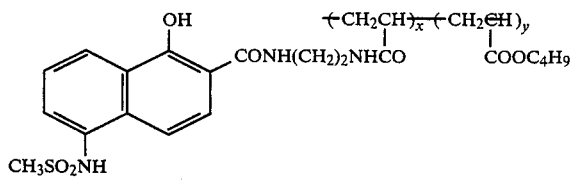

x/y = 70/30 (molar ratio) (L-II-30)

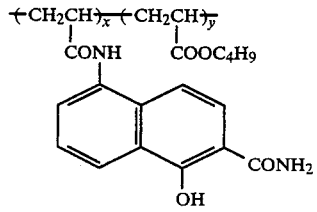

x/y = 50/50 (molar ratio) (L-II-31)

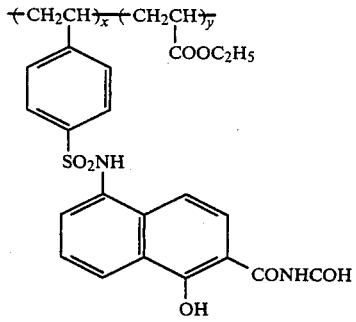

x/y = 60/40 (molar ratio) (L-II-32)

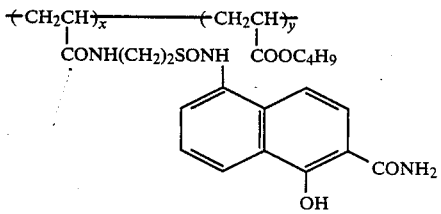

x/y = 80/20 (molar ratio) (L-II-33)

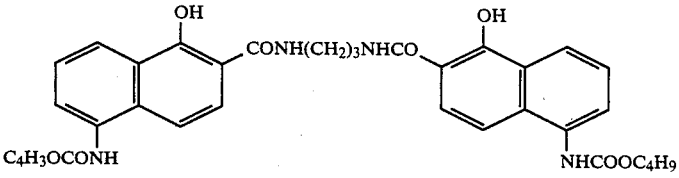

(L-II-34)

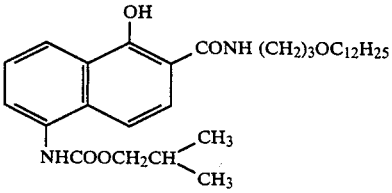

(L-II-35)

The synthesis of the coupler represented by the formula (L-II) can be accomplished by any suitable method as described in Japanese Patent Application-(OPI) Nos. 237448/85, 153640/86, and 145557/86.

The coupler represented by the formula (L-II) may be normally incorporated in a silver halide emulsion layer. The amount of the coupler to be added is preferably in the range of from $3\times10^{-3}$ to 1 mol/mol-Ag, more preferably from $5\times10^{-3}$ to 0.5 mpl/mol-Ag, and particularly preferably from 0.01 to 0.25 mol/mol-Ag.

The incorporation of the present coupler and other couplers which can be used in combination therewith in the light-sensitive material can be accomplished by any known dispersion method. Examples of such dispersion methods include a solid dispersion method and an alkali dispersion method. A preferred dispersion method is a latex dispersion method. Typical examples of particularly preferred dispersion methods are an oil-in-water dispersion method. In the oil-in-water dispersion method, the coupler is dissolved in either or a mixture of a high boiling point organic solvent having a boiling point of 175° C. or more and a low boiling point solvent, i.e., auxiliary solvent, and the solution is then finely dispersed in water or an aqueous solvent such as an aqueous solution of gelatin in the presence of a surface active agent. Examples of such a high boiling point organic solvent are described in U.S. Pat. No. 2,322,027. The dispersion may be accompanied by phase inversion. If desired, the auxiliary solvent may be removed or reduced by distillation, noodle rinsing, or ultrafiltration before the coupler is coated on the support.

The color developing solution to be used for the development of the present light-sensitive material is an alkaline aqueous solution comprising an aromatic primary amine color developing agent as a main component. A useful example of such a color developing agent is an aminophenolic compound. Typical examples of such a compound include 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline, and sulfates, hydrochlorides, phosphates, p-toluenesulfonates, tetraphenylborates, and p-(t-octyl)benzenesulfonates thereof. These diamines are more stable in the form of salts than in the free state. Therefore, these diamines are preferably used in the form of salts.

Examples of aminophenolic derivatives which may be used in the present invention include o-aminophenol, p-aminophenol, 4-amino-2-methylphenol, 2-amino-3-methylphenol and 2-oxy-3-amino-1,4-dimethylbenzene.

Other examples of color developing agents which can be used in the present invention include those described in L. F. A. Mason, *Photographic Processing Chemistry,* Focal Press, pp. 226 to 229, U.S. Pat. Nos. 2,193,015 and 2,592,364, and Japanese Patent Application (OPI) No. 64933/73. If desired, two or more color developing agents may be used in combination.

The color developing solution of the present invention may contain pH buffering agents such as carbonates, borates and phorphates of alkali metals; development inhibitors or antifoggants such as bromide, iodide, benzimidazoles, benzothiazoles and mercapto compounds; preservatives such as hydroxylamine, triethanolamin, compounds as described in West German Patent Application (OLS) No. 2,622,950, sulfite, and bisulfite; organic solvents such as diethylene glycol; development accelerators such as benzyl alcohol, polyethylene glycol, quaternary ammonium salts, amines, thiocyanate and 3,6-thiaoctane-1,8-diol; color-forming couplers; competing couplers; nucleating agents such as sodium boron hydride; auxiliary developing agents such as 1-phenyl-3-pyrazolidone; tackifiers; and chelating agents such as ethylenediaminetetraacetic acid, nitrilotriacetic acid, cyclohexanediaminetetraacetic acid, iminodiacetic acid, N-hydroxymethylethylenediaminetetraacetic acid, diethylenetriaminepentaacetic acid, triethylenetetraminehexaacetic acid, aminopolycarboxylic acid and 1-hydroxyethylidene-1,1'-diphosphonic acid as described in Japanese Patent Application (OPI) No. 195845/83, organic phosphonic acid as described in *Research Disclosure,* RD No. 18170 (May, 1979), aminophosphonic acid (e.g., aminotris(methylenephosphonic acid), and ethylenediamine-N,N,N',N'-tetramethylenephosphonic acid), and phosphonocarboxylic acid as described in *Research Disclosure,* RD No. 18170 (May, 1975).

The content of such a color developing agent to be incorporated in the normal color developing solution is in the range of about 0.1 g to about 30 g, and preferably about 1 g to about 15 g, per liter of the color developing solution. The pH of the color developing solution is normally in the range of 7 or more and particularly about 9 to about 13.

The present silver halide color photographic material is normally subjected to washing and/or stabilization after being subjected to desilvering such as fixing or blixing.

The amount of water to be used in the washing process can be widely selected depending on the properties (different with components such as coupler) and use of the light-snesitive material, washing water temperature, number of washing tanks (stages), replenishing system of a replenisher (e.g., countercurrent or cocurrent), an other various conditions. In a multistage countercurrent system, the relationship between the number of washing tanks and the amount of water to be used in the washing process can be determined in accordance with a method as described in *Journal of the Society of Motion Picture and Television Engineers,* Vol. 64, pp. 248 to 253 (May, 1955).

In a multistage countercurrent system as described in the foregoing literature, the amount of water to be used in the washing process can be greatly decreased. However, such a multistage countercurrent system is disadvantageous in that an increase in the time of retention of water in the tanks causes the propagation of bacteria which produce suspended matter that may be attached to the light-sensitive material. In the processing of the present color light-sensitive material, such a problem can be extremely effectively solved by decreasing calcium and magnesium as described in Japanese Patent Application (OPI) No. 288838/87 (corresponding to European Patent Application No. 248459A). Such a problem can also be solved by the use of isothiazolone compounds and thiabendazole as described in Japanese Patent Application (OPI) No. 8542/82, chlorine bactericides such as sodium chlorinated isocyanurate, or bactericides such as benzotriazole as described in Hiroshi Horiguchi, *Chemistry of Bactericide and Antifugal Agents,* Association of Sanitary Engineering, *Sterilization of Microorganism, and Sterizilization and Antifugal Engineering,* and Japan Sterilization and Antifungal Association, *Dictionary of Bactericide and Antifungal Agents.*

The pH value of the washing water to be used in the processing of the present light-sensitive material is in the range of 4 and 9 and preferably 5 to 8. The temperature of washing water and the washing time can be freely determined depending on the properties and application of the light-sensitive material. The optimum washing time is normally between 20 seconds and 10 minutes at a temperature of 15° to 45° C., and preferably between 30 seconds and 5 minutes at a temperature of 25° to 50° C.

Furthermore, the present light-sensitive material may be processed directly with a stabilizing solution rather than by wahsing with water. In such a stabilizing process, known methods as described in Japanese Patent Application (OPI) Nos. 8543/82, 14834/83, 184343/84, 220345/85, 238832/85, 239784/85, 239749/85, 4054/86 and 118749/86 can all be used. Particularly, a stabilizing bath containing 1-hydroxyethylidene-1,1-diphosphonic acid, 5-chloro-2-methyl-4-isothiazoline-3-one, a bismuth compound, an ammonium compound, etc., may be preferably used in the present invention.

The washing process may be followed by a stabilizing process such as a stabilizing bath containing formalin and a surface active agent used as a final processing bath for color light-sensitive material for photography.

The silver halide color photographic material to be used in the present invention is described hereinafter. The emulsion layer in the light-sensitive material may comprise any silver halide selected from silver bromide, silver bromoiodide, silver chlorobromide, silver bromochloroiodide, silver chloride and silver chloroiodide. Particularly preferred among these silver halides is silver bromoiodide. If silver bromoiodide is used, its content of silver iodide is normally in the range of 40 mol % or less, preferably 20 mol % or less, and particularly 10 mol % or less.

The processing method of the present invention is further advantageous in that the bleaching of the light-sensitive material can be effectively accelerated even if the light-sensitive material contains silver iodide, which easily produces precipitation.

The above described particulate silver halide may have a regular crystal structure such as a cube, an octahedron and a tetradecahedron, an irregular crystal structure such as a sphere, a crystal structure having a crystal defect such as twinning plane, or a composite thereof. Alternatively, a mixture of grains of various crystal structure may be used.

the above described silver halide may be in the form of a monodispersed emulsion having a narrow distribution or a polydispersed emulsion having a wide distribution.

The above described emulsion layer may comprise tabular grains having an aspect ratio of 5 or more.

The crystal structure of the present silver halide grains may be uniform, or such that the halide composition varies between the inner portion and the outer portion thereof, or may be a layer. These emulsion grains are disclosed in British Patent No. 1,027,146, U.S. Pat. Nos. 3,505,068, 4,444,877, 4,668,614. Alternatively, silver halides having different compositions may be connected to each other by an epitaxial junction or by any suitable compound other than silver halide such as silver thiocyanate and zinc oxide.

The above described emulsion grains may be those of a surface latent image type in which latent images are formed mainly in the surface portion thereof or those of an internal latent image type in which latent images are formed mainly in the interior thereof. Alternatively, the above described emulsion grains may have the interior thereof chemically sensitized.

A silver halide photographic emulsion which can be used in the present invention can be produced by well known methods, for example, methods as described in *Research Disclosure,* RD No. 17643, vol. 176, pages 22 and 23, "Emulsion Preparation and Types" (Dec., 1978) and *Research Disclosure,* RD Np. 18716, Vol. 187, page 648 (Nov., 1979).

The preparation of a silver halide photographic emulsion which can be used in the present invention can be accomplished by using various silver halide solvents such as ammonia, potassium thiocyanate, and thioether and thione as described in U.S. Pat. No. 3,271,157 and Japanese Patent Application (OPI) Nos. 12360/76, 82408/78, 144319/78, 100717/79 and 155828/79.

A typical monodispersed emulsion is an emulsion of silver halide grains having an average grain diameter of more than about 0.1 μm in which the grain diameter of at least 95% by weight thereof falls within ±40% of the average grain diameter. In the present invention, an emulsion of silver halide grains having an average grain diameter of 0.25 to 2 μm in which the grain diameter of at least 95% by weight or number of grains falls within ±20% of the average grain diameter may be used.

In the process of formation or physical ripening of the silver halide grain, cadmium salts, zinc salts, lead salts, thallium salts, iridium salts or complex salts thereof, rhodium salts or complex salts thereof, or iron salts or complex salts thereof may coexist.

The emulsion to be used to be used in the present invention may be normally subjected to phsyical ripening and then to chemical ripening and spectral ripening before use. Examples of additives to be used in such processes are described in *Research Disclosure,* RD Nos. 17643 (December, 1978) and 18716 (November, 1979). The places where such a description is found are summarized in the table below.

Examples of known photographic additives which can be used in the present invention are described in these citations. The table shown below also contains the places where such a description is found.

| Additives | RD 17643 | RD 18716 |
|---|---|---|
| 1. Chemical Sensitizers | Page 23 | Page 648, right column |
| 2. Sensitivity Increasing Agents | — | Page 648, right column |
| 3. Spectral Sensitizers and Supersensitizers | Pages 23–24 | Page 648, right column to page 649, right column |
| 4. Brightening Agents | Page 24 | — |
| 5. Antifoggants and Stabilizers | Pages 24–25 | Page 649, right column |
| 6. Light Absorbers, Filter Dyes and Ultraviolet Absorbers | Pages 25–26 | Page 649, right column to page 650, left column |
| 7. Stain Inhibitors | Page 25, right column | Page 650, left to right column |
| 8. Dye Image Stabilizers | Page 25 | — |
| 9. Hardeners | Page 26 | Page 651, left column |
| 10. Binders | Page 26 | Page 651, left column |
| 11. Plasticizers and Lubricants | Page 27 | Page 650, right column |
| 12. Coating Aid and Surface Active Agents | Pages 26–27 | Page 650, right column |
| 13. Antistatic Agents | Page 27 | Page 650, right column |

As a spectral sensitizer for the present color photographic light-sensitive material there may be used any suitable spectral sensitizer selected from the above described known compounds. Particularly, exemplary compounds represented by the formula (IV) or (V) described in Japanese Patent Application No. 313598/86 (pp. 90–110) may be preferably used in the present processing process.

Various color couplers can be used in the present invention. Specific examples of such color couplers are described in patents cited in *Research Disclosure,* RD No. 17643 (VII-C to G). An important dye-forming coupler is a coupler which provides three primaries of subtractive color processes, i.e., yellow, magenta and cyan upon color development. Specific examples of a nondiffusible 4- or 2-equivalent dye-forming coupler of such a type include those described hereinafter besides those described in patents cited in *Research Disclosure,* RD No. 17643 (VII-C and D).

Typical examples of yellow couplers which may be used in the present invention include known oxygen-releasing type yellow couplers and nitrogen-releasing type yellow couplers, α-Pivaloylacetanilide couplers are excellent in the fastness of color-forming dye, particularly in the fastness to light. On the other hand, α-benzoylacetanilide couplers can provide a high color density.

Examples of magenta couplers which may be used in the present invention include a hydrophobic 5-pyrazolone and pyrazoloazole couplers containing ballast groups. Such 5-pyrazolone couplers preferably contain an arylamino group or an acylamino group as a substituent in the 3-position thereof in view of hue of the color-forming dye or color density.

As cyan couplers which may be used in the present invention, in addition to the cyan dye-forming couplers as described above, hydrophobic nondiffusible naphthonic and phenolic couples may be used. Preferred examples of such cyan couplers include oxygen-releasing type 2-equivalent naphtholic couplers.

A coupler which provides a color-forming dye having a proper diffusibility may be used in combination with the above described couplers to improve the graininess. Specific examples of such couplers include magenta couplers as described in U.S. Pat. No. 4,366,237, and yellow, magenta and cyan couplers as described in European Patent No. 96,570.

The above described dye-forming couplers and special couplers may form a dimer or higher polymer. Typical examples of polymerized dye-forming couplers are described in U.S. Pat. No. 3,451,820. Specific examples of polymerized magenta couplers are described in U.S. Pat. No. 4,367,292.

Couplers which release a photographically useful residual group may be preferably used in the present invention. Useful examples of DIR couplers which release a development inhibitor are described in patents cited in *Research Disclosure,* RD No. 17643 (VIIF).

The present light-sensitive material may comprise a coupler which imagewise releases a nucleating agent or a development accelerator or a precursor thereof upon development. Specific examples of such a coupler are described in British Patent Nos. 2,097,140 and 2,131,188. Other examples of such a coupler which may be used in the present invention include DIR redox compound-releasing couplers as described in Japanese Patent Application (OPI) No. 185950/85, and couplers which release a dye which restores color after coupling release as described in European Patent No. 173,302A.

The incorporation of the present couplers in the light-sensitive material can be accomplished by various known dispersion methods. Examples of high boiling point solvents which can be used in an oil-in-water dispersion method are described in U.S. Pat. No. 2,322,027. Specific examples of the process and effects of the latex dispersion method and latex for such dispersion method are described in U.S. Pat. No. 4,199,363 and West German Patent Application (OLS) Nos. 2,541,274 and 2,541,230.

The light-sensitive material to be used in the present invention may contain as a color antifoggants or color stain inhibitors hydroquinone derivatives, aminophenol derivatives, amine derivatives, gallic acid derivatives, catechol derivatives, ascorbic acid derivatives, colorless couplers, sulfonamidophenol derivatives or the like.

The light-sensitive material to be used in the present invention may comprise a known discoloration inhibitor. Typical examples of such a known discoloration inhibitor include hindered phenols such as hydroquinones, 6-hydroxycoumarones, 5-hydroxycoumarans, spirochromans, p-alkoxyphenols, hindered phenols or bisphenols, gallic acid derivatives, methylenedioxybenzenes, aminophenols, hindered amines, and ether or ester derivatives obtained by silylating or alkylating phenolic hydroxyl groups thereof. Furthermore, metal complexes such as (bissalicylaldoximate)nickel complex and (bis-N,N-dialkyldithiocarbamate)nickel complex may be used.

In the present photographic light-sensitive material, the photographic emulsion layer and other layers may be coated on a flexible support such as plastic film commonly used for photographic light-sensitive materials.

The coating of the photographic emulsion layer and other layers onto the support can be accomplished by any suitable method such as a dip coating method, a roller coating method, a curtain coating method and an extrusion coating method.

The present invention can be applied to various color light-sensitive materials, for example, color light-sensitive materials for a color negative film for a motion picture, a color reversal film for a slide or TV, a color paper, a color positive film or a color reversal paper.

The present invention will be further illustrated in the following examples, but the present invention should not be construed as being limited thereto.

Unless otherwise specified, all ratios, percents, etc., are by weight.

EXAMPLE I-1

A multilayer color light-sensitive material Specimen 101 was prepared by coating various layers of the undermentioned compositions on an undercoated cellulose triacetate film support.

Composition of Light-Sensitive Layer

The coated amount of silver halide and colloidal silver are represented by g/m$^2$ in terms of silver. The coated amount of coupler, additive and gelatin are represented by g/m$^2$. The coated amount of sensitizing dye is represented in terms of molar number per mol of silver halide contained in the same layer.

| | |
|---|---|
| First Layer: Antihalation Layer | |
| Black colloidal silver | 0.2 |
| Gelatin | 1.3 |
| Coupler ExM-9 | 0.06 |
| Ultraviolet Absorber UV-1 | 0.03 |
| Ultraviolet Absorber UV-2 | 0.06 |
| Ultraviolet Absorber UV-3 | 0.06 |
| Dispersing Oil Solv-1 | 0.15 |
| Dispersing Oil Solv-2 | 0.15 |
| Dispersing Oil Solv-3 | 0.05 |
| Second Layer: Interlayer | |
| Gelatin | 1.0 |
| Ultraviolet Absorber UV-1 | 0.03 |
| Coupler ExC-4 | 0.02 |
| Compound ExF-1 | 0.004 |
| Dispersing Oil Solv-1 | 0.1 |
| Dispersing Oil Solv-2 | 0.1 |
| Third Layer: Low Sensitivity Red-Sensitive Emulsion Layer | |
| Silver bromoiodide emulsion (AgI content: 4 mol %; uniform AgI type emulsion; diameter in terms of sphere: 0.5 μm; coefficient of variation in diameter in terms of sphere: 20%; tabular grain; diameter/thickness ratio: 3.0) | 1.2 |
| Silver bromoiodide emulsion (AgI content: 3 mol %; uniform AgI type emulsion; diameter | 0.6 |

-continued

| | |
|---|---|
| in terms of sphere: 0.3 μm; coefficient of variation in diameter in terms of sphere: 15%; spherical grain; diameter/thickness ratio: 1.0) | |
| Gelatin | 1.0 |
| Sensitizing Dye ExS-1 | $4 \times 10^{-4}$ |
| Sensitizing Dye ExS-2 | $5 \times 10^{-5}$ |
| Coupler ExC-1 | 0.05 |
| Coupler ExC-2 | 0.50 |
| Coupler ExC-3 | 0.03 |
| Coupler ExC-4 | 0.12 |
| Coupler ExC-5 | 0.01 |
| Fourth Layer: High Sensitivity Red-Sensitive Emulsion Layer | |
| Silver bromoiodide emulsion (AgI content: 6 mol %; high internal AgI content type having a core/shell ratio of 1/1; diameter in terms of sphere: 0.7 μm; coefficient of variation in diameter in terms of sphere: 15%; tabular grain; diameter/thickness ratio: 5.0) | 0.7 |
| Gelatin | 1.0 |
| Sensitizing Dye ExS-1 | $3 \times 10^{-4}$ |
| Sensitizing Dye ExS-2 | $2.3 \times 10^{-5}$ |
| Coupler ExC-6 | 0.11 |
| Coupler ExC-7 | 0.05 |
| Coupler ExC-4 | 0.05 |
| Dispersing Oil Solv-1 | 0.05 |
| Dispersing Oil Solv-3 | 0.05 |
| Fifth Layer: Interlayer | |
| Gelatin | 0.5 |
| Compound Cpd-1 | 0.1 |
| Dispersing Oil Solv-1 | 0.05 |
| Sixth Layer: Low Sensitivity Green-Sensitive Emulsion Layer | |
| Silver bromoiodide emulsion (AgI content: 4 mol %; high surface AgI content type having a core/shell ratio of 1/1; diameter in terms of sphere: 0.5 μm; coefficient of variation in diameter in terms of sphere: 15%; tabular grain; diameter/thickness ratio: 4.0) | 0.35 |
| Silver bromoiodide emulsion (AgI content: 3 mol %; uniform AgI type; diameter in terms of sphere: 0.3 μm; coefficient of variation in diameter in terms of sphere: 25%; spherical grain; diameter/thickness ratio: 1.0) | 0.20 |
| Gelatin | 1.0 |
| Sensitizing Dye ExS-3 | $5 \times 10^{-4}$ |
| Sensitizing Dye ExS-4 | $3 \times 10^{-4}$ |
| Sensitizing Dye ExS-5 | $1 \times 10^{-4}$ |
| Coupler ExM-8 | 0.4 |
| Coupler ExM-9 | 0.07 |
| Coupler ExM-10 | 0.02 |
| Coupler ExY-11 | 0.03 |
| Dispersing Oil Solv-1 | 0.3 |
| Dispersing Oil Solv-4 | 0.05 |
| Seventh Layer: High Sensitivity Green-Sensitive Emulsion Layer | |
| Silver bromoiodide emulsion (AgI content: 4 mol %; high internal AgI content type having a core/shell ratio of 1/3; diameter in terms of sphere: 0.7 μm; coefficient of variation in diameter in terms of sphere: 20%; tabular grain; diameter/thickness ratio: 5.0) | 0.8 |
| Sensitizing Dye ExS-3 | $5 \times 10^{-4}$ |
| Sensitizing Dye ExS-4 | $3 \times 10^{-4}$ |
| Sensitizing Dye ExS-5 | $1 \times 10^{-4}$ |
| Coupler ExM-8 | 0.1 |
| Coupler ExM-9 | 0.02 |
| Coupler ExY-11 | 0.03 |
| Coupler ExC-2 | 0.03 |
| Coupler ExM-14 | 0.01 |
| Dispersing Oil Solv-1 | 0.2 |
| Dispersing Oil Solv-4 | 0.01 |
| Eighth Layer: Interlayer | |
| Gelatin | 0.5 |
| Compound Cpd-1 | 0.05 |
| Dispersing Oil Solv-1 | 0.02 |
| Ninth Layer: Donor Layer Having a Multilayered Effect on Red-Sensitive Layer | |
| Silver bromoiodide emulsion (AgI content: 2 mol %; high internal AgI content type having a core/shell ratio of 2/1; diameter in terms of sphere: 1.0 μm; coefficient of variation in diameter in terms of sphere: 15%; tabular grain; diameter/thickness ratio: 6.0) | 0.35 |
| Silver bromoiodide emulsion (AgI content: 2 mol %; high internal AgI content type having a core/shell ratio of 1/1; diameter in terms of sphere: 0.4 μm; coefficient of variation in diameter in terms of sphere: 20%; tabular grain; diameter/thickness ratio: 6.0) | 0.20 |
| Gelatin | 0.5 |
| Sensitizing Dye ExS-3 | $8 \times 10^{-4}$ |
| Coupler ExY-13 | 0.11 |
| Coupler ExM-12 | 0.03 |
| Coupler ExM-14 | 0.10 |
| Dispersing Oil Solv-1 | 0.20 |
| Tenth Layer: Yellow Filter Layer | |
| Yellow colloidal silver | 0.05 |
| Gelatin | 0.5 |
| Compound Cpd-2 | 0.13 |
| Compound Cpd-1 | 0.10 |
| Eleventh Layer: Low Sensitivity Blue-Sensitive Emulsion Layer | |
| Silver bromoiodide emulsion (AgI content: 4.5 mol %; uniform AgI type; diameter in terms of sphere: 0.7 μm; coefficient of variation in diameter in terms of sphere: 15%; tabular grain; diameter/thickness ratio: 7.0) | 0.3 |
| Silver bromoiodide emulsion (AgI content: 3 mol %; uniform AgI type; diameter in terms of sphere: 0.3 μm; coefficient of variation in diameter in terms of sphere: 25%; tabular grain; diameter/thickness ratio: 7.0) | 0.15 |
| Gelatin | 1.6 |
| Sensitizing Dye ExS-6 | $2 \times 10^{-4}$ |
| Coupler ExC-16 | 0.05 |
| Coupler ExC-2 | 0.10 |
| Coupler ExC-3 | 0.02 |
| Coupler ExY-13 | 0.07 |
| Coupler ExY-15 | 0.5 |
| Coupler ExY-17 | 1.0 |
| Dispersing Oil Solv-1 | 0.20 |
| Twelfth Layer: High Sensitivity Blue-Sensitive Emulsion Layer | |
| Silver bromoiodide emulsion (AgI content: 10 mol %; high internal AgI content type; diameter in terms of sphere: 1.0 μm; coefficient of variation in diameter in terms of sphere: 25%; multiple twinned crystal tabular grain; diameter/thickness ratio: 2.0) | 0.5 |
| Gelatin | 0.5 |
| Sensitizing Dye ExS-6 | $1 \times 10^{-4}$ |
| Coupler ExY-15 | 0.20 |
| Coupler ExY-13 | 0.01 |
| Dispersing Oil Solv-1 | 0.10 |
| Thirteenth Layer: First Protective Layer | |
| Gelatin | 0.8 |
| Ultraviolet Absorber UV-4 | 0.1 |
| Ultraviolet Absorber UV-5 | 0.15 |
| Dispersing Oil Solv-1 | 0.01 |
| Dispersing Oil Solv-2 | 0.01 |
| Fourteenth Layer: Second Protective Layer | |
| Emulsion of finely divided silver bromide (AgI content: 2 mol %; uniform AgI type; diameter in terms of sphere: 0.07 μm) | 0.5 |
| Gelatin | 0.45 |
| Polymethylmethacrylate particle (diameter: 1.5 μm) | 0.2 |
| Film Hardener H-1 | 0.4 |
| Compound Cpd-3 | 0.5 |
| Compound Cpd-4 | 0.5 |

Besides the above described components, Emulsion Stabilizer Cpd-3 and Surface Active Agent Cpd-4 were added to each of these layers as coating aids in amounts of 0.04 g/m$^2$ and 0.02 g/m$^2$, respectively. Furthermore, the undermentioned Compounds Cpd-5 and Cpd-6 were added to these layers in amounts of 0.5 g/m$^2$.

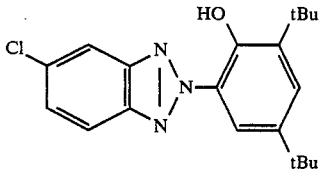
UV-1
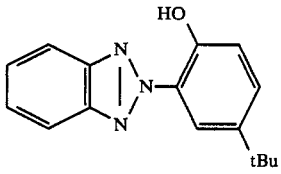
UV-2
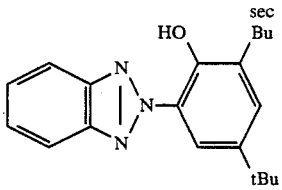
UV-3
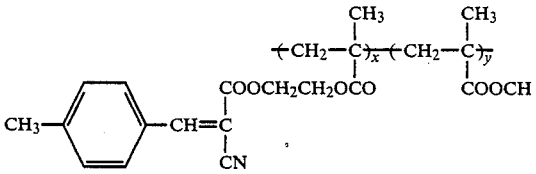
x/y = 7/3 (weight ratio)
UV-4
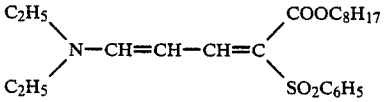
UV-5
Tricresyl phosphate — Solv-1
Dibutyl phthalate — Solv-2
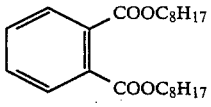
Solv-3
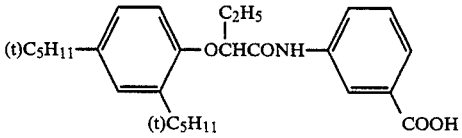
Solv-4
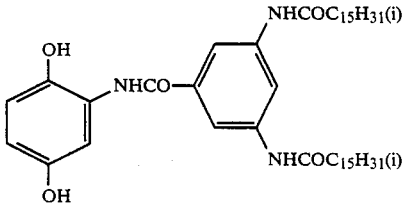
Cpd-1
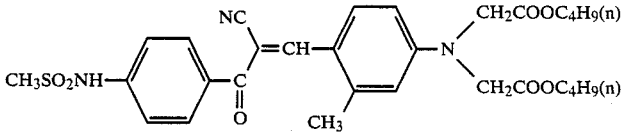
Cpd-2

-continued
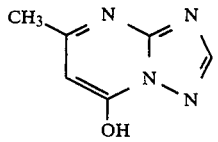
Cpd-3
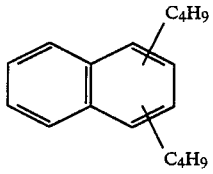
Cpd-4
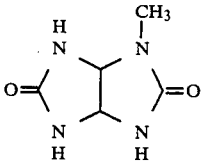
Cpd-5
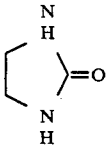
Cpd-6
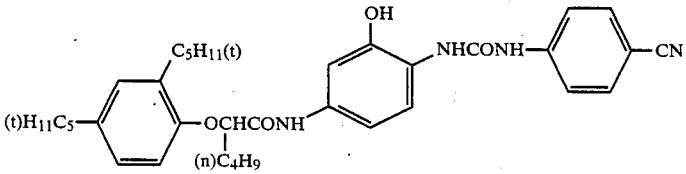
ExC-1
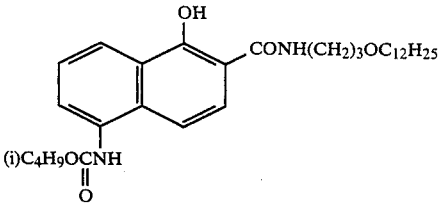
ExC-2
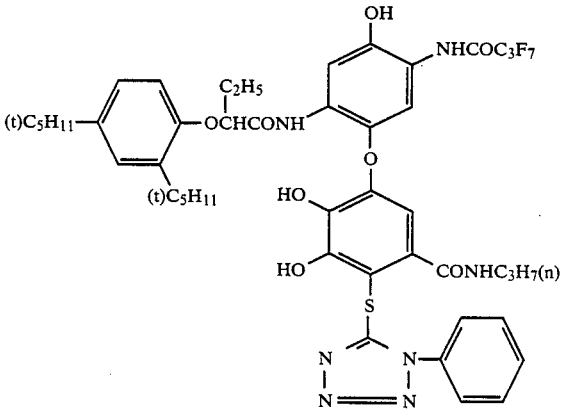
ExC-3

-continued
ExC-4
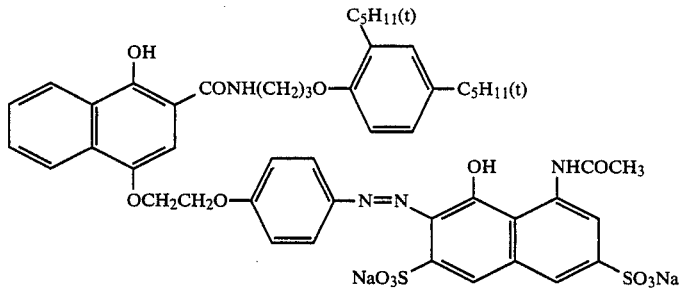
ExC-5
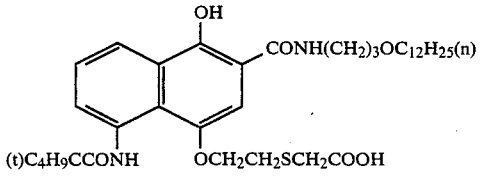
ExC-6
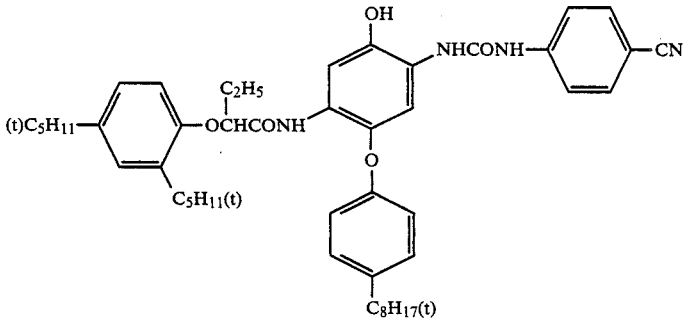
ExC-7
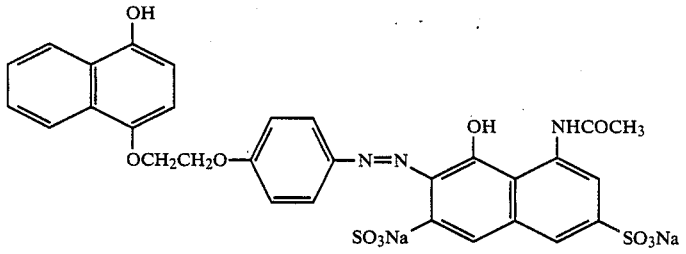
ExM-8
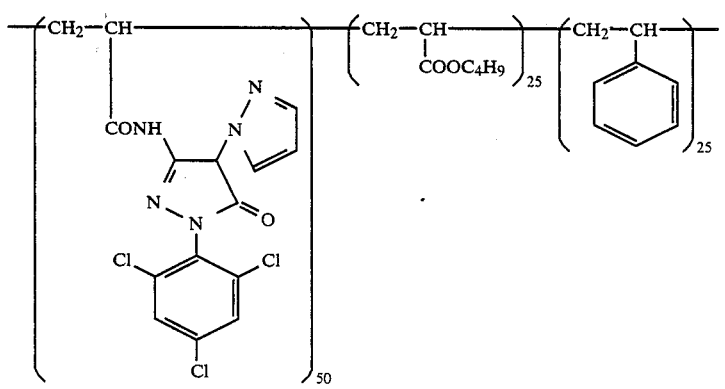
Molecular weight 30,000

-continued
ExM-9
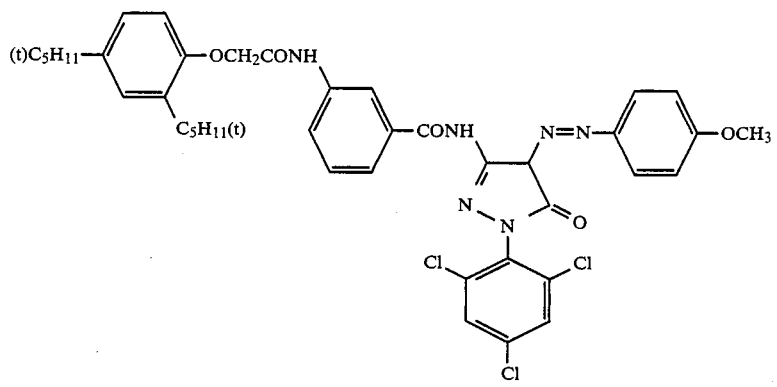
ExM-10
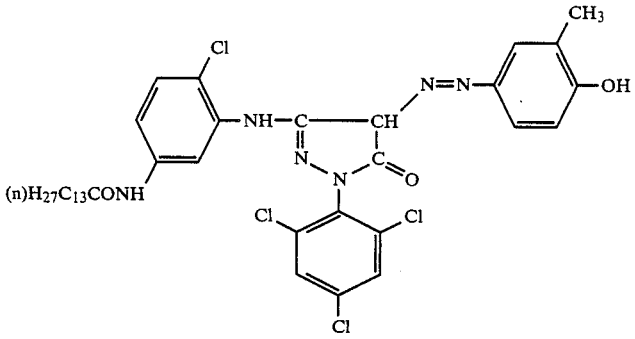
ExM-11
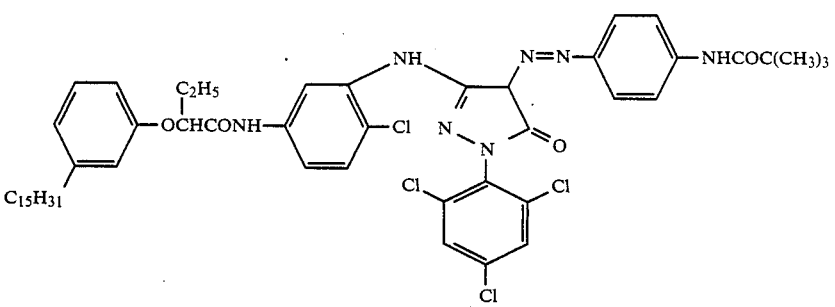
ExY-11
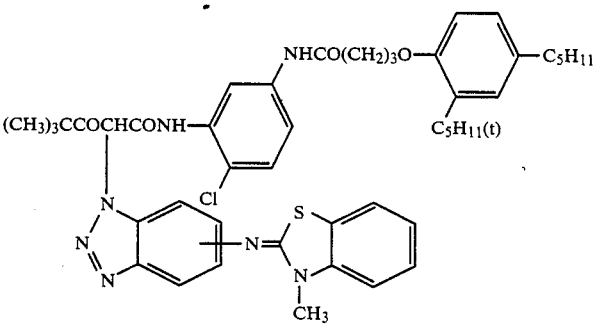

-continued
ExM-12
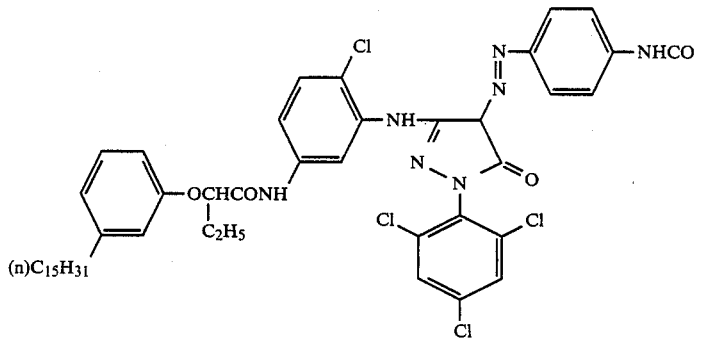
ExY-13
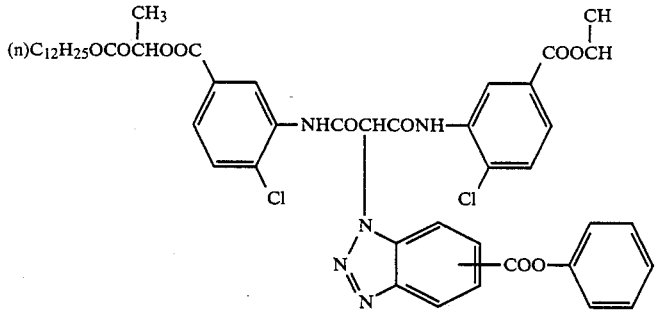
ExM-14
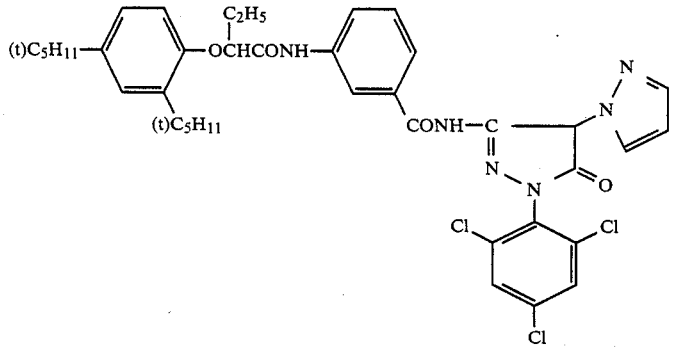
ExY-15
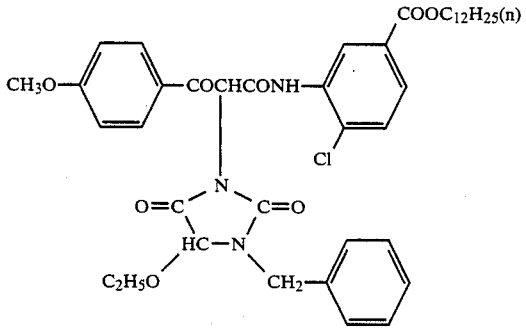

-continued
ExC-16
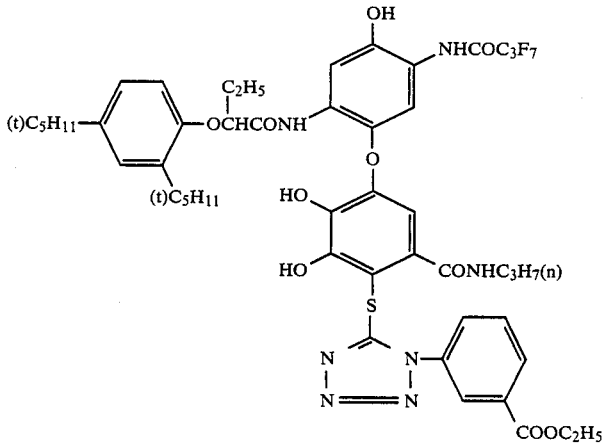
ExY-17
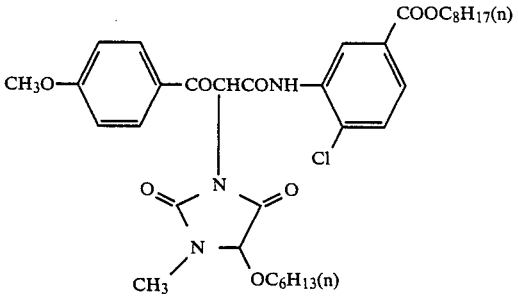
ExS-1
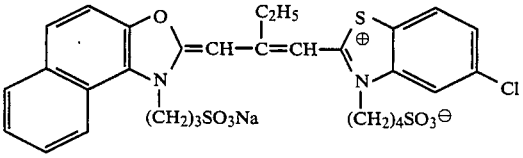
ExS-2
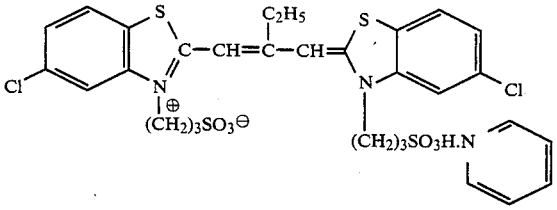
ExS-3
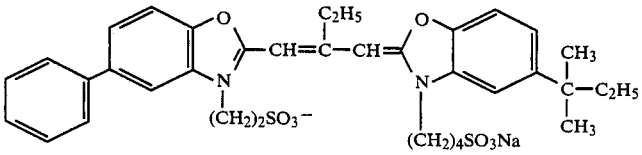
ExS-4
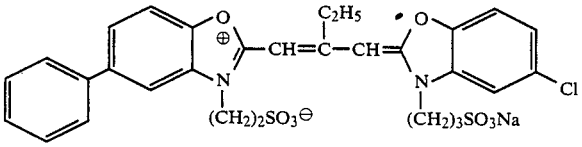
ExS-5
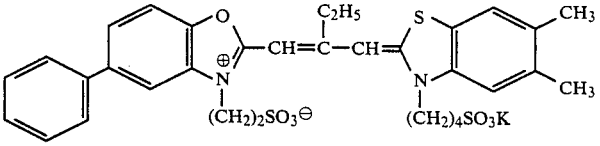

-continued

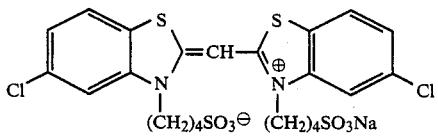

ExS-6

$CH_2{=}CH{-}SO_2{-}CH_2{-}CONH{-}CH_2$
$CH_2{=}CH{-}SO_2{-}CH_2{-}CONH{-}CH_2$

H-1

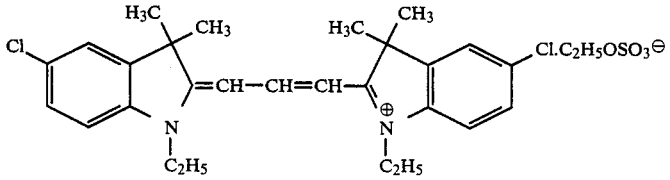

ExF-1

Specimens 102 to 105 were then prepared in the same manner as in Specimen 101 except that the respective couplers for the third, fourth, sixth, seventh, eleventh and twelfth layers were replaced by those shown in the following Table 1-1.

TABLE I-1

| | Cyan Coupler | | Magenta Coupler | | Yellow Coupler | |
|---|---|---|---|---|---|---|
| Specimen | 3rd Layer | 4th Layer | 6th Layer | 7th Layer | 11th Layer | 12th Layer |
| 101 | ExC-2 | ExC-6 | ExM-8 | ExM-8 | ExY-15 | ExY-15 |
| 102 | Compound (3) | Compound (13) | " | " | " | " |
| 103 | " | " | Compound (44) | Compound (44) | " | " |
| 104 | " | " | " | " | Compound (43) | Compound (43) |
| 105 | " | " | Compound (15) | Compound (44) | Compound (42) | Compound (42) |

The coated amount of silver in these Specimens 101 to 105 were all in the range of 6.05±0.02 g/m².

Color photographic light-sensitive material Specimens 101 to 105 thus prepared were then exposed to light and processed by means of an automatic developing machine in the following manner (until the cumulative supply of the color developing solution reached three times the volume of the mother liquor tank).

| Step | Processing Time | Processing A Processing Temperature (°C.) | Replenished Amount of Replenisher (ml) | Capacity of Tank (ml) |
|---|---|---|---|---|
| Color Development | 3 min 15 sec | 38 | 420 | 700 |
| Bleaching | 1 min 00 sec | " | 570 | 700 |
| Blixing | 3 min 15 sec | " | 850 | 700 |
| Washing (1) | 40 sec | 35 | Countercurrent from (2) to (1) | 700 |
| Washing (2) | 1 min 00 sec | " | 850 | 700 |
| Stabilization | 40 sec | 38 | 570 | 700 |
| Drying | 1 min 15 sec | 55 | — | — |

The replenished amount of replenisher is represented in terms of the amount replenished per m² of the light-sensitive material.

The composition of the processing solutions were as follows:

| Color Developing Solution: | Mother Liquor (g) | Replenisher (g) |
|---|---|---|
| Diethylenetriaminepentaacetate | 1.0 | 1.1 |
| 1-Hydroxyethylidene-1,1-diphosphonic acid | 3.0 | 3.2 |
| Sodium sulfite | 4.0 | 4.8 |
| Potassium carbonate | 30.0 | 30.0 |
| Potassium bromide | 1.4 | — |
| Potassium iodide | 1.5 mg | — |
| Hydroxylamine sulfate | 2.4 | 3.2 |
| 4-[N-Ethyl-N-(β-hydroxyethyl)amino]-2-methylaniline sulfate | 4.5 | 7.0 |
| Water to make | 1.0 l | 1.0 l |
| pH | 10.05 | 10.05 |

| Bleaching Solution (mother liquor was also used as replenisher) | |
|---|---|
| Ferric ammonium ethylenediaminetetraacetate dihydrate ($NH_4$[Fe(III)(EDTA)] (dihydrate)) | 120.0 g |
| Disodium ethylenediaminetetraacetate (EDTA · 2Na) | 10.0 g |
| Ammonium bromide | 100.0 g |
| Ammonium nitrate | 10.0 g |
| Ammonia water (27 wt %) | 15.0 ml |
| Water to make | 1.0 l |
| pH | 6.3 |

| Blixing Solution (mother liquor was also used as replenisher) | |
|---|---|
| $NH_4$[Fe(III)(EDTA)] (dihydrate) | 50.0 g |
| EDTA · 2Na | 5.0 g |
| Sodium sulfite | 12.0 g |
| Aqueous solution of ammonium thiosulfate | 240.0 ml |

-continued

| | |
|---|---|
| (70 wt %) | |
| Ammonia water (27 wt %) | 6.0 ml |
| Water to make | 1.0 l |
| pH | 7.2 |

Washing Solution (mother liquor was also used as replenisher):

City water was passed through a mixed bed column filled with a strongly acidic H type cation exchange resin (Amberlite IR-120B manufactured by Rohm & Haas Co.) and an OH type anion exchange resin (Amberlite IR-400 manufactured by Rohm & Haas Co.) so that the concentration of calcium and magnesium ions were reduced to 3 mg/liter or less. Sodium bichlorinated isocyanurate and sodium sulfate were added to the water in amounts of 20 mg/liter and 1.5 g/liter, respectively.

The pH of the washing solution thus prepared was in the range of 6.5 to 7.5.

| Stabilizing Solution (mother liquor was also used as replenisher) | |
|---|---|
| Formalin (37 wt %) | 2.0 ml |
| Polyoxyethylene-p-monononylphenylether (average polymerization degree: 10) | 0.3 g |
| EDTA · 2Na | 0.05 |
| Water to make | 1.0 l |
| pH to make | 5.0 to 8.0 |

The above described specimens were then subjected to a continuous processing. The amount of the bleaching solution and blixing solution replenished were changed as shown in Table I-2(Processing A).

Specimen 101 was subjected to a continuous processing in the same manner as in Processing A except that the undermentioned bleaching accelerator was added to the bleaching solution (Processing B).

Bleaching Accelerator

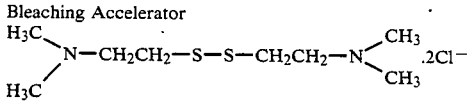

The added amount of this bleaching accelerator was $5\times10^{-3}$ mol/liter-the bleaching solution.

Specimen 101 was also subjected to a continuous processing in the same manner as in Processing A except that the undermentioned bleaching accelerator was added to the bleaching solution (Processing C).

Bleaching Accelerator

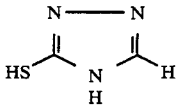

The added amount of this bleaching accelerator was $5\times10^{-3}$ mol/liter-the bleaching solution. At the beginning and the end of each continuous processing, specimens which had been exposed to light of 4,200° K. 20 CMS were processed. These specimens thus processed were measured for the amount of residual silver by a flourescent X-ray analysis method. After the continuous processings, the bleaching solution and the blixing solution were examined for the presence of any precipitate. The results are shown in Table I-2.

Table I-2 shows that the present light-sensitive material specimens can provide images having a small amount of residual silver even if processed with a lesser amount of the processing solution replenished at the desilvering step. The results also show that the present light-sensitive material specimens leave a small amount of precipitate in the processing solution.

EXAMPLE I-2

Specimens 106 and 107 having different coated amounts of silver from Specimen 104 were prepared in the same manner as in Specimen 104 except that the coated amount of each layer was changed. These specimens were then subjected to a continuous processing in the same masnner as in Processing A of Example I-1.

In the same manner as in Example I-1, these specimens were examined for the amount of residual silver at the beginning, the middle and the end of the continuous processing. These specimens were also checked for the presence of precipitate in the bleaching solution and the blixing solution after being processed. The results are shown in Table I-3.

TABLE I-2

| Sample No. | Processing Step | Specimen | Replenished Amount at Desilvering Step: Bleaching Solution (ml/m²) | Replenished Amount at Desilvering Step: Blixing Solution (ml/m²) | Amount of Residual Silver at Continuous Processing: Beginning (μg/cm²) | Amount of Residual Silver at Continuous Processing: End (μg/cm²) | Turbidity in Bleaching Solution and Blixing Solution* | Remarks |
|---|---|---|---|---|---|---|---|---|
| 2-1 | A | 101 | 420 | 570 | 28.6 | 24.8 | N | Comparison |
| 2-2 | " | " | 300 | 400 | 28.8 | 22.4 | N | " |
| 2-3 | " | " | 210 | 285 | 28.3 | 20.5 | N | " |
| 2-4 | " | " | 140 | 190 | 28.5 | 19.8 | N | " |
| 2-5 | B | " | 420 | 570 | 1.2 | 2.4 | N | " |
| 2-6 | " | " | 300 | 400 | 1.5 | 5.9 | N | " |
| 2-7 | " | " | 210 | 285 | 1.4 | 7.2 | N | " |
| 2-8 | " | " | 140 | 190 | 1.3 | 9.4 | O | " |
| 2-9 | C | " | 420 | 570 | 0.8 | 4.2 | N | " |
| 2-10 | " | " | 300 | 400 | 0.7 | 6.9 | N | " |
| 2-11 | " | " | 210 | 285 | 1.0 | 8.5 | O | " |
| 2-12 | " | " | 140 | 190 | 1.1 | 12.4 | O | " |
| 2-13 | A | 102 | 420 | 570 | 1.3 | 2.0 | N | Invention |
| 2-14 | " | " | 300 | 400 | 1.5 | 2.2 | N | " |
| 2-15 | " | " | 210 | 285 | 1.4 | 3.6 | N | " |
| 2-16 | " | " | 140 | 190 | 1.8 | 4.3 | N | " |
| 2-17 | A | 103 | 420 | 570 | 0.1 | 1.6 | N | " |
| 2-18 | " | " | 300 | 400 | 0.3 | 1.6 | N | " |
| 2-19 | " | " | 210 | 285 | 0.2 | 1.5 | N | " |

TABLE I-2-continued

| Sample No. | Processing Step | Specimen | Replenished Amount at Desilvering Step: Bleaching Solution (ml/m²) | Replenished Amount at Desilvering Step: Blixing Solution (ml/m²) | Amount of Residual Silver at Continuous Processing: Beginning (μg/cm²) | Amount of Residual Silver at Continuous Processing: End (μg/cm²) | Turbidity in Bleaching Solution and Blixing Solution* | Remarks |
|---|---|---|---|---|---|---|---|---|
| 2-20 | " | " | 140 | 190 | 0.3 | 2.0 | N | " |
| 2-21 | A | 104 | 420 | 570 | 0.4 | 1.8 | N | " |
| 2-22 | " | " | 300 | 400 | 0.2 | 2.0 | N | " |
| 2-23 | " | " | 210 | 285 | 0.3 | 1.6 | N | " |
| 2-24 | " | " | 140 | 190 | 0.2 | 1.4 | N | " |
| 2-25 | A | 105 | 420 | 570 | 0.3 | 1.9 | N | " |
| 2-26 | " | " | 300 | 400 | 0.4 | 2.1 | N | " |
| 2-27 | " | " | 210 | 285 | 0.2 | 1.8 | N | " |
| 2-28 | " | " | 140 | 190 | 0.5 | 2.3 | N | " |

*N: No turbidity was observed, O: Turbidity was observed

TABLE I-3

| Sample No. | Processing Step | Specimen (coated amount of silver) (g/m²) | Replenished Amount at Desilvering Step: Bleaching Solution (ml/m²) | Replenished Amount at Desilvering Step: Blixing Solution (ml/m²) | Amount of Residual Silver at Continuous Processing: Beginning (μg/cm²) | Amount of Residual Silver at Continuous Processing: Middle (μg/cm²) | Amount of Residual Silver at Continuous Processing: End (μg/cm²) | Turbidity in Bleaching Solution and Blixing Solution* | Remarks |
|---|---|---|---|---|---|---|---|---|---|
| 3-1 | A | 104 (6.04) | 420 | 570 | 0.4 | 1.3 | 1.8 | N | Invention |
| 3-2 | " | " | 300 | 400 | 0.2 | 1.0 | 2.0 | N | " |
| 3-3 | " | " | 210 | 285 | 0.3 | 1.2 | 1.6 | N | " |
| 3-4 | " | " | 140 | 190 | 0.2 | 1.4 | 1.4 | N | " |
| 3-5 | " | 106 (10.24) | 420 | 570 | 0.6 | 1.5 | 2.1 | N | " |
| 3-6 | " | " | 300 | 400 | 0.3 | 1.3 | 2.3 | N | " |
| 3-7 | " | " | 210 | 285 | 0.5 | 1.4 | 2.0 | N | " |
| 3-8 | " | " | 140 | 190 | 0.4 | 1.7 | 2.5 | N | " |
| 3-9 | " | 107 (3.50) | 420 | 570 | 0.2 | 1.0 | 1.2 | N | " |
| 3-10 | " | " | 300 | 400 | 0.2 | 1.1 | 1.3 | N | " |
| 3-11 | " | " | 210 | 285 | 0.1 | 0.8 | 1.0 | N | " |
| 3-12 | " | " | 140 | 190 | 0.2 | 0.9 | 1.0 | N | " |

*N: No turbidity was observed, O: Turbidity was observed

The results thus obtained was similar to those of Example I-1. Table I-3 shows that the light-sensitive material specimens having 3.5 to 10.2 g of silver coated per m² provide excellent results.

EXAMPLE I-3.

Specimens 101 to 105 prepared in Example I-1 were exposed to light and then processed by means of an automatic developing machine in the following manner (until the cumulative amount of the color developing solution reached three times the volume of the mother liquor tank).

| Step | Processing Time | Processing Temperature (°C.) | Replenished Amount of Replenisher (ml) | Capacity of Tank (ml) |
|---|---|---|---|---|
| Color Development | 3 min 15 sec | 38 | 420 | 700 |
| Bleaching | 6 min | 38 | Shown in Table I-4 | 700 |
| Fixing | 3 min | 38 | Shown in Table I-4 | 700 |
| Washing | 40 sec | 35 | Counter-current from (2) to (1) | 700 |
| Washing (2) | 1 min | 35 | 850 | 700 |

-continued

| Step | Processing Time | Processing Temperature (°C.) | Replenished Amount of Replenisher (ml) | Capacity of Tank (ml) |
|---|---|---|---|---|
| Stabilizing | 40 sec | 35 | 570 | 700 |
| Drying | 1 min 15 sec | 55 | — | — |

The replenished amount of replenisher is represented by the value per length of the specimen (11 m).

The compositions of the processing solutions are described hereinafter.

The color developing solution, the bleaching solution, the washing solution and the stabilizing solution were each prepared in the same manner as in Example I-1.

| Fixing Solution (mother liquor was also used as replenisher) | |
|---|---|
| Aqueous solution of ammonium thiosulfate (70 wt %) | 240 ml |
| Sodium sulfite | 12.0 g |
| EDTA · 2Na | 5.0 g |
| Ammonia Water | 2.0 ml |
| Water to make | 1,000 ml |
| pH | 7.50 |

The results are shown in Table I-4.

TABLE I-4

| Sample No. | Bleaching Solution | Specimen | Replenished Amount at Desilvering Step: Bleaching Solution (ml/m²) | Replenished Amount at Desilvering Step: Blixing Solution (ml/m²) | Amount of Residual Silver at Continuous Processing: Beginning (μg/cm²) | Amount of Residual Silver at Continuous Processing: Middle (μg/cm²) | Amount of Residual Silver at Continuous Processing: End (μg/cm²) | Turbidity in Bleaching Solution and Blixing Solution* | Remarks |
|---|---|---|---|---|---|---|---|---|---|
| 4-1 | A | 101 | 420 | 570 | 40.6 | 37.4 | 37.8 | N | Comparison |
| 4-2 | " | " | 300 | 400 | 40.2 | 36.8 | 35.4 | N | " |
| 4-3 | " | " | 210 | 285 | 39.4 | 38.1 | 39.4 | N | " |
| 4-4 | " | " | 140 | 190 | 39.7 | 37.5 | 40.2 | N | " |
| 4-5 | B | 101 | 420 | 570 | 2.3 | 2.8 | 4.1 | N | " |
| 4-6 | " | " | 300 | 400 | 2.6 | 3.6 | 6.0 | N | " |
| 4-7 | " | " | 210 | 285 | 2.4 | 5.9 | 8.4 | O | " |
| 4-8 | " | " | 140 | 190 | 2.3 | 7.8 | 15.4 | O | " |
| 4-9 | A | 102 | 420 | 570 | 2.5 | 2.8 | 2.9 | N | Invention |
| 4-10 | " | " | 300 | 400 | 2.6 | 2.7 | 3.0 | N | " |
| 4-11 | " | " | 210 | 285 | 2.3 | 2.9 | 3.6 | N | " |
| 4-12 | " | " | 140 | 190 | 2.8 | 3.2 | 4.5 | N | " |
| 4-13 | A | 103 | 420 | 570 | 0.8 | 2.0 | 2.5 | N | Invention |
| 4-14 | " | " | 300 | 400 | 0.6 | 1.9 | 2.4 | N | " |
| 4-15 | " | " | 210 | 285 | 0.7 | 1.8 | 2.4 | N | " |
| 4-16 | " | " | 140 | 190 | 0.8 | 2.0 | 2.6 | N | " |
| 4-17 | A | 104 | 420 | 570 | 1.2 | 2.4 | 2.8 | N | " |
| 4-18 | " | " | 300 | 400 | 1.3 | 2.3 | 2.9 | N | " |
| 4-19 | " | " | 210 | 285 | 1.4 | 2.6 | 2.9 | N | " |
| 4-20 | " | " | 140 | 190 | 1.3 | 2.8 | 3.1 | N | " |
| 4-21 | A | 105 | 420 | 570 | 1.5 | 2.6 | 2.8 | N | " |
| 4-22 | " | " | 300 | 400 | 1.4 | 2.6 | 2.9 | N | " |
| 4-23 | " | " | 210 | 285 | 1.6 | 2.5 | 2.8 | N | " |
| 4-24 | " | " | 140 | 190 | 1.4 | 2.8 | 3.0 | N | " |

*N: No turbidity was observed,
O: Turbidity was observed

The results thus obtained were similar to those of Example I-1.

EXAMPLE I-4

Specimens 101 to 105 prepared in Example I-1 were exposed to light and then processed by means of an automatic developing machine in the following manner (until the cumulative replenished amount of the processing solution reached three times the volume of the mother liquor tank).

| Step | Processing Time | Processing Temperature (°C.) | Replenished Amount of Replenisher (ml) | Capacity of Tank (ml) |
|---|---|---|---|---|
| Color Development | 3 min 15 sec | 38 | 420 | 700 |
| Blixing | 4 min 30 sec | 38 | Shown in Table I-5 | 700 |
| Washing (1) | 40 sec | 35 | Counter-current from (2) to (1) | 700 |
| Washing (2) | 1 min | 35 | 850 | 700 |
| Stabilizing | 40 sec | 35 | 570 | 700 |
| Drying | 1 min 15 sec | 55 | — | — |

The replenished amount of replenisher is represented by the amount supplied per unit length of the specimen (1 m).

The composition of the processing solutions is described hereinafter.

All the processing solutions were prepared in the same manner as in Example I-1.

The results are shown in Table I-5.

TABLE I-5

| Sample No. | Blixing Solution | Specimen | Replenished Amount at Desilvering Step Blixing Solution (ml/m²) | Amount of Residual Silver at Continuous Processing: Beginning (μg/cm²) | Amount of Residual Silver at Continuous Processing: Middle (μg/cm²) | Amount of Residual Silver at Continuous Processing: End (μg/cm²) | Turbidity in Blixing Solution* | Remarks |
|---|---|---|---|---|---|---|---|---|
| 5-1 | A | 101 | 570 | 58.7 | 48.4 | 49.1 | N | Comparison |
| 5-2 | " | " | 400 | 56.5 | 47.2 | 50.2 | N | " |
| 5-3 | " | " | 285 | 57.4 | 46.6 | 50.4 | N | " |
| 5-4 | " | " | 190 | 58.2 | 47.4 | 52.1 | N | " |
| 5-5 | C | 101 | 570 | 0.8 | 3.5 | 10.4 | N | " |
| 5-6 | " | " | 400 | 1.0 | 5.9 | 15.3 | N | " |
| 5-7 | " | " | 285 | 1.3 | 10.8 | 20.4 | O | " |
| 5-8 | C | " | 190 | 0.9 | 19.4 | 37.0 | O | " |
| 5-9 | A | 102 | 570 | 2.2 | 2.6 | 2.8 | N | Invention |
| 5-10 | " | " | 400 | 2.1 | 2.4 | 2.5 | N | " |
| 5-11 | " | " | 285 | 2.3 | 3.5 | 3.9 | N | " |
| 5-12 | " | " | 190 | 2.5 | 7.3 | 10.4 | N | " |

TABLE I-5-continued

| Sample No. | Blixing Solution | Specimen | Replenished Amount at Desilvering Step Blixing Solution (ml/m²) | Amount of Residual Silver at Continuous Processing Beginning (μg/cm²) | Middle (μg/cm²) | End (μg/cm²) | Turbidity in Blixing Solution* | Remarks |
|---|---|---|---|---|---|---|---|---|
| 5-13 | A | 103 | 570 | 1.0 | 1.1 | 1.6 | N | Invention |
| 5-14 | " | " | 400 | 0.8 | 1.2 | 1.5 | N | " |
| 5-15 | " | " | 285 | 1.1 | 2.2 | 3.0 | N | " |
| 5-16 | " | " | 190 | 0.7 | 4.8 | 6.4 | N | " |
| 5-17 | A | 104 | 570 | 0.6 | 1.0 | 1.0 | N | " |
| 5-18 | " | " | 400 | 0.5 | 0.9 | 1.0 | N | " |
| 5-19 | " | " | 285 | 0.4 | 2.8 | 4.6 | N | " |
| 5-20 | " | " | 190 | 0.5 | 5.5 | 7.2 | N | " |
| 5-21 | A | 105 | 570 | 0.7 | 0.8 | 0.9 | N | " |
| 5-22 | " | " | 400 | 0.8 | 1.0 | 1.1 | N | " |
| 5-23 | " | " | 285 | 0.7 | 3.0 | 4.2 | N | " |
| 5-24 | " | " | 190 | 0.9 | 4.9 | 6.8 | N | " |

*N: No turbidity was observed,
O: Turbidity was observed

Table I-5 shows that the results thus obtained were similar to those of Example I-1.

EXAMPLE I-5

A color photographic light-sensitive material Specimen 201 was prepared by coating the undermentioned first layer to twelfth layer on a paper support having polyethylene laminated on both surfaces thereof. The polyethylene contains titanium white as a white pigment and a slight amount of ultramarine as a bluish dye at the side thereof on which the first layer was coated.

Composition of Light-Sensitive Layer:

The coated amount of each composition is represented by g/m². The coated amount of silver halide is represented in terms of amount of silver.

| | |
|---|---|
| First Layer: | |
| Gelatin | 1.30 |
| Second Layer: Antihalation Layer | |
| Black colloidal silver | 0.10 |
| Gelatin | 0.70 |
| Third Layer: Low Sensitivity Red-Sensitive Layer | |
| Silver bromoiodide spectrally sensitized with red-sensitive sensitizing dyes *1 and *2 (silver iodide content: 5.0 mol %; average grain size: 0.4 μm) | 0.15 |
| Gelatin | 1.00 |
| Cyan coupler (*3) | 0.14 |
| Cyan coupler (*4) | 0.07 |
| Discoloration inhibitor (*5, *6 and *7) | 0.10 |
| Coupler solvent (*8 and *9) | 0.06 |
| Fourth Layer: High Sensitivity Red-Sensitive Layer | |
| Silver bromoiodide spectrally sensitized with red-sensitive sensitizing dyes *1 and *2 (silver iodide content: 6.0 mol %; average grain size: 0.7 μm) | 0.15 |
| Gelatin | 1.00 |
| Cyan coupler (*3) | 0.20 |
| Cyan coupler (*4) | 0.10 |
| Discoloration inhibitor (*5, *6 and *7) | 0.15 |
| Coupler solvent (*8 and *9) | 0.10 |
| Fifth Layer: Interlayer | |
| Magenta colloidal silver | 0.02 |
| Gelatin | 1.00 |
| Color stain inhibitor (*10) | 0.08 |
| Color stain inhibitor solvent (*11 and *12) | 0.16 |
| Polymer latex (*13) | 0.10 |
| Sixth Layer: Low Sensitivity Green-Sensitive Layer | |
| Silver bromoiodide spectrally sensitized with green-sensitive sensitizing dye *14 (silver iodide content: 2.5 mol %, grain size: 0.4 μm) | 0.10 |
| Gelatin | 0.80 |
| Magenta coupler (*15) | 0.10 |
| Discoloration inhibitor (*16) | 0.10 |
| Stain inhibitor (*17) | 0.01 |
| Stain inhibitor (*18) | 0.001 |
| Coupler solvent (*11 and *19) | 0.15 |
| Seventh Layer: High Sensitivity Green-Sensitive Layer | |
| Silver bromoiodide spectrally sensitized with green-sensitive sensitizing dye *14 (silver iodide content: 3.5 mol %; grain size: | 0.10 |

-continued

| | |
|---|---|
| 0.9 μm) | |
| Gelatin | 0.80 |
| Magenta coupler (*15) | 0.10 |
| Discoloration inhibitor (*16) | 0.10 |
| Stain inhibitor (*17) | 0.01 |
| Stain inhibitor (*18) | 0.001 |
| Coupler solvent (*11 and *19) | 0.15 |
| Eigth Layer: Yellow Filter Layer | |
| Yellow colloidal silver | 0.20 |
| Gelatin | 1.00 |
| Color stain inhibitor (*10) | 0.06 |
| Color stain inhibitor solvent (*11 and *12) | 0.15 |
| Polymer latex (*13) | 0.10 |
| Ninth Layer: Low Sensitivity Blue-Sensitive Layer | |
| Silver bromoiodide spectrally sensitized with blue-sensitive sensitizing dye *20 (silver iodide content: 2.5 mol %; grain size: 0.5 μm) | 0.15 |
| Gelatin | 0.50 |
| Yellow coupler (*21) | 0.20 |
| Stain inhibitor (*18) | 0.001 |
| Coupler solvent (*9) | 0.05 |
| Tenth Layer: High Sensitivity Blue-Sensitive Layer | |
| Silver bromoiodide spectrally sensitized with blue-sensitive sensitizing dye *20 (silver iodide content: 2.5 mol %; grain size: 1.2 μm) | 0.25 |
| Gelatin | 1.00 |
| Yellow Coupler (*21) | 0.40 |
| Stain inhibitor (*18) | 0.002 |
| Coupler solvent (*9) | 0.10 |
| Eleventh Layer: Ultraviolet Absorbing Layer | |
| Gelatin | 1.50 |
| Ultraviolet absorber (*22, *6 and *7) | 1.00 |
| Color stain inhibitor (*23) | 0.06 |
| Color stain inhibitor solvent (*9) | 0.15 |
| Anti-irradiation dye (*24) | 0.02 |
| Anti-irradiation dye (*25) | 0.02 |
| Twelfth Layer: Protective Layer | |
| Finely divided silver bromochloride (silver chloride content: 97 mol %; average grain size: 0.2 μm) | 0.07 |
| Gelatin | 1.50 |
| Gelatin hardening agent (*26) | 0.17 |

*1: Sodium 5,5'-dichloro-3,3'-di(3-sulfobutyl)-9-ethylthiacarbocyanine
*2: Triethylammonium-3-[2-{2-[3-(3-sulfopropyl)naphtho-(1,2-d)thiazoline-2-indenemethyl]-1-butenyl}-3-naphtho(1,2-d)thiazolino]propanesulfonate
*3: 2-[α-(2,4-Di-t-anylphenoxy)hexanamido]-4,6-dichloro-5-ethylphenol
*4: 2-(2-Chlorobenzoylamido)-4-chloro-5-[α-(2-chloro-4-t-amylphenoxy)octanamido]phenol
*5: 2-(2-Hydroxy-3-sec-5-t-butylphenyl)benzotriazole
*6: 2-(2-Hydroxy-5-t-butylphenyl)benzotriazole
*7: 2-(2-Hydroxy-3,5-di-t-butylphenyl)-6-chlorobenzo-triazole
*8: Di(2-ethylhexyl)phthalate
*9: Trinonylphosphate
*10: 2,5-Di-t-octylhydroquinone
*11: Tricresyl phosphate
*12: Dibutyl phthalate
*13: Polyethyl acrylate
*14: Sodium 5,5'-diphenyl-9-ethyl-3,3'-disulfopropyloxa-carbocyanine
*15: 7-Chloro-6-methyl-2-{1-[2-octyloxy-5-(2-octyloxy)-5-t-octylbenzenesulfonamido]-2-propyl}-1H-pyrazolo-[1,5-b][1,2,4]triazole
*16: 3,3,3',3'-Tetramethyl-5,6,5',6'-tetrapropoxy-1,1'-bisspiroindane
*17: 3-(2-Ethylhexyloxycarbonyloxy)-1-(3-hexadecyloxy-phenyl)-2-pyrazoline
*18: 2-Methyl-5-t-octylhydroquinone
*19: Trioctyl phosphate
*20: Triethylammonium-3-[2-(3-benzylrhodanine-5-iridene)-3-benzoxazolinyl]propanesulfonate
*21: α-Pivaloyl-α-[(2,4-dioxo-1-benzyl-5-ethoxy-hydantoin-3-yl)-2-chloro-5-(α-2,4-di-t-amyl-phenoxy)butanamido]acetanilide
*22: 5-Chloro-2-(2-hydroxy-3-t-butyl-5-t-octyl)-phenylbenzotriazole -continued

*23: 2,5-Di-sec-octylhydroquinone

*24: 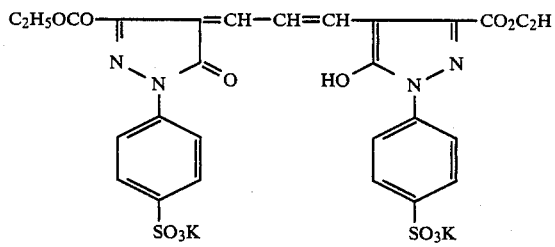

*25: 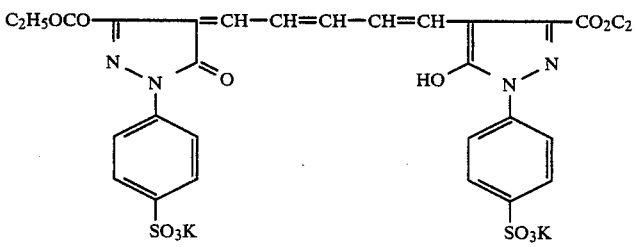

*26: 1,2-Bis(vinylsulfonylacetamido)ethane

Specimens 202 to 204 were prepared in the same manner as described above except that cyan coupler (*3) in the third and fourth layers, magenta coupler (*15) in the sixth and seventh layers and yellow coupler (*21) in the ninth and tenth layers were replaced by the compounds shown in Table I-6.

TABLE I-6

| | Cyan Coupler 3rd Layer, 4th Layer | Magenta Coupler 6th Layer, 7th Layer | Yellow Coupler 9th Layer, 10th Layer |
|---|---|---|---|
| 201 | Cyan coupler (*3) | Magenta coupler (*15) | Yellow coupler (*21) |
| 202 | Compound (29) | " | Yellow coupler (*21) |
| 203 | " | Compound (27) | Yellow coupler (*21) |
| 204 | Compound (41) | Compound (15) | Compound (9) |

The coated amounts of silver in Specimens 201 to 204 were all in the range of 1.29±0.01 g per $m^2$ of the specimen.

Specimen 205 was then prepared in the same manner as Specimen 204 except that the coated amount in each layer was 1.5 times that of Specimen 204 (coated amount of silver: 1.93 g/$m^2$).

The silver halide color photographic material Specimens 201 to 205 thus prepared were then exposed to light and processed by means of an automatic developing machine in the following manner until the cumulative replenished amount of the color developing solution reached three times the capacity of the mother liquor tank.

| Processing Step | Time (sec) | Temperature (°C.) | Capacity of Mother Liquor Tank (ml) | Replenished Amount of Replenisher (ml/$m^2$) |
|---|---|---|---|---|
| 1st Development | 60 | 38 | 700 | 330 |
| 1st Washing (1) | 30 | 33 | 700 | — |
| 1st Washing (2) | 30 | 33 | 700 | 220 |
| Color Development | 90 | 38 | 700 | 330 |
| Bleaching | 60 | 38 | 700 | 100 |

-continued

| Processing Step | Time (sec) | Temperature (°C.) | Capacity of Mother Liquor Tank (ml) | Replenished Amount of Replenisher (ml/$m^2$) |
|---|---|---|---|---|
| Blixing | 60 | 38 | 700 | 100 |
| 2nd Washing (1) | 20 | 33 | 700 | — |
| 2nd Washing (2) | 20 | 33 | 700 | — |
| 2nd Washing (3) | 20 | 33 | 700 | 330 |
| Drying | 45 | 75 | — | — |

The first washing step and the third washing step were conducted in a countercurrent system. That is, first washing solution was replenished into the first washing tank (2). The overflow from the first washing tank (2) was introduced into the first washing tank (1). Second washing solution was replenished into the second washing tank (3). The overflow from the second washing tank (3) was introduced into the second washing tank (2). The overflow into the second washing tank (1).

The composition of the processing solutions were as follows:

| | Mother Liquor | Replenisher |
|---|---|---|
| First Developing Solution: | | |
| Pentasodium nitrilo-N,N,N-trimethylenephosphate | 1.0 g | 1.0 g |
| Pentasodium diethylenetriamine-pentaacetate | 3.0 g | 3.0 g |
| Potassium sulfite | 30.0 g | 30.0 g |
| Potassium thiocyanate | 1.2 g | 1.2 g |
| Potassium carbonate | 35.0 g | 35.0 g |
| Potassium hydroquinonemonosulfonate | 25.0 g | 25.0 g |
| 1-Phenyl-3-pyrazolidone | 2.0 g | 2.0 g |
| Potassium bromide | 0.5 g | — |
| Potassium iodide | 5.0 mg | — |
| Water to make | 1,000 ml | 1,000 ml |
| pH adjusted with hydrochloric acid or potassium hydroxide to | 9.60 | 9.70 |
| First Washing Solution: | | |
| Ethylenediaminetetramethylene- | 2.0 g | Same as |

-continued

| | Mother Liquor | Replenisher |
|---|---|---|
| phosphonic acid | | mother liquor |
| Disodium phosphate | 5.0 g | Same as mother liquor |
| Water to make | 1,000 ml | Same as mother liquor |
| pH adjusted with hydrochloric acid or potassium hydroxide to | 7.00 | Same as mother liquor |
| Color Developing Solution: | | |
| Benzyl alcohol | 15.0 ml | 18.0 ml |
| Diethylene glycol | 12.0 ml | 14.0 ml |
| 3,6-Dithia-1,8-octanediol | 2.00 g | 2.50 g |
| Pentasodium nitrilo-N,N,N-trimethylenephosphonic acid | 0.5 g | 0.5 g |
| Pentasodium diethylenetriamine-pentaacetate | 2.0 g | 2.0 g |
| Sodium sulfite | 2.0 g | 2.5 g |
| Hydroxylamine sulfate | 3.0 g | 3.6 g |
| N-Ethyl-N-(β-methanesulfonamido-ethyl)-3-methylaminoaniline sulfate | 6.0 g | 9.0 g |
| Ethylenediamine | 10.0 ml | 12.0 ml |
| Fluorescent brightening agent (diaminostilbene type) | 1.0 g | 1.2 g |
| Potassium bromide | 0.5 g | — |
| Potassium iodide | 1.0 mg | — |
| Water to make | 1,000 ml | 1,000 ml |
| pH adjusted with hydrochloric acid or potassium hydroxide to | 10.60 | 11.00 |
| Bleaching Solution: | | |
| Disodium ethylenediaminetetra-acetate | 10.0 g | Same as mother liquor |
| $NH_4$ [EDTA.Fe(III)] (dihydrate) | 120 g | Same as mother liquor |
| Ammonium bromide | 100 g | Same as mother liquor |
| Ammonium nitrate | 10 g | Same as mother liquor |
| Water to make | 1,000 ml | Same as mother liquor |
| pH adjusted with acetic acid or ammonia water to | 6.30 | Same as mother liquor |
| Blixing Solution: | | |
| EDTA 2Na (dihydrate) | 10.0 g | Same as mother liquor |
| Sodium sulfite | 30 g | Same as mother liquor |
| Ammonium thiosulfate (700 g/liter) | 300 ml | Same as mother liquor |
| Water to make | 1,000 ml | Same as mother liquor |
| pH adjusted with acetic acid or ammonia water to | 7.00 | Same as mother liquor |

Second Washing Solution (mother liquor was also used as replenisher):

City water was passed through a mixed bed column filled with a strongly acidic H type cation exchange resin (Amberlite 1R-120B manufactured by Rohm & Haas Co.) and an OH type anion exchange resin (Amberlite 1R-400 manufacture by Rohm & Haas Co. ) so that the concentration of calcium and magnesium ions were reduced to 3 mg/liter or less. Sodium dichlorinated isocyanurate and sodium sulfate were added to the water in amounts of 20 mg/liter and 1.5 g/liter, respectively. The pH of the solution was in the range of 6.5 to 7.5.

The above described specimens which had been exposed to light of 3,200° K. 100 CMS through an optical wedge were measured for the amount of residual silver at the minimum density portion and maximum density portion of yellow image and observed for the condition of the bleaching solution and the blixing solution at the beginning, middle and end of the continuous processing. Furthermore, these specimens were subjected to various continuous processings with different supply amount of the bleaching solution and the blixing solution. The results are shown in Table I-7.

Table I-7 shows that the present processing method leaves a small amount of residual silver and provides an excellent image having a low minimum density in the same manner as Example I-1. However, Specimen 205 having much silver coated thereon shows an increase in the amount of residual silver.

TABLE I-7

| Sample No. | Specimen | Replenished Amount at Desilvering Step: Bleaching Solution (ml/m²) | Replenished Amount at Desilvering Step: Blixing Solution (ml/m²) | Minimum Yellow Density: Beginning | Minimum Yellow Density: Middle | Minimum Yellow Density: End | Amount of Residual Silver (maximum density): Beginning | Amount of Residual Silver (maximum density): Middle | Amount of Residual Silver (maximum density): End | Turbidity upon End of Running* | Remarks |
|---|---|---|---|---|---|---|---|---|---|---|---|
| 7-1 | 201 | 100 | 100 | 0.15 | 0.17 | 0.18 | 0.5 | 1.5 | 2.7 | N | Comparison |
| 7-2 | " | 80 | 80 | 0.15 | 0.19 | 0.21 | 0.5 | 2.3 | 4.0 | L | " |
| 7-3 | " | 60 | 60 | 0.15 | 0.23 | 0.25 | 0.5 | 8.7 | 18.2 | O | " |
| 7-4 | " | 40 | 40 | 0.15 | 0.26 | 0.30 | 0.5 | 12.7 | 23.0 | O | " |
| 7-5 | 202 | 100 | 100 | 0.12 | 0.14 | 0.15 | 0.3 | 1.0 | 1.4 | N | Invention |
| 7-6 | " | 80 | 80 | 0.12 | 0.15 | 0.17 | 0.3 | 0.3 | 1.5 | N | " |
| 7-7 | " | 60 | 60 | 0.12 | 0.16 | 0.18 | 0.3 | 2.3 | 2.8 | N | " |
| 7-8 | " | 40 | 40 | 0.12 | 0.17 | 0.20 | 0.3 | 3.1 | 4.5 | N | " |
| 7-9 | 203 | 100 | 100 | 0.13 | 0.13 | 0.13 | 0.3 | 0.4 | 0.5 | N | " |
| 7-10 | " | 80 | 80 | 0.13 | 0.13 | 0.15 | 0.3 | 0.3 | 0.5 | N | " |
| 7-11 | " | 60 | 60 | 0.13 | 0.14 | 0.16 | 0.2 | 1.1 | 2.2 | N | " |
| 7-12 | " | 40 | 40 | 0.13 | 0.16 | 0.18 | 0.3 | 1.8 | 3.0 | N | " |
| 7-13 | 204 | 100 | 100 | 0.12 | 0.12 | 0.12 | 0.3 | 0.3 | 0.3 | N | Invention |

TABLE I-7-continued

| Sample No. | Specimen | Replenished Amount at Desilvering Step: Bleaching Solution (ml/m²) | Replenished Amount at Desilvering Step: Blixing Solution (ml/m²) | Minimum Yellow Density: Beginning | Minimum Yellow Density: Middle | Minimum Yellow Density: End | Amount of Residual Silver (maximum density): Beginning | Amount of Residual Silver (maximum density): Middle | Amount of Residual Silver (maximum density): End | Turbidity upon End of Running* | Remarks |
|---|---|---|---|---|---|---|---|---|---|---|---|
| 7-14 | " | 80 | 80 | 0.12 | 0.12 | 0.12 | 0.2 | 0.3 | 0.4 | N | " |
| 7-15 | " | 60 | 60 | 0.12 | 0.12 | 0.13 | 0.2 | 0.6 | 0.9 | N | " |
| 7-16 | " | 40 | 40 | 0.12 | 0.13 | 0.15 | 0.2 | 1.0 | 0.5 | N | " |
| 7-17 | 205 | 100 | 100 | 0.14 | 0.15 | 0.16 | 0.4 | 1.2 | 1.8 | N | " |
| 7-18 | " | 80 | 80 | 0.14 | 0.16 | 0.18 | 0.4 | 1.8 | 2.7 | N | " |
| 7-19 | " | 60 | 60 | 0.15 | 0.17 | 0.19 | 0.4 | 2.5 | 3.2 | N | " |
| 7-20 | " | 40 | 40 | 0.14 | 0.19 | 0.23 | 0.4 | 4.0 | 5.3 | N | " |

*N: No turbidity was observed
O: Turbidity was observed
L: A little turbidity was observed

EXAMPLE II-1

A multilayer color photographic light-sensitive material Speciment 301 was prepared by coating various layers of the undermentioned compositions on an undercoated cellulose triacetate film support.

Composition of Ligh-Sensitive Material

The coated amount of silver halide and colloidal silver are represented by g/m² in terms of silver. The coated amount of coupler, additive and gelatin are represented by g/m². The coated amount of sensitizing dye is represented in terms of molar number per mol of silver halide contained in the same layer.

| | |
|---|---|
| First Layer: Antihalation Layer | |
| Black colloidal silver | 0.2 |
| Gelatin | 1.3 |
| Coupler C-1 | 0.06 |
| Ultraviolet Absorber UV-1 | 0.1 |
| Ultraviolet Absorber UV-2 | 0.2 |
| Dispersing Oil Oil-1 | 0.01 |
| Dispersing Oil Oil-2 | 0.01 |
| Second Layer: Interlayer | |
| Finely divided silver bromide (average grain diameter: 0.07 μm) | 0.15 |
| Gelatin | 1.0 |
| Coupler C-2 | 0.02 |
| Dispersing Oil Oil-1 | 0.1 |
| Third Layer: First Red-Sensitive Emulsion Layer | |
| Silver bromoiodide emulsion (silver iodide content: 2 mol %; diameter/thickness ratio: 2.5; average grain diameter: 0.3 μm; high internal AgI content type) | 0.4 |
| Gelatin | 0.6 |
| Sensitizing Dye I | $1.0 \times 10^{-4}$ |
| Sensitizing Dye II | $3.0 \times 10^{-4}$ |
| Sensitizing Dye III | $1.0 \times 10^{-5}$ |
| Coupler C-3 | 0.06 |
| Coupler C-4 | 0.06 |
| Coupler C-8 | 0.04 |
| Coupler C-2 | 0.03 |
| Dispersing Oil Oil-1 | 0.03 |
| Dispersing Oil Oil-3 | 0.012 |
| Fourth Layer: Second Red-Sensitive Emulsion Layer | |
| Silver bromoiodide emulsion (silver iodide content: 5 mol %; diameter/thickness ratio: 4.0; average grain diameter: 0.7 μm; high internal AgI content type) | 0.7 |
| Sensitizing Dye I | $1 \times 10^{-4}$ |
| Sensitizing Dye II | $3 \times 10^{-4}$ |
| Sensitizing Dye III | $1 \times 10^{-5}$ |
| Coupler C-3 | 0.24 |
| Coupler C-4 | 0.24 |
| Coupler C-8 | 0.04 |

-continued

| | |
|---|---|
| Coupler C-2 | 0.04 |
| Dispersing Oil Oil-1 | 0.15 |
| Dispersing Oil Oil-3 | 0.02 |
| Fifth Layer: Third Red-Sensitive Emulsion Layer | |
| Silver bromoiodide emulsion (silver iodide content: 10 mol %; diameter/thickness ratio: 1.3; average grain diameter: 0.8 μm; high internal AgI content type) | 1.0 |
| Gelatin | 1.0 |
| Sensitizing Dye I | $1 \times 10^{-4}$ |
| Sensitizing Dye II | $3 \times 10^{-4}$ |
| Sensitizing Dye III | $1 \times 10^{-5}$ |
| Coupler C-6 | 0.05 |
| Coupler C-7 | 0.1 |
| Dispersing Oil Oil-1 | 0.01 |
| Dispersing Oil Oil-2 | 0.05 |
| Sixth Layer: Interlayer | |
| Gelatin | 1.0 |
| Compound Cpd-A | 0.03 |
| Dispersing Oil Oil-1 | 0.05 |
| Seventh Layer: First Green-Sensitive Emulsion Layer | |
| Silver bromoiodide emulsion (silver iodide content: 2 mol %; diameter/thickness ratio: 2.5; average grain diameter: 0.3 μm; high internal AgI content type) | 0.3 |
| Sensitizing Dye IV | $5 \times 10^{-4}$ |
| Sensitizing Dye VI | $0.3 \times 10^{-4}$ |
| Sensitizing Dye V | $2.0 \times 10^{-4}$ |
| Gelatin | 1.0 |
| Coupler C-9 | 0.2 |
| Coupler C-5 | 0.03 |
| Coupler C-1 | 0.03 |
| Compound Cpd-C | 0.012 |
| Dispersing Oil Oil-1 | 0.5 |
| Eighth Layer: Second Green-Sensitive Emulsion Layer | |
| Silver bromoiodide emulsion (silver iodide content: 4 mol %; diameter/thickness ratio: 4.0; average grain diameter: 0.6 μm; high internal AgI content type) | 0.4 |
| Sensitizing Dye IV | $5 \times 10^{-4}$ |
| Sensitizing Dye V | $2 \times 10^{-4}$ |
| Sensitizing Dye VI | $0.3 \times 10^{-4}$ |
| Coupler C-9 | 0.25 |
| Coupler C-1 | 0.03 |
| Coupler C-10 | 0.015 |
| Coupler C-5 | 0.01 |
| Compound Cpd-C | 0.012 |
| Dispersing Oil Oil-1 | 0.2 |
| Ninth Layer: Third Green-Sensitive Emulsion Layer | |
| Silver bromoiodide emulsion (silver iodide content: 6 mol %; diameter/thickness ratio: 1.2; average grain diameter: 1.0 μm; high internal AgI content type) | 0.85 |
| Gelatin | 1.0 |
| Sensitizing Dye VII | $3.5 \times 10^{-4}$ |
| Sensitizing Dye VIII | $1.4 \times 10^{-4}$ |
| Coupler C-13 | 0.01 |

-continued

| | |
|---|---|
| Coupler C-12 | 0.03 |
| Coupler C-9 | 0.20 |
| Coupler C-1 | 0.02 |
| Coupler C-15 | 0.02 |
| Dispersing Oil Oil-1 | 0.20 |
| Dispersing Oil Oil-2 | 0.05 |
| Tenth Layer: Yellow Filter Layer | |
| Gelatin | 1.2 |
| Yellow colloidal silver | 0.08 |
| Compound Cpd-B | 0.1 |
| Dispersing Oil Oil-1 | 0.3 |
| Eleventh Layer: First Blue-Sensitive Emulsion Layer | |
| Monodispersed emulsion of silver bromoiodide (silver iodide content: 4 mol %; diameter/thickness ratio: 1.5; average grain diameter: 0.5 μm; high internal AgI content type) | 0.4 |
| Gelatin | 1.0 |
| Sensitizing Dye IX | $2 \times 10^{-4}$ |
| Coupler C-14 | 0.9 |
| Coupler C-5 | 0.07 |
| Dispersing Oil Oil-1 | 0.2 |
| Twelfth Layer: Second Blue-Sensitive Emulsion Layer | |
| Silver bromoiodide emulsion (silver iodide content: 10 mol %; diameter/thickness ratio: 4.5; average grain diameter: 1.3 μm; high internal AgI content type) | 0.4 |

-continued

| | |
|---|---|
| Gelatin | 0.6 |
| Sensitizing Dye IX | $1 \times 10^{-4}$ |
| Coupler C-14 | 0.25 |
| Dispersing Oil Oil-1 | 0.07 |
| Thirteenth Layer: First Protective Layer | |
| Gelatin | 0.8 |
| Ultraviolet Absorber UV-1 | 0.1 |
| Ultraviolet Absorber UV-2 | 0.2 |
| Dispersing Oil Oil-1 | 0.01 |
| Dispersing Oil Oil-2 | 0.01 |
| Fourteenth Layer: Second Protective Layer | |
| Finely divided silver bromide (average grain diameter: 0.07 μm) | 0.5 |
| Gelatin | 0.45 |
| Polymethylmethacrylate particle (diameter: 1.5 μm) | 0.2 |
| Film Hardener H-1 | 0.4 |
| n-Butyl-p-hydroxybenzoate | 0.012 |
| Formaldehyde Scavenger S-1 | 0.5 |
| Formaldehyde Scavenger S-2 | 0.5 |

Besides the above described components, a surface active agents was added to each layer as a coating aid.

The chemical structural formula and chemical name of the compounds used in this example are described below.

UV-1

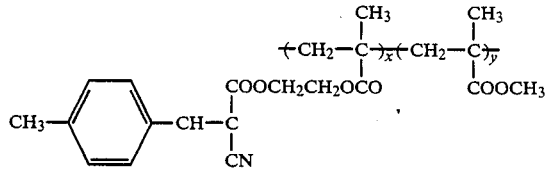

x/y = 7/3 (weight ratio)

UV-2

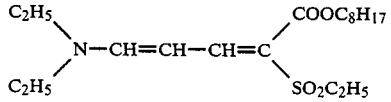

Tricresyl phosphate — Oil-1

Dibutyl phthalate — Oil-2

Bis(2-éthylhexyl) phthalate — Oil-3

C-1

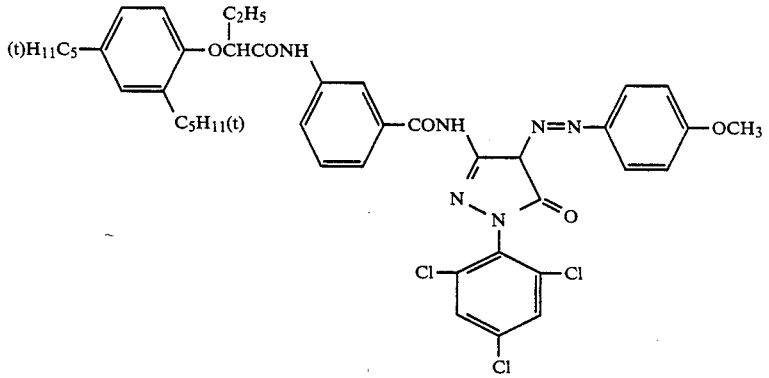

C-2

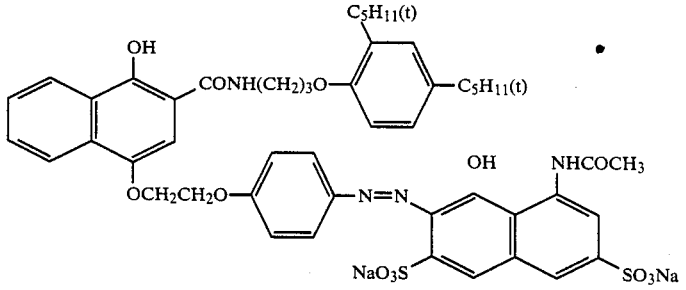

-continued
C-3
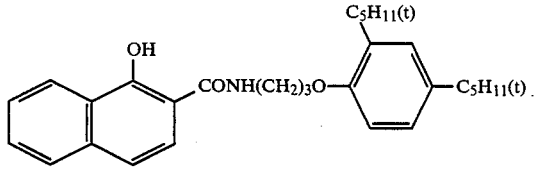
C-4
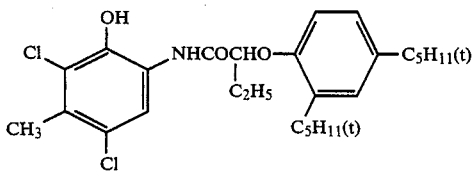
C-5
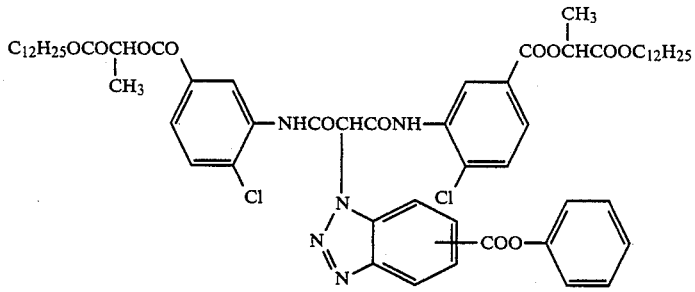
C-6
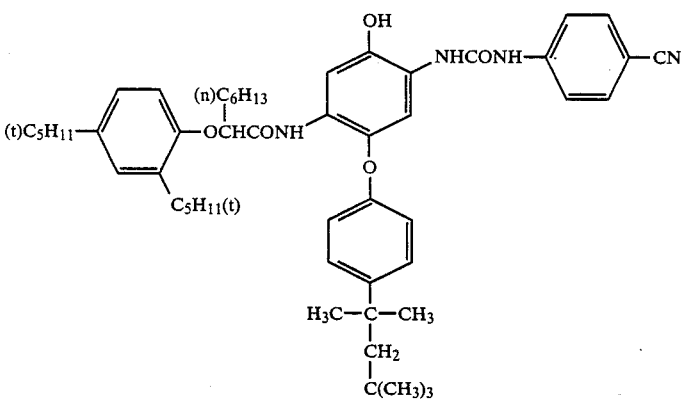
C-7
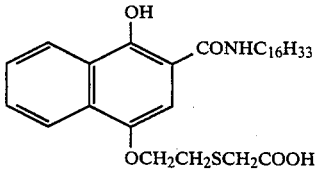
C-8
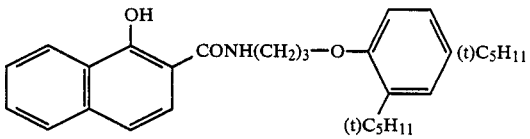

-continued
C-9
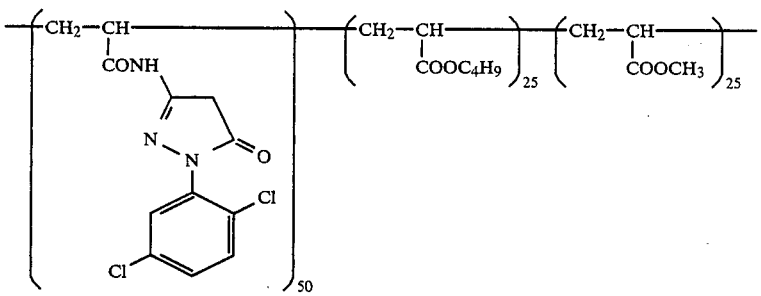
Average molecular weight: 30,000
C-10
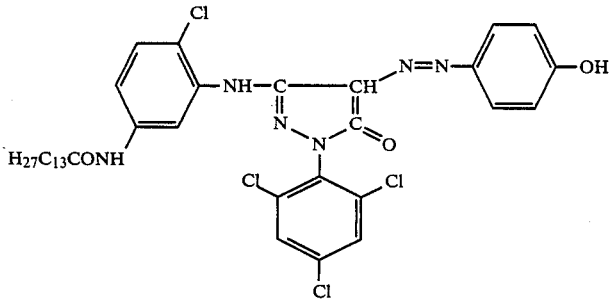
C-12
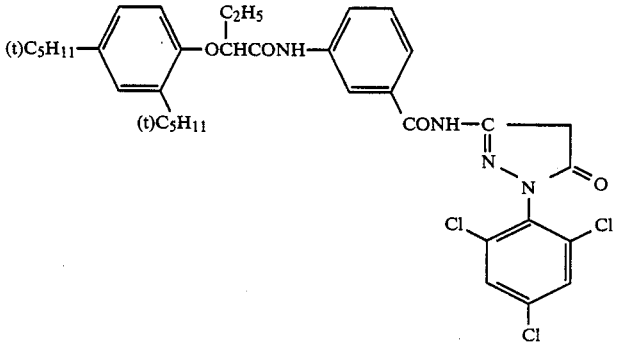
C-13
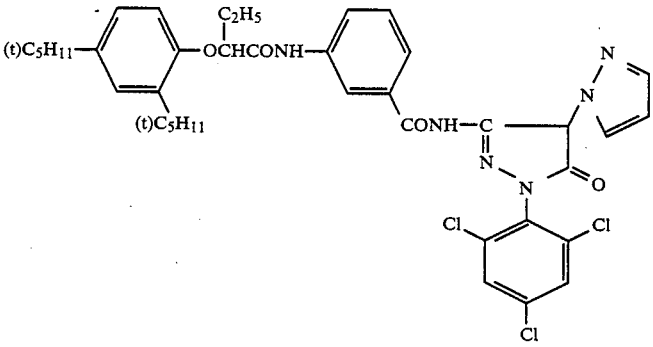
C-14
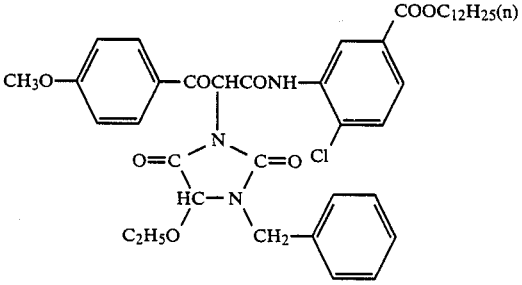

-continued
C-15
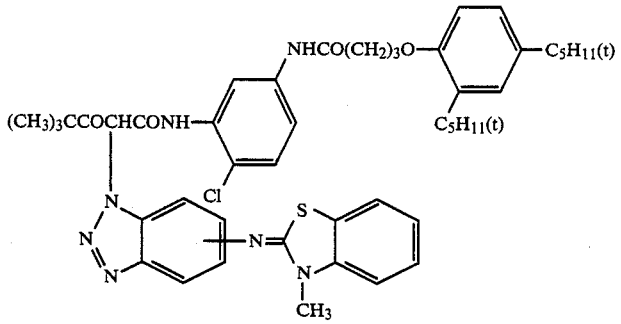
Cpd-A
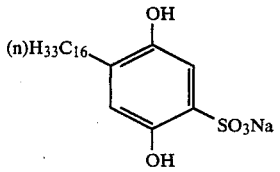
Cpd-B
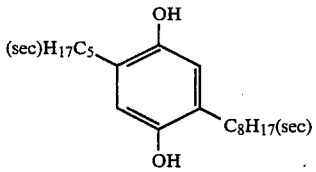
Cpd-C
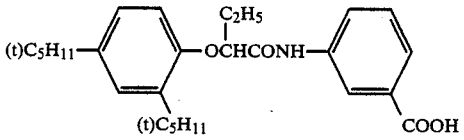
Sensitizing Dye I
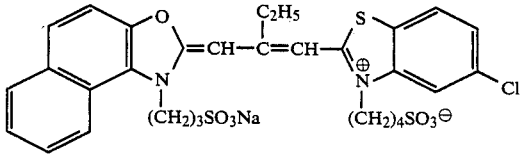
Sensitizing Dye II
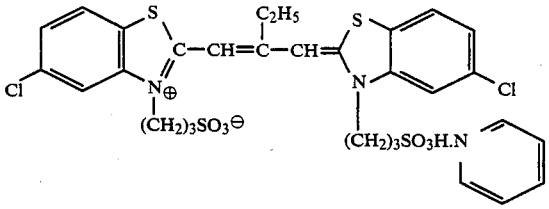
Sensitizing Dye III
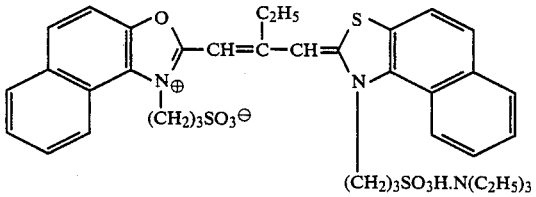
Sensitizing Dye IV
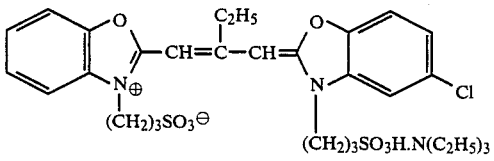

-continued

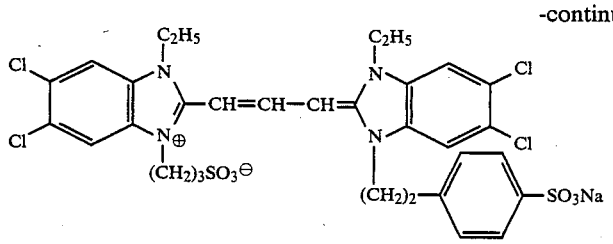

Sensitizing Dye V

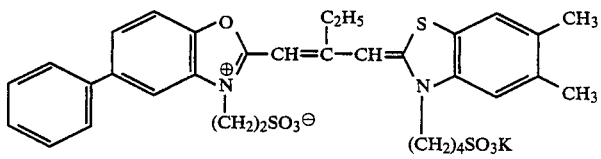

Sensitizing Dye VI

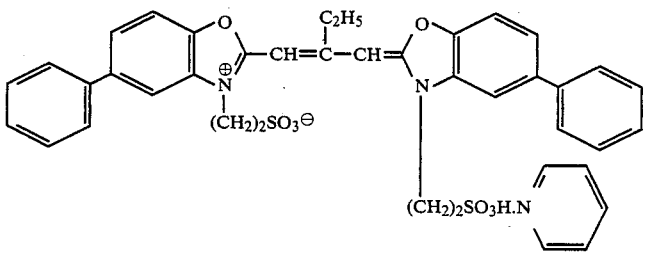

Sensitizing Dye VII

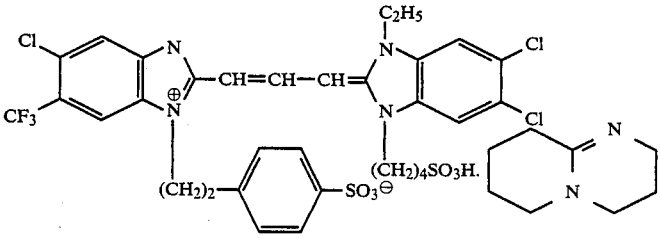

Sensitizing Dye VIII

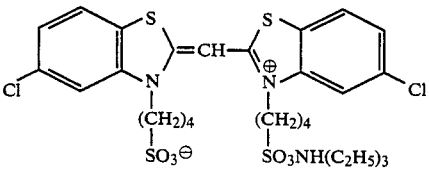

Sensitizing Dye IX

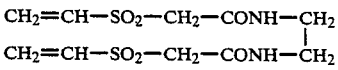

H-1

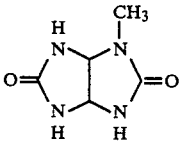

S-1

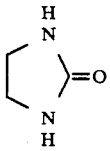

S-2

Specimens 302 to 316 were prepared in the same manner as in Specimen 301 except that Coupler C-9 in the seventh, eighth and ninth layers was replaced by the couplers shown in Table II-1 and Coupler C-3 and Coupler C-4 in the third, fourth and fifth layers were replaced by the couplers shown in Table II-1. The coated amount of these couplers in these specimens are represented in terms of the weight (g) per $m^2$ of the specimen.

TABLE II-1

| Specimen | Coupler for 7th, 8th, 9th Layers | Coated Amount ($g/m^2$) | Coupler for 3rd, 4th, 5th Layers | Coated Amount ($g/m^2$) | Remarks |
|---|---|---|---|---|---|
| 301 | C-9 | Described in the specification | C-3, C-4 | Described in the specification | Comparison |
| 302 | Compound (5) | Same molecular amount of C-9 for each layer | Same as above | Same as above | Invention |
| 303 | Compound (6) | Same as above | " | " | " |
| 304 | Compound (15) | " | " | " | " |
| 305 | Compound (17) | " | " | " | " |
| 306 | Compound (20) | " | " | " | " |
| 307 | Compound (5) | " | Compound (L-I-1), Compound (L-I-9) | Same added amount as C-3, C-4 | " " |
| 308 | Compound (6) | " | Same as above | Same as above | " |
| 309 | Compound (15) | " | " | " | " |
| 310 | Compound (17) | " | " | " | " |
| 311 | Compound (20) | " | " | " | " |
| 312 | Compound (27) | Same molecular amount of C-9 for each layer | Compound (L-I-9), Compound (L-I-28) | Same added amound as C-3, C-4 | Invention |
| 313 | Same as above | Same as above | Compound (L-I-8), Compound (L-I-18) | Same as above | " |
| 314 | " | " | Compound (L-I-2), Compound (L-I-38) | " | " |
| 315 | " | " | Compound (L-I-1), Compound (L-I-7) | " | " |
| 316 | " | " | Compound (L-I-5), Compound (L-I-7) | " | " |

Speciments 301 to 316 thus prepared were processed in the following manner:

Processing (A):

| Step | Processing Time | Processing Temperature (°C.) |
|---|---|---|
| Color Development | 3 min 15 sec | 38 |
| Blixing | 3 min 15 sec | 38 |
| Washing 1 | 40 sec | 35 |
| Washing 2 | 40 sec | 35 |
| Stabilizing | 40 sec | 35 |

In the above described processing steps, the washing steps 1 and 2 were conducted in a countercurrent system in which water flows from the tank 2 to the tank 1. The composition of the processing solutions used in Processing (A) will be described hereinafter.

| Color Developing Solution: | Mother Liquor | Replenisher |
|---|---|---|
| Diethylenetriaminepentaacetic acid | 1.0 g | 1.2 g |
| 1-Hydroxyethylidene-1,1-diphosphonic acid | 2.0 g | 2.2 g |
| Sodium sulfite | 4.0 g | 4.4 g |
| Potassium carbonate | 30.0 g | 32.0 g |
| Potassium bromide | 1.4 g | 0.7 g |
| Potassium iodide | 1.3 mg | — |
| Hydroxylamine | 2.4 g | 2.6 g |
| 4-(N-Ethyl-N-β-hydroxyethylamino)-2-methylaniline sulfate | 4.5 g | 5.0 g |
| Water to make | 1 l | 1 l |
| pH | 10.00 | 10.05 |

| Blixing Solution: | Mother Liquor | Replenisher |
|---|---|---|
| Ammonium bromide | 50.0 g | — |
| $NH_4$[FE(III) (EDTA)] | 50.0 g | — |
| EDTA.2Na | 5.0 g | 1.0 g |
| Ammonium sulfate | 5.0 g | — |
| Sodium sulfite | 12.0 g | 20.0 g |
| Aqueous solution of ammonium thiosulfate (70 wt %) | 240 ml | 400 ml |

-continued

| | | |
|---|---|---|
| Ammonia water | 10.0 ml | 10.0 ml |
| Water to make | 1 l | 1 l |
| pH | 7.3 | 8.3 |

| Stabilizing Solution (washing solution): | Mother Liquor | Replenisher |
|---|---|---|
| Formalin (37% w/v) | 2.0 ml | 3.0 ml |
| Polyoxyethylene-p-monononylphenyl-ether (average polymerization degree: 10) | 0.3 g | 0.45 g |
| Water to make | 1 l | 1 l |

The specimens were processed with the above described processing solutions and washing solution in the above described processing steps. The results were compared.

Washing Solution:

City water was passed through a mixed bed column filled with a strongly acidic H type cation exchange resin (Dialon SK-1B, manufactured by Mitsubishi Chemical Industries, Ltd.) and a strongly basic OH type anion exchange resin (Diaion SA-10A, manufactured by Mitsubishi Chemical Industries, Ltd.) so that the water having the undermentioned composition was obtained. Sodium dichlorinated isocynanurate was added to the water as a disinfectant in an amount of 20 mg/liter.

| | |
|---|---|
| Calcium ion | 1.1 mg/liter |
| Magnesium ion | 0.5 mg/liter |
| pH | 6.9 |

Processing (B):

Processing (B) was conducted in the same manner as Processing (A) except that $NH_4$[Fe(III) (EDTA)] and EDTA.2Na in the blixing solution were replaced by the equimolecular amounts of $NH_4$[FE(III)(DTPA)] (ferric ammonium diethylenetriaminepentaacetate) and diethylenetriaminepentaacetic acid as bleaching agents.

Processing (C):

Processing (C) was conducted in the same manner as Processing (A) except that ammonium iodide was added to the blixing solution in an amount of 1.20 g/liter, the light-sensitive material specimens wre not exposed to light, and the blixing was conducted for 2 minutes. Thus, the fixation of unexposed silver halide was examined.

Processing (D):

Processing (D) was conducted in the same manner as Processing (B) except that ammonium iodide was added to the blixing solution in an amount of 1.20 g/liter, the light-sensitive material specimens were not exposed to light, and the blixing was conducted for 2 minutes.

Processing (E):

Processing (E) was conducted in the same manner as Processing (A) except that 2-mercapto-1,3,4-triazole was added to the blixing solution as a known bleaching accelerator in an amount of 0.40 g/liter.

contrary, it was found that the light-sensitive materials comprising the present bleaching accelerator-releasing couplers give a surprising result. Particularly, the light-sensitive materials comprising the present bleaching accelerator-releasing couplers exhibit a better fixing capability when DPTA.Fe is used than when no DTPA/Fe is used. Furthermore, it was found that the specimens comprising the cyan dye-forming couplers represented by the formulae (L-I) and (L-II) further improve their fixing capability. These results are probably because DTPA.Fe(III) complex salt has a larger molecular weight than EDTA Fe(III) complex salt and therefore tends to interact with gelatin, coupler, etc., in the emulsion layer in the specimens, deteriorating the diffusiblity of the fixing agent ($S_2O_3^{2-}$salt) in the emulsion layer. It is believed that such interaction can be relaxed by the bleaching accelerator-releasing compound of the present invention.

TABLE II-2

(EXAMPLE II-1)

| Sample No. | Specimen | Blixing Capability ($\mu g/cm^2$) Processing (A)* | (B)** | Fixing Capability ($\mu g/cm^2$) Processing (C)* | (D)** | Blixing Capability ($\mu g/cm^2$) Processing (E)* | Fixing Capability ($\mu g/cm^2$) Processing (F)* | Remarks |
|---|---|---|---|---|---|---|---|---|
| 2-1 | 301 | 41.0 | 21.5 | 4.3 | 10.7 | 10.4 | 15.4 | Comparison |
| 2-2 | 302 | 5.0 | 3.3 | 4.2 | 3.1 | 4.3 | 5.2 | Invention |
| 2-3 | 303 | 6.1 | 3.2 | 4.1 | 3.2 | 4.8 | 5.3 | " |
| 2-4 | 304 | 5.9 | 3.4 | 4.3 | 3.2 | 4.5 | 4.8 | " |
| 2-5 | 305 | 5.8 | 3.5 | 4.8 | 3.0 | 4.4 | 4.5 | " |
| 2-6 | 306 | 5.7 | 3.6 | 4.8 | 3.0 | 4.5 | 4.8 | " |
| 2-7 | 307 | 5.6 | 3.1 | 4.0 | 2.0 | 4.4 | 4.9 | " |
| 2-8 | 308 | 5.7 | 3.0 | 4.3 | 1.8 | 4.2 | 4.3 | " |
| 2-9 | 309 | 5.8 | 2.9 | 4.5 | 1.6 | 4.5 | 4.2 | " |
| 2-10 | 310 | 5.6 | 3.3 | 4.6 | 1.8 | 4.6 | 4.1 | " |
| 2-11 | 311 | 5.7 | 3.0 | 4.3 | 1.7 | 4.7 | 4.3 | " |
| 2-12 | 312 | 5.9 | 2.8 | 4.4 | 1.8 | 4.7 | 4.7 | " |
| 2-13 | 313 | 5.7 | 3.1 | 4.7 | 1.9 | 4.8 | 4.5 | " |
| 2-14 | 314 | 4.9 | 3.2 | 4.3 | 2.0 | 3.2 | 4.2 | " |
| 2-15 | 315 | 5.3 | 3.2 | 4.5 | 1.6 | 3.9 | 4.7 | Invention |
| 2-16 | 316 | 5.2 | 3.1 | 4.4 | 1.6 | 4.0 | 4.1 | " |

*Comparison
**Invention

Processing (F):

Processing (F) was conducted in the same manner as Processing (E) except that ammonium iodide was added to the blixing solution in an amount of 1.2 g/liter, the light-sensitive material specimens were not exposed to light, and the blixing was conducted for 2 minutes.

After being subjected to the above described Processings (A), (B), (C), (D), (E) and (F), the light-sensitive material specimens were examined for the amount of residual silver. The results are shown in Table II-2.

Table II-2 shows many interesting results. For the examination of the blixing capability, the use of the present bleaching accelerator-releasing couplers provides excellent images with a lesser amount of residual silver both in Processings (A) and (B) as compared to the case where the present bleaching accelerator-releasing couplers are not used. On the other hand, an unexpected result was obtained in the examination of the fixing capability in Processings (C) and (D). Particularly, if no bleaching accelerator-releasing couplers are used, the blixing solution in worse in the fixing capability when it comprises a ferric diethylenetriaminepentaacetate complex salt (DTPA.Fe) as a bleaching agent than when it comprises a ferric ethylenediaminetetraacetate (EDTA.Fe). It was also found that the fixing capability is further deteriorated when the blixing solution contains a known bleaching accelerator. On the

EXAMPLE II-2

500 ml of each blixing solution to be used in Processings (A) and (B) was put into a 1 liter beaker and allowed to stand open at a temperature of 25° C. The two blixing solutions wre compared for the number of days they produced sulfur particles (sulfurization). The results were as follows.

| | |
|---|---|
| Processing (A) (EDTA.Fe) | 12 days |
| Processing (B) (DTPA.Fe) | 30 days or more |

Thus, it was found that the blixing solution comprising a DTPA Fe (Processing (B)) is less susceptible to sulfurization and more excellent in stability than the blixing solution comprising EDTA Fe (Processing (A)).

EXAMPLE II-3

The specimens prepared in Example II-1 were stored at a temperature of 80° C. and a relative humidity of 70% for 7 days, and then examined for cyan density. On the other hand, the same specimens wre rebleached with a processing solution ("CN-16 $N_2$", manufactured by Fuji Photo Film Co., Ltd.) at a temperature of 38° C. for 10 minutes, and then examined for deterioration in color restoration. The results are shown in Table II-3.

Table II-3 shows that the use of the cyan dye-forming couplers represented by the formulae (L-I) and (L-III) gives excellent results in preservation of cyan images and color restoration.

TABLE II-3

(EXAMPLE II-3)

| Sample No. | Specimen | Processing (A) Cyan Density Drop due to Aging | Processing (A) Cyan Density Rise due to Rebleaching | Processing (B) Cyan Density Drop due to Aging | Processing (B) Cyan Density Rise due to Rebleaching | Remarks |
|---|---|---|---|---|---|---|
| 3-1 | 301 | 0.33 | 0.13 | 0.28 | 0.08 | Comparison |
| 3-2 | 302 | 0.35 | 0.12 | 0.27 | 0.08 | Invention |
| 3-3 | 303 | 0.36 | 0.12 | 0.27 | 0.09 | " |
| 3-4 | 304 | 0.38 | 0.14 | 0.26 | 0.07 | " |
| 3-5 | 305 | 0.37 | 0.13 | 0.28 | 0.07 | " |
| 3-6 | 306 | 0.35 | 0.13 | 0.25 | 0.08 | " |
| 3-7 | 307 | 0.10 | 0.07 | 0.05 | 0.03 | " |
| 3-8 | 308 | 0.08 | 0.08 | 0.04 | 0.02 | " |
| 3-9 | 309 | 0.07 | 0.07 | 0.04 | 0.02 | " |
| 3-10 | 310 | 0.08 | 0.07 | 0.04 | 0.01 | " |
| 3-11 | 311 | 0.09 | 0.08 | 0.03 | 0.02 | " |
| 3-12 | 312 | 0.11 | 0.09 | 0.03 | 0.00 | " |
| 3-13 | 313 | 0.09 | 0.07 | 0.05 | 0.02 | " |
| 3-14 | 314 | 0.10 | 0.06 | 0.04 | 0.01 | " |
| 3-15 | 315 | 0.09 | 0.07 | 0.03 | 0.00 | " |
| 3-16 | 316 | 0.07 | 0.08 | 0.03 | 0.03 | " |

EXAMPLE II-4

A multilayer color light-sensitive material specimen 401 was prepared by coating various layers of the undermentioned compositions on an undercoated cellulose triacetate film support.

| | |
|---|---|
| First Layer: Antihalation Layer | |
| Black colloidal silver | 0.25 g/m$^2$ |
| Ultraviolet Absorber U-1' | 0.1 g/m$^2$ |
| Ultraviolet Absorber U-2' | 0.1 g/m$^2$ |
| High Boiling Organic Solvent Oil-1' | 0.1 g/m$^2$ |
| Gelatin | 1.9 g/m$^2$ |
| Second Layer: Interlayer 1 | |
| Compound Cpd-D' | 10 mg/m$^2$ |
| High Boiling Point Organic Solvent Oil-3' | 40 g/m$^2$ |
| Gelatin | 0.4 g/m$^2$ |
| Third Layer: Interlayer 2 | |
| Emulsion of surface-fogged finely divided silver bromoiodide (average grain diameter: 0.06 μm; AgI content: 1 mol %) | 0.05 g/m$^2$ (in terms of silver) |
| Gelatin | 0.4 g/m$^2$ |
| Fourth Layer: First Red-Sensitive Emulsion Layer | |
| Silver bromoiodide emulsion spectrally sensitized with Sensitizing Dyes S-1' and S-2' (mixture having a mixing ratio of 1/1 of monodispersed cubic grains having an average particle diameter of 0.2 μm and AgI content of 5 mol % and monodispersed cubic grains having an average grain diameter of 0.1 μm and AgI content of 5 mol %) | 0.4 g/m$^2$ (in terms of silver) |
| Coupler C-1' | 0.2 g/m$^2$ |
| Coupler C-2' | 0.05 g/m$^2$ |
| High Boiling Point Organic Solvent Oil-1' | 0.1 m/m$^2$ |
| Gelatin | 0.8 g/m$^2$ |
| Fifth Layer: Second Red-Sensitive Emulsion Layer | |
| Silver bromoiodide emulsion spectrally sensitized with Sensitizing Dyes S-1' and S-2' (monodispersed emulsion of cubic grains having an average grain diameter of 0.3 μm and AgI content of 4 mol %) | 0.4 g/m$^2$ (in terms of silver) |
| Coupler C-1' | 0.2 g/m$^2$ |
| Coupler C-3' | 0.2 g/m$^2$ |
| Coupler C-2' | 0.05 g/m$^2$ |
| High Boiling Point Organic Solvent Oil-1' | 0.1 m/m$^2$ |
| Gelatin | 0.8 g/m$^2$ |
| Sixth Layer: Third Red-Sensitive Emulsion Layer | |
| Silver bromoiodide emulsion spectrally sensitized with Sensitizing Dyes S-1' and S-2' (monodispersed emulsion of cubic grains having an average grain diameter of 0.4 μm and AgI content of 2 mol %) | 0.4 g/m$^2$ (in terms of silver) |
| Coupler C-3' | 0.7 g/m$^2$ |
| Gelatin | 1.1 g/m$^2$ |
| Seventh Layer: Interlayer 3 | |
| Dye D-1' | 0.02 g/m$^2$ |
| Gelatin | 0.6 g/m$^2$ |
| Eighth Layer: Interlayer 4 | |
| Emulsion of surface-fogged finely divided silver bromoiodide (average grain diameter: 0.06 μm; AgI content: 1 mol %) | 0.05 g/m$^2$ (in terms of silver) |
| Compound Cpd-A' | 0.2 g/m$^2$ |
| Gelatin | 1.0 g/m$^2$ |
| Ninth Layer: First Green-Sensitive Emulsion Layer | |
| Silver bromoiodide emulsion spectrally sensitized with Sensitizing Dyes S-3' and S-4' (mixture having a mixing ratio of 1/1 of monodispersed cubic grain having an average grain diameter of 0.2 μm and AgI content of 5 mol % and monodispersed cubic grain having an average grain diameter of 0.1 μm and AgI content of 5 mol %) | 0.5 g/m$^2$ (in terms of silver) |
| Coupler C-4' | 0.3 g/m$^2$ |
| Compound Cpd-B' | 0.03 g/m$^2$ |
| Gelatin | 0.5 g/m$^2$ |
| Tenth Layer: Second Green-Sensitive Emulsion Layer | |
| Silver bromoiodide emulsion containing Sensitizing Dyes S-3' and S-4' (monodispersed cubic grains having an average grain diameter of 0.4 μm and AgI content of 5 mol %) | 0.4 g/m$^2$ (in terms of silver) |
| Coupler C-4' | 0.3 g/m$^2$ |
| Compound Cpd-B' | 0.03 g/m$^2$ |
| Gelatin | 0.6 g/m$^2$ |
| Eleventh Layer: Third Green-Sensitive Emulsion Layer | |
| Silver bromoiodide emulsion containing Sensitizing Dyes S-3' and S-4' (tabular grains having an average grain diameter of 0.5 μm, aspect ratio of 5, and AgI content of 2 mol %) | 0.5 g/m$^2$ (in terms of silver) |
| Coupler C-4' | 0.8 g/m$^2$ |
| Compound Cpd-B' | 0.08 g/m$^2$ |
| Gelatin | 1.0 g/m$^2$ |
| Twelfth Layer: Interlayer 5 | |
| Dye D-2' | 0.05 g/m$^2$ |
| Gelatin | 0.6 g/m$^2$ |
| Thirteenth Layer: Yellow Filter Layer | |

-continued

| | |
|---|---|
| Yellow colloidal silver | 0.1 g/m$^2$ |
| Compound Cpd-A' | 0.01 g/m$^2$ |
| Gelatin | 1.1 g/m$^2$ |
| Fourteenth Layer: First Blue-Sensitive Emulsion Layer | |
| Silver bromoiodide emulsion containing Sensitizing Dyes S-5' and S-6' (mixture having a mixing ratio of 1/1 of mono-dispersed cubic grains having an average grain diameter of 0.2 μm and AgI content of 3 mol % and monodispersed cubic grains having an average grain diameter of 0.1 μm and AgI content of 3 mol %) | 0.6 g/m$^2$ (in terms of silver) |
| Coupler C-5' | 0.6 g/m$^2$ |
| Gelatin | 0.8 g/m$^2$ |
| Fifteenth Layer: Second Blue-Sensitive Emulsion Layer | |
| Silver bromoiodide emulsion containing Sensitizing Dyes S-5' and S-6' (tabular grains having an average grain diameter of 0.5 μm, aspect ratio of 7, and AgI content of 2 mol %) | 0.4 g/m$^2$ (in terms of silver) |
| Coupler C-5' | 0.3 g/m$^2$ |
| Coupler C-6' | 0.3 g/m$^2$ |
| Gelatin | 0.9 g/m$^2$ |
| Sixteenth Layer: Third Blue-Sensitive Emulsion Layer | |
| Silver bromoiodide emulsion containing Sensitizing Dyes S-5' and S-6' (tabular grains having an average grain diameter of 1.0 μm, aspect ratio of 7, and AgI content of 2 mol %) | 0.4 g/m$^2$ (in terms of silver) |

-continued

| | |
|---|---|
| Coupler C-6' | 0.7 g/m$^2$ |
| Gelatin | 1.2 mg/$^2$ |
| Seventeenth Layer: First Protective Layer | |
| Ultraviolet Absorber U-1' | 0.04 g/m$^2$ |
| Ultraviolet Absorber U-3' | 0.03 g/m$^2$ |
| Ultraviolet Absorber U-4' | 0.03 g/m$^2$ |
| Ultraviolet Absorber U-5' | 0.05 g/m$^2$ |
| Ultraviolet Absorber U-6' | 0.05 g/m$^2$ |
| Compound Cpd-C' | 0.8 g/m$^2$ |
| Dye D-3' | 0.05 g/m$^2$ |
| Gelatin | 0.7 g/m$^2$ |
| Eighteenth Layer: Second Protective Layer | |
| Emulsion of surface-fogged finely divided silver bromoiodide (average particle diameter: 0.06 μm; AgI content: 1 mol %) | 0.1 g/m$^2$ (in terms of silver) |
| Polymethylmethacrylate particles (average grain diameter: 1.5 μm) | 0.1 g/m$^2$ |
| Copolymer having a ratio of 4/6 of methylmethacrylate and acrylic acid (average grain diameter: 1.5 μm) | 0.1 g/m$^2$ |
| Silicone oil | 0.03 g/m$^2$ |
| Fluorine-containing Surface Active Agent W-1' | 3 g/m$^2$ |
| Gelatin | 0.8 g/m$^2$ |

Besides the above described components, Gelatin Hardener H-1' and a surface active agent were added to each layer.

C-1'

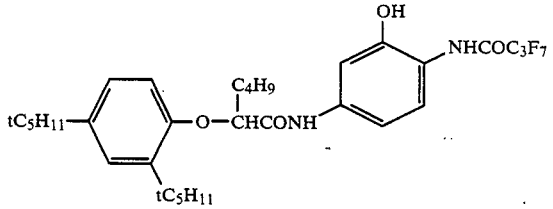

C-2'

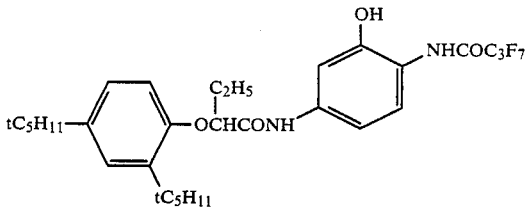

C-3'

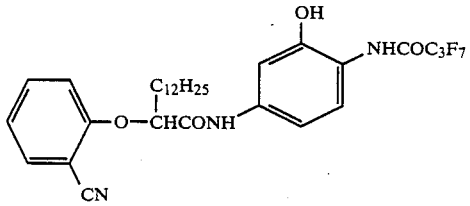

C-4'

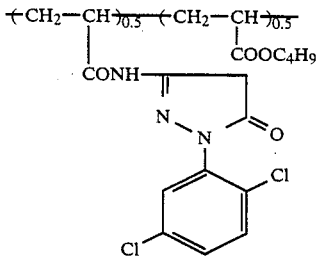

-continued
C-5′
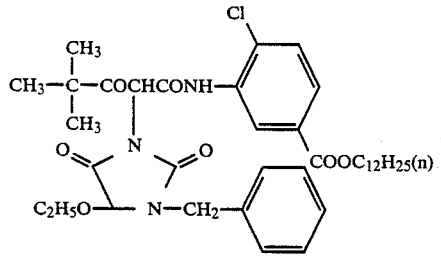
C-6′
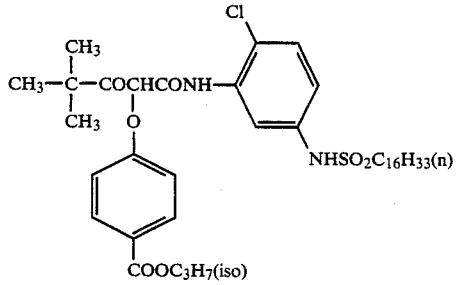
Dibutyl phthalate — Oil-1′
Oil-3′
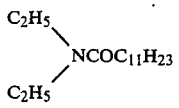
Cpd-A′
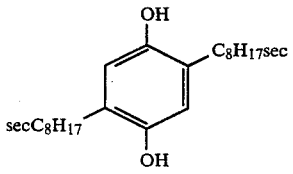
Cpd-B′
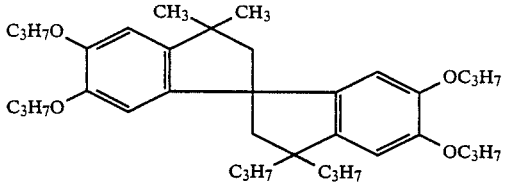
Cpd-C′
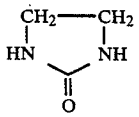
Cpd-D′
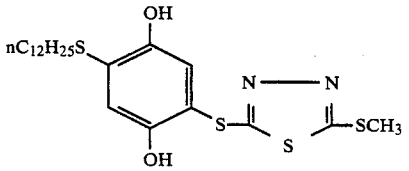
U-1′
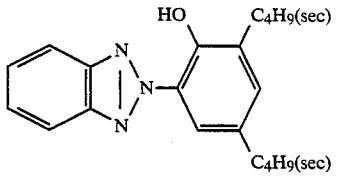

-continued
U-2′
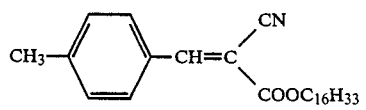
U-3′
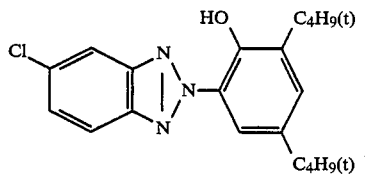
U-4′
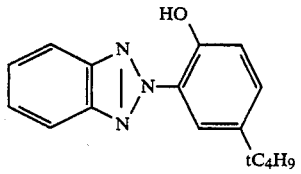
U-5′
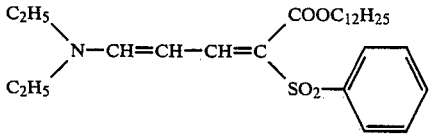
U-6′
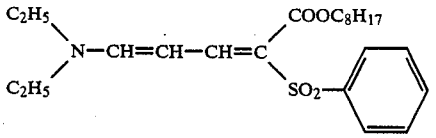
S-1′
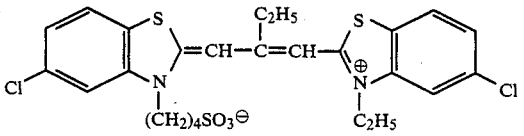
S-2′
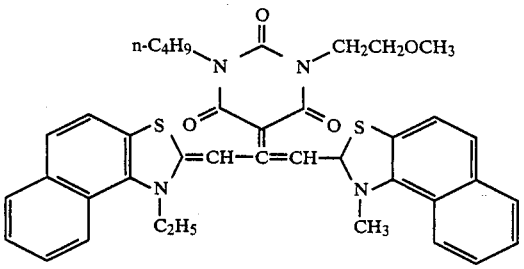
S-3′
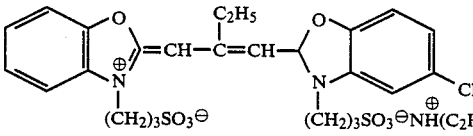
S-4′
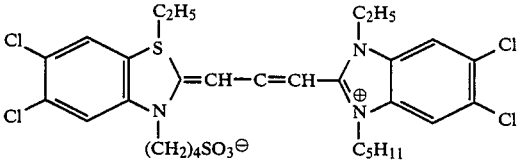

-continued

S-5'

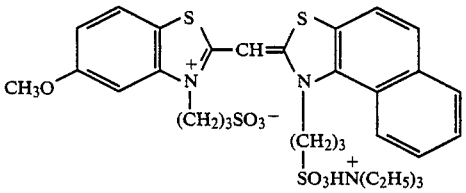

S-6'

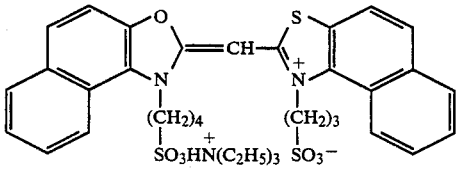

D-1'

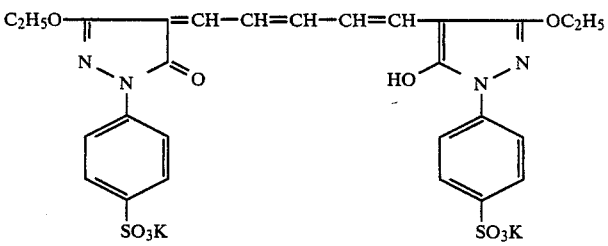

D-2'

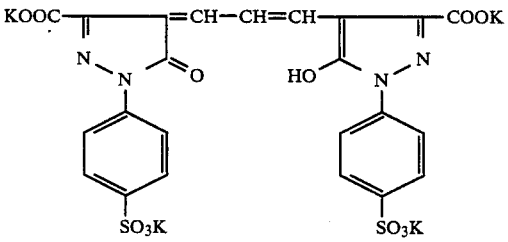

D-3'

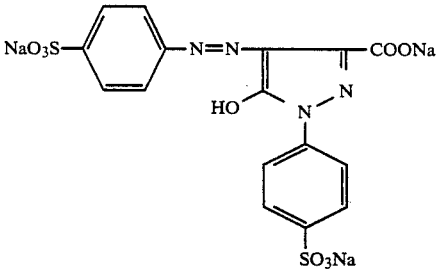

H-1'

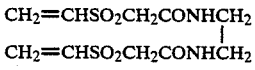

W-1'

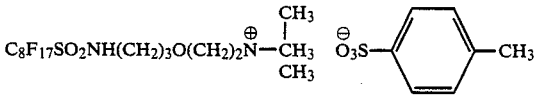

Specimens 402 to 404 were prepared in the same manner as in Specimen 401 except that Coupler C-4' to be contained in the ninth, tenth and eleventh layers of Specimen 401 and Coupler C-5 to be contained in the fourteenth and fifteenth layers of Specimen 401 were replaced by the couplers shown in Table II-4 in equimolecular amounts.

TABLE II-4

| Specimen | Coupler in 9th, 10th and 11th Layers | Coupler in 14th and 15th Layers | Remarks |
|---|---|---|---|
| 401 | C-4' | C-5' | Comparison |
| 402 | Compound (44) | C-5' | Invention |
| 403 | C-4' | Compound (43) | Invention |
| 404 | Compound (44) | Compound (43) | Invention |

Specimens 401 to 404 thus prepared were processed in the undermentioned Processing Steps (G), (H), (I) and (J). These specimens had been previously exposed to light of 100 CMS and 4,200° K.

| Processing Step (G): | | |
|---|---|---|
| Step | Processing Time | Processing Temperature (°C.) |
| First Development | 6 min | 38 |
| First Washing | 45 sec | 38 |
| Reversal | 45 sec | 38 |
| Color Development | 6 min | 38 |
| Blixing | 4 min | 38 |
| Second Washing (1) | 1 min | 38 |
| Second Washing (2) | 1 min | 38 |

The composition of the processing solutions used were as follows:

| | |
|---|---|
| First Developing Solution: | |
| Pentasodium nitrilo-N,N,N-trimethylene-phosphate | 2.0 g |
| Sodium sulfite | 30 g |
| Potassium hydroquinone monosulfonate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 ml |
| Water to make | 1,000 ml |
| pH adjusted with hydrochloric acid or potassium hydroxide to | 9.60 |
| First Washing Solution. | Mother Liquor |
| Ethylenediaminetetramethylenephosphonic acid | 2.0 g |
| Disodium phosphate | 5.0 g |
| Water to make | 1,000 ml |
| pH adjusted with hydrochloric acid or potassium hydroxide to | 7.00 |
| Reversing Solution: | |
| Pentasodium nitrilo-N,N,N-trimethylene-phosphate | 3.0 g |
| Stannous chloride (dihydrate) | 1.0 g |
| p-Aminophenol | 0.1 g |
| Sodium hydroxide | 8 g |
| Glacial acetic acid | 15 ml |
| Water to make | 1,000 ml |
| pH adjusted with hydrochloric acid or sodium hydroxide to | 6.00 |
| Color Developing Solution: | |
| Pentasodium nitrilo-N,N,N-trimethylene-phosphate | 2.0 g |
| Sodium sulfite | 7.0 g |
| Trisodium phosphate (dodecahydrate) | 36 g |
| Potassium bromide | 1.0 g |
| Potassium iodide | 90 g |
| Sodium hydroxide | 3.0 g |
| Citrazinic acid | 1.5 g |
| N-Ethyl-N-(β-methanesulfonamidoethyl)-3-methyl-4-aminoaniline sulfate | 11 g |
| 3,6-Dithiaoctane-1,8-diol | 1.0 g |
| Water to make | 1,000 ml |
| pH adjusted with hydrochloric acid or potassium hydroxide to | 11.80 |
| Blixing Solution: | |
| $NH_4[Fe(III)(EDTA)].2H_2O$ | 50 g |
| Disodium ethylenediaminetetraacetate (dihydrate) | 5.0 g |
| Sodium thiosulfate | 80 g |
| Sodium sulfite | 12.0 g |
| Water to make | 1,000 ml |
| pH adjusted with hydrochloric acid or ammonia water to | 7.20 |

Second Washing Solution:

City water was passed through a mixed bed column filled with a strongly acidic H type cation exchange resin (Amberlite 1R-120B, manufactured by Rohm & Haas Co.) and an OH type anion exchange resin (Amberlite 1R-400, manufactured by Rohm & Haas Co.) so that the concentration of calcium and magnesium ions wre reduced to 3 mg/liter or less. Sodium dichlorinated isocyanurate and sodium sulfate were added to the water thus processed in amounts of 20 mg/liter and 1.5 g/liter, respectively, The washing solution thus prepared had a pH value of 6.5 to 7.5.

Processing Step (H):

Processing Step (H) was conducted in the same manner as Processing Step (G) except that ferric ammonium ethylenediaminetetraacetate (dihydrate) to be incorporated in the blixing solution was replaced by the equimolecular amount of ferric ammonium ethylenetriaminepentaacetate.

Processing Step (I):

Processing Step (I) was conducted in the same manner as Processing Step (G) except that ferric ammonium ethylenediamine tetraacetate (dihydrate) to be incorporated in the blixing solution was replaced by the equimolecular amount of ferric ammonium cyclohexanediamine tetraacetate.

Processing Step (J):

Processing Step (J) was conducted in the same manner as Processing Step (G) except that ferric ammonium ethylenediaminetetraacetate (dihydrate) to be incorporated in the blixing solution was replaced by the equimolecular amount of ferric ammonium 1,2-propylenediaminetetraacetate.

Specimens 401 to 404 thus processed were examined for fluorescent X-ray analysis for the amount of residual silver in the light-sensitive material. The results are shown in Table II-5.

TABLE II-5

| Sample No. | Specimen | Amount of Residual Silver (g/cm) Processing Step (G)* | (H)** | (I)** | (J)** | Remarks |
|---|---|---|---|---|---|---|
| 5-1 | 401 | 20.5 | 10.3 | 12.4 | 11.6 | Comparison |
| 5-2 | 402 | 5.3 | 2.4 | 1.8 | 1.4 | Invention |
| 5-3 | 403 | 5.8 | 2.5 | 1.3 | 1.2 | Invention |
| 5-4 | 404 | 5.7 | 1.8 | 1.0 | 0.8 | Invention |

*Comparison,
**Invention

Table II-5 shows that Specimen 402 to 404 exhibit excellent results with a small amount of residual silver when processed in Processing Steps (H) to (J) of the present invention.

In accordance with the present invention, a method for the processing of a silver halide color photographic material which provides an excellent blixing capability, particularly fixing capability, and a high stability in the blixing solution can be acomplished.

Furthermore, the present invention enables a very rapid desilvering of a color light-sensitive material. This rapidness can be further effectively attained by the combined use of a cyan dye-forming coupler represented by the formulae (L-I) or (L-II). The present invention also enables an improvement in color restoration and image stability.

While the invention has been described in detail and with reference to specific embodiments thereof, it will be apparent to one skilled in the art that various changes and modifications can be made therein without departing from the spirit and scope thereof.

What is claimed is:

1. A method for processing a silver halide color photographic material comprising a silver bromoiodide emulsion layer having a silver iodide content of 40 mol % or less, which method comprises imagewise exposing a silver halide color-photographic light-sensitive material to light, color developing the light-sensitive material, and then desilvering the light-sensitive material, wherein:

(a) said silver halide color photographic light-sensitive material contains a compound which reacts with an oxidation product of an aromatic primary amine color developing agent to form a bleaching accelerator, (b) said desilvering step is conducted with a processing solution containing a ferric complex salt of an organic acid, and (c) the total amount of replenisher of the processing solution to be used in said desilvering step satisfies either the following conditions (i) or (ii);

(i) the total amount of replenisher if from 100 to 1,000 ml per $m^2$ of said light-sensitive material if the coated amount of silver per $m^2$ of said light-sensitive material is from 2.0 g to 20 g;

(ii) the total amount of replenisher is from 50 to 300 ml per $m^2$ of said light-sensitive material if the coated amount of silver per $m^2$ of said light-sensitive material is from 0.3 to less then 2.0 g.

2. A method as claimed in claim 1, wherein the total amount of replenisher of the processing solution to be used in said desilvering step satisfies either the following conditions (i) or (ii):

(i) the total amount of replenisher is 100 to 700 ml per $m^2$ of said light-sensitive material if the coated amount of silver per $m^2$ of said light-sensitive material is 2.0 g or more;

(ii) the total amount of replenisher is from 50 to 300 ml per $m^2$ of said light-sensitive material if the coated amount of silver per $m^2$ of said light-sensitive material is less than 2.0 g. 1

3. A method as claim in claim 1, wherein said desilvering step is conducted with a processing solution having a bleaching capability or a subsequent processing solution having a blixing capability.

4. A method as claimed in claim 1, wherein said desilvering step is conducted with a processing solution having a blixing capability.

5. A method as claimed in claim 4, wherein the processing solution having a blixing capability contains a ferric aminopolycarboxylate complex salt having a molecular weight of 300 or more in the form of a free acid.

6. A method as claimed in claim 1, wherein said silver halide color photographic material contains at least one cyan dye-forming coupler selected from the group consisting of compounds represented by formulae (I-I) and (L-II):

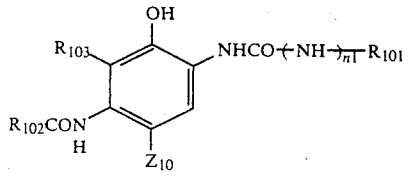

(L-I)

wherein $R_{101}$ and $R_{102}$ each independently represents an aliphatic group, an aryl group or a heterocyclic group; $R_3$ represents a hydrogen atom, a halogen atom, an aliphatic group, an aryl group, an acylamino group, or nonmatallic atomic groups which form a 5- or 6-membered nitrogen-containing ring together with $R_{102}$; $Z_{10}$ represents a hydrogen atom or a coupling-releasable group; and $N_1$ represents an integer of 0 or 1;

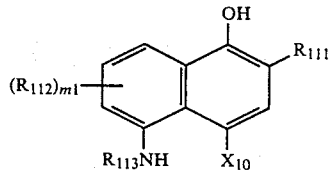

(L-II)

wherein $R_{111}$ represents $—CONR_{115}R_{116}$, $—NHCOR_{115}$, $—NHCOOR_{117}$, $—NHSO_2R_{117}$, $—NHCONR_{115}R_{116}$ or $—NHSO_2NR_{115}R_{116}$: $R_{112}$ represents a group which can be substituted by a naphthol ring; $m^1$ represents an integer of 0 to 3; $R_{113}$ represents a monovalent organic group; and $X_{10}$ represents a hydrogen atom or a group which can be released by coupling reaction with an oxidation product of an aromatic primary amine developing agent, with the provisos that: (a) $R_{113}$ and $R_{116}$ may be the same or different and each independently represents a hydrogen atom, an aliphatic group, an aromatic group or a heterocyclic group, (b) $R_{117}$ represents an aliphatic group, an aromatic group or a heterocyclic group, (c) when $m_1$ is a plural number, the plurality of $R_{112}$ may be the same or different or may be connected to each other to form a ring, and (d) $R_{112}$ and $R_{113}$ or $R_{113}$ and $X_{10}$ may be connected to each other to form a ring.

7. A method as claimed in claim 4, wherein the ferric complex salt is a ferric diethylenetriaminepentaacetate complex salt.

8. A method as claimed in claim 1, wherein the compound for releasing the bleaching accelerator is a compound represented by the formula (I):

$$A_0—(L_0)_p—Z_0 \quad (I)$$

wherein $A_0$ represents a group which undergoes a reaction with an oxidation product of a developing agent to cause cleavage of the $(L_0)_p—Z_0$ bond; $L_0$ represents a group which undergoes a reaction with a timing group or an oxidation product of a developing agent to cause cleavage of the connection with $Z_0$; $Z_0$ represents a group which exhibits the effect of accelerating bleaching upon cleavage of its connection with $A_0—(L_0)$; and p represents an integer of 0 to 3, with the priviso that when p is a plural number, the plurality of $L_0$ may be the same or different.

9. A method as claimed in claim 1, wherein the compound for releasing the bleaching accfelerator is a compound represented by the formult (I'):

$$A_1—(L_1)_a—(L_2)_b—Z_1 \quad (I')$$

wherein $A_1$ represents a group which undergoes a reaction with an oxidation product of a developing agent to cause cleavage of the $(L_1)_a—(L_2)_b—Z_1$ bond; $L_1$ represents a group which undergoes a reaction with a timing group or an oxidation product of a developing agent to cause cleavage of the $(L_2)_b—Z_1$ bond; $L_2$ represents a group which undergoes a reaction with a timing group or an oxidation product of a developing agent to cause cleavage of the connection with $Z_1$; $Z_1$ represents a group which exhibits the effect of accelerating bleaching upon cleavage of its connection with $A_1$—$(L_1)_a$—$(L_2)_b$; and a and b each represents an integer of 0 to 1.

10. A method as claimed in claim 1, wherein the silver iodide content of said silver halide emulsion layer is 20 mol % or less.

11. A method as claimed in claim 1, wherein the silver iodide content of said silver halide emulsion layer is 10 mol % or less.

* * * * *